(12) United States Patent
Takeuchi et al.

(10) Patent No.: US 11,578,195 B2
(45) Date of Patent: Feb. 14, 2023

(54) ODOR-ADSORBING MOLDED ARTICLE RESIN COMPOSITION, ODOR-ADSORBING MOLDED ARTICLE, AND PACKAGING MATERIAL

(71) Applicant: DAI NIPPON PRINTING CO., LTD., Tokyo (JP)

(72) Inventors: Naoya Takeuchi, Tokyo (JP); Yoshihiko Suzuki, Tokyo (JP); Tomohiro Yonemoto, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/042,642

(22) PCT Filed: Mar. 27, 2019

(86) PCT No.: PCT/JP2019/013144
§ 371 (c)(1),
(2) Date: Sep. 28, 2020

(87) PCT Pub. No.: WO2019/189337
PCT Pub. Date: Oct. 3, 2019

(65) Prior Publication Data
US 2021/0040296 A1    Feb. 11, 2021

(30) Foreign Application Priority Data

Mar. 30, 2018  (JP) .............................. JP2018-068125
Mar. 30, 2018  (JP) .............................. JP2018-068126
(Continued)

(51) Int. Cl.
*C08L 23/06* (2006.01)
*B32B 27/18* (2006.01)
(Continued)

(52) U.S. Cl.
CPC .............. *C08L 23/06* (2013.01); *B32B 27/18* (2013.01); *B32B 27/32* (2013.01); *B65D 65/40* (2013.01);
(Continued)

(58) Field of Classification Search
CPC .... C08L 23/06; C08L 2207/066; B32B 27/32; B65D 65/40; B65D 77/06; C08K 9/12
See application file for complete search history.

(56) References Cited

U.S. PATENT DOCUMENTS

2015/0299535 A1 * 10/2015 Robert ................. B32B 27/302
264/510
2017/0043045 A1    2/2017 Takauchi et al.

FOREIGN PATENT DOCUMENTS

CN        101348597        1/2009
CN        106457805        2/2017
(Continued)

OTHER PUBLICATIONS

English machine translation of JP2008-163066 (Year: 2008).*
(Continued)

*Primary Examiner* — Michael C Miggins
(74) *Attorney, Agent, or Firm* — Hamre, Schumann, Mueller & Larson, P.C.

(57) ABSTRACT

An object of the present invention is to provide a resin composition for an odor-adsorbing molded article that is excellent in manufacturability, eliminates odor by exerting a high adsorbing effect on odorous organic matter originally contained in packaging materials and odor generated by the decomposition, etc. of resins constituting packages during disinfection/sterilization treatment such as UV irradiation, hot packing, boiling, γ ray irradiation, or EB irradiation, is less likely to desorb the odor once adsorbed and capable of efficiently adsorbing odor and therefore exerts a high (Continued)

adsorbing effect over a long period without reducing the ability to adsorb odor, and is excellent in resistance to change in taste and odor of contents, and an odor-adsorbing molded article prepared from the resin composition for an odor-adsorbing molded article. The present invention provides a resin composition for an odor-adsorbing molded article comprising at least thermoplastic resin A and an odor adsorbent material, wherein the odor adsorbent material comprises hydrophobic zeolite having a $SiO_2/Al_2O_3$ molar ratio of 30/1 to 8000/1, and a melt flow rate of the thermoplastic resin A is 5 g/min or more and 100 g/min or less, and an odor-adsorbing molded article prepared from the resin composition for an odor-adsorbing molded article.

12 Claims, 10 Drawing Sheets

(30) Foreign Application Priority Data

Mar. 30, 2018 (JP) .............................. JP2018-068127
Mar. 30, 2018 (JP) .............................. JP2018-068128
Mar. 30, 2018 (JP) .............................. JP2018-068129

(51) Int. Cl.
  *B32B 27/32* (2006.01)
  *B65D 65/40* (2006.01)
  *B65D 77/06* (2006.01)
  *C08K 9/12* (2006.01)

(52) U.S. Cl.
  CPC ................ *B65D 77/06* (2013.01); *C08K 9/12* (2013.01); *C08L 2207/066* (2013.01)

(56) References Cited

FOREIGN PATENT DOCUMENTS

| | | |
|---|---|---|
| JP | S60-183346 | 9/1985 |
| JP | H07-227940 | 8/1995 |
| JP | H07-310005 | 11/1995 |
| JP | 2538487 | 9/1996 |
| JP | 2006-273694 | 10/2006 |
| JP | 2008-163066 | 7/2008 |
| JP | 2009-040998 | 2/2009 |
| JP | 2010-150417 | 7/2010 |
| JP | 2013-121535 | 6/2013 |
| JP | 2014-233408 | 12/2014 |
| JP | 2014-233887 | 12/2014 |
| JP | 2015-229301 | 12/2015 |
| JP | 2019-014061 | 1/2019 |
| JP | 2019-055548 | 4/2019 |
| WO | 2019-065938 | 4/2019 |

OTHER PUBLICATIONS

English machine translation of JP2014-233887 (Year: 2014).*
Office Action issued for Japanese Patent Application No. 2018-068125, dated Sep. 21, 2021, 12 pages including machine translation.
International Preliminary Report on Patentability of PCT/JP2019/013144, dated Oct. 15, 2020, 23 pages.
International Search Report and Written Opinion issued for PCT/JP2019/013144, dated Jun. 25, 2019, 12 pages including English translation of the International Search Report.
Office Action issued in corresponding Chinese Patent Application No. 201980022745.9, dated Dec. 27, 2021, 11 pages.
Office Action issued for Japanese Patent Application No. 2018-068125, dated Apr. 5, 2022, 7 pages including English translation.
Office Action issued for Japanese Patent Application No. 2018-068128, dated Mar. 15, 2022, 4 pages including English translation.
Office Action issued for Chinese Patent Application No. 201980022745.9, dated Jul. 14, 2022, 26 pages including machine translation.

* cited by examiner

B

A

ODOR-ADSORBING MOLDED ARTICLE RESIN COMPOSITION, ODOR-ADSORBING MOLDED ARTICLE, AND PACKAGING MATERIAL

TECHNICAL FIELD

The present invention relates to a resin composition for an odor-adsorbing molded article excellent in resistance to change in taste and odor which prevents odorous organic matter originally contained in packaging materials and odor components generated by packaging materials during disinfection/sterilization treatment from moving to liquid contents in packages and offering strange taste or strange odor to the contents, and an odor-adsorbing molded article prepared from the resin composition.

The present invention also relates to a sealant film excellent in pinhole resistance and excellent in resistance to change in taste and odor which prevents elutable organic matter originally contained in packaging materials and odor components generated by sealant films during disinfection/sterilization treatment from moving to liquid contents in packages and offering strange taste or strange odor to the contents, and a packaging material and a package, particularly, a liquid content package for BIB (bag in box), prepared from the odor-adsorbing sealant film.

The present invention also relates to an odor-adsorbing laminate excellent in resistance to change in taste and odor which prevents elutable organic matter originally contained in packaging materials and odor components generated by packaging materials during disinfection/sterilization treatment from moving to liquid contents in packages and offering strange taste or strange odor to the contents, and an odor-adsorbing film for a packaging material, an odor-adsorbing packaging material, an odor-adsorbing packaging material for BIB, and an odor-adsorbing liquid content packaging material for BIB prepared from the odor-adsorbing laminate.

The present invention also relates to a package excellent in pinhole resistance and excellent in resistance to change in taste and odor which prevents elutable organic matter originally contained in packaging materials and odor components generated by packaging materials during disinfection/sterilization treatment from moving to liquid contents in packages and offering strange taste or strange odor to the contents, a liquid content package for BIB (bag in box) comprising the package, and a packaging material constituting the package.

The present invention also relates to a package having a double-bag portion, excellent in pinhole resistance and excellent in resistance to change in taste and odor which prevents elutable organic matter originally contained in packaging materials and odor components generated by packaging materials during disinfection/sterilization treatment from moving to liquid contents in packages and offering strange taste or strange odor to the contents, a liquid content package for BIB (bag in box) comprising the package, and a packaging material constituting the package.

BACKGROUND ART

Packaging materials including an odor adsorbent which adsorbs odor have been proposed as packaging materials (Patent Literature 1). In such packaging materials, an odor adsorbent such as synthetic zeolite or activated carbon is kneaded into a resin material.

However, unfortunately, such packaging materials adsorb not only odor but moisture in the atmosphere and desorb the odor once adsorbed. Therefore, no sufficient odor-adsorbing effect is obtained.

Packaging materials containing an odor adsorbent in which a chemical adsorbent is supported on an inorganic porous material are also known (Patent Literature 2). Such packaging materials merely adsorb odor components having a specific functional group as main matter to be adsorbed, and cannot reduce the amount of generated organic matter having no functional group unless a resin material is selected. Thus, odor components cannot be sufficiently adsorbed.

CITATION LIST

Patent Literature

Patent Literature 1: Japanese Patent No. 2538487
Patent Literature 2: Japanese Patent Laid-Open No. 2014-233408

SUMMARY OF INVENTION

Technical Problem

In order to solve the problems mentioned above, an object of the present invention is to provide a resin composition for an odor-adsorbing molded article that is excellent in manufacturability, eliminates odor by exerting a high adsorbing effect on odorous organic matter originally contained in packaging materials and odor generated by the decomposition, etc. of resins constituting packages during disinfection/sterilization treatment such as UV irradiation, hot packing, boiling, γ ray irradiation, or EB irradiation, is less likely to desorb the odor once adsorbed and capable of efficiently adsorbing odor and therefore exerts a high adsorbing effect over a long period without reducing the ability to adsorb odor, and is excellent in resistance to change in taste and odor of contents, and an odor-adsorbing molded article prepared from the resin composition for an odor-adsorbing molded article (object 1).

A further object of the present invention is to provide a packaging material excellent in pinhole resistance against friction, etc. during transport and excellent in resistance to leakage of liquid contents, and a liquid content package for BIB comprising the packaging material (object 2).

A further object of the present invention is to provide an odor-adsorbing laminate excellent in resistance to change in taste and odor of liquid contents, and an odor-adsorbing film for packaging materials, an odor-adsorbing packaging material, an odor-adsorbing packaging material for BIB, and an odor-adsorbing liquid content packaging material for BIB prepared from the odor-adsorbing laminate (object 3).

A further object of the present invention is to provide a package excellent in pinhole resistance against friction, etc. during transport and excellent in resistance to leakage of liquid contents, a liquid content package for BIB comprising the package, and a packaging material constituting the package (object 4).

A further object of the present invention is to provide a package having a double-bag portion, excellent in pinhole resistance against friction, etc. during transport and excellent in resistance to leakage of liquid contents, a liquid content package for BIB comprising the package, and a packaging material constituting the package (object 5).

Solution to Problem

Object 1

The present inventors have conducted diligent studies and consequently found that the object described above is attained by a resin composition for an odor-adsorbing molded article formed from a resin composition contained at least specific thermoplastic resin A and a specific odor adsorbent material.

Specifically, features of the present invention are as follows.

1. A resin composition for an odor-adsorbing molded article comprising at least thermoplastic resin A and an odor adsorbent material, wherein the odor adsorbent material comprises hydrophobic zeolite having a $SiO_2/Al_2O_3$ molar ratio of 30/1 to 8000/1, and a melt flow rate of the thermoplastic resin A is 5 g/min or more and 100 g/min or less.

2. The resin composition for an odor-adsorbing molded article according to item 1, wherein the odor adsorbent material further comprises a chemical adsorbent-supported inorganic porous material.

3. The resin composition for an odor-adsorbing molded article according to item 1 or 2, wherein the odor adsorbent material is melt-kneaded with thermoplastic resin B in advance at an odor adsorbent material/thermoplastic resin B mass ratio of 0.5/99.5 or more and 40/60 or less, and a melt flow rate of the thermoplastic resin B is 5 g/min or more and 100 g/min or less.

4. The resin composition for an odor-adsorbing molded article according to any one of items 1 to 3, wherein the thermoplastic resin A comprises a polyolefin resin.

5. The resin composition for an odor-adsorbing molded article according to any one of items 1 to 4, wherein a content of the odor adsorbent material in the odor-adsorbing molded article is 0.3% by mass or more and 15% by mass or less.

6. The resin composition for an odor-adsorbing molded article according to any one of items 1 to 5, wherein a content of the hydrophobic zeolite in the odor-adsorbing molded article is 0.3% by mass or more and 15% by mass or less.

7. The resin composition for an odor-adsorbing molded article according to any one of items 2 to 6, wherein the chemical adsorbent of the chemical adsorbent-supported inorganic porous material has a functional group reactive with one or two or more members selected from the group consisting of an aldehyde, a ketone, and a carboxylic acid.

8. The resin composition for an odor-adsorbing molded article according to any one of items 1 to 7, wherein the chemical adsorbent of the chemical adsorbent-supported inorganic porous material has an amino group.

9. The resin composition for an odor-adsorbing molded article according to any one of items 2 to 8, wherein a content of the chemical adsorbent of the chemical adsorbent-supported inorganic porous material in the odor-adsorbing molded article is 0.1% by mass or more and 10% by mass or less.

10. An odor-adsorbing molded article prepared from a resin composition for an odor-adsorbing molded article according to any one of items 1 to 9.

11. A content spout molded article comprising an odor-adsorbing molded article according to item 10.

12. A content spout molded article for a BIB packaging bag comprising a content spout molded article according to item 11.

13. A BIB packaging bag having a content spout molded article for a BIB packaging bag according to item 12.

Advantageous Effects of Invention

The resin composition for an odor-adsorbing molded article of the present invention contains thermoplastic resin A having a specific melt flow rate, and hydrophobic zeolite having a specific $SiO_2/Al_2O_3$ molar ratio as an odor adsorbent material. Therefore, an odor-adsorbing molded article prepared from the resin composition for an odor-adsorbing molded article is effective for reducing odorous organic matter or odor originally contained in packaging materials, and efficiently adsorbing, over a long period, odor generated by the decomposition, etc. of resins constituting laminates during disinfection/sterilization treatment such as UV irradiation, γ ray irradiation, EB irradiation, hot packing, or boiling.

In the case of using an odor-adsorbing molded article prepared from the resin composition for an odor-adsorbing molded article of the present invention in a package, these effects can reduce the amount of organic matter moving to contents packed therein and suppress change in taste and odor.

Thus, the odor-adsorbing molded article prepared from the resin composition for an odor-adsorbing molded article of the present invention is suitable for parts of packages for liquid foods, medicaments, and medical products to be subjected to disinfection/sterilization treatment.

Object 2

The present inventors have found that the object described above is attained by a sealant film comprising at least an outer layer film and an inner layer film, wherein the outer layer film and the inner layer film are adhesively bonded only partially to each other, each of the outer layer film and the inner layer film comprises a sealant layer, the sealant layer of the inner layer film comprises an odor-adsorbing layer, and the odor-adsorbing layer contains low elutable polyethylene and specific hydrophobic zeolite as an odor adsorbent material.

Features of the present invention are as follows.

1. An odor-adsorbing sealant film comprising at least an outer layer film and an inner layer film, wherein the outer layer film and the inner layer film are adhesively bonded only partially to each other, each of the outer layer film and the inner layer film comprises a sealant layer containing low elutable polyethylene, the sealant layer of the inner layer film comprises an odor-adsorbing layer, the odor-adsorbing layer contains the low elutable polyethylene and an odor adsorbent material, the odor adsorbent material comprises hydrophobic zeolite, the hydrophobic zeolite has a $SiO_2/Al_2O_3$ molar ratio of 30/1 to 8000/1, and a content of the hydrophobic zeolite in the sealant layer is 0.1% by mass or more and 13% by mass or less.

2. The odor-adsorbing sealant film according to item 1, wherein the sealant layer of the outer layer film further comprises the odor-adsorbing layer.

3. The odor-adsorbing sealant film according to item 1, wherein the odor adsorbent material further comprises a chemical adsorbent-supported inorganic porous material, and a content of the chemical adsorbent-supported inorganic porous material in the sealant layer is 0.1% by mass or more and 10% by mass or less.

4. The odor-adsorbing sealant film according to any one of items 1 to 3, wherein a density of the low elutable polyethylene is 0.90 g/cm$^3$ or larger and 0.94 g/cm$^3$ or smaller.

5. The odor-adsorbing sealant film according to any one of items 1 to 4, wherein the low elutable polyethylene is LLDPE.

6. The odor-adsorbing sealant film according to any one of items 1 to 5, wherein the low elutable polyethylene is one or two or more members selected from the group consisting of C4-LLDPE, C6-LLDPE, and C8-LLDPE.

7. The odor-adsorbing sealant film according to any one of items 1 to 6, wherein the low elutable polyethylene which has the number of pinholes formed after 5000 Gelbo flexes at 23° C. in a 50 μm thick film is 0 or 1 or more and 160 or less.

8. The odor-adsorbing sealant film according to any one of items 1 to 7, wherein the low elutable polyethylene which has a concentration of elutable TOC contained in a film prepared from only the low elutable polyethylene is 1.5 ppm or higher and 250 ppm or lower.

9. The odor-adsorbing sealant film according to any one of items 1 to 8, wherein the hydrophobic zeolite is melt-kneaded with a thermoplastic resin in advance at a hydrophobic zeolite/thermoplastic resin mass ratio of 0.5/99.5 to 40/60.

10. The odor-adsorbing sealant film according to any one of items 2 to 9, wherein the chemical adsorbent-supported inorganic porous material is melt-kneaded with a thermoplastic resin in advance at a chemical adsorbent-supported inorganic porous material/thermoplastic resin ratio of 0.5/99.5 to 40/60.

11. The odor-adsorbing sealant film according to item 9 or 10, wherein a melt flow rate of the thermoplastic resin is 0.2 to 10.0 g/10 min.

12. The odor-adsorbing sealant film according to any one of items 2 to 11, wherein the chemical adsorbent constituting the chemical adsorbent-supported inorganic porous material has a functional group reactive with one or two or more members selected from the group consisting of an aldehyde, a ketone, and a carboxylic acid.

13. The odor-adsorbing sealant film according to any one of items 2 to 12, wherein the chemical adsorbent constituting the chemical adsorbent-supported inorganic porous material has an amino group.

14. The odor-adsorbing sealant film according to any one of items 1 to 13, wherein the odor-adsorbing layer comprises a non-odor-adsorbing layer on one side or both sides, and the non-odor-adsorbing layer is a layer that comprises low elutable polyethylene and does not comprise the odor adsorbent material.

15. The odor-adsorbing sealant film according to any one of items 1 to 14, wherein the outer layer film further comprises a base material layer.

16. An odor-adsorbing packaging material comprising an odor-adsorbing sealant film according to any one of items 1 to 15.

17. A liquid content packaging bag for BIB prepared from an odor-adsorbing packaging material according to item 16.

Advantageous Effects of Invention

The odor-adsorbing sealant film of the present invention has an odor-adsorbing layer having a specific configuration, and contains specific low elutable polyethylene. Therefore, the odor-adsorbing sealant film is effective for reducing elutable organic matter or odor originally contained in packaging materials, and efficiently adsorbing, over a long period, odor generated by the decomposition, etc. of resins constituting sealant films during disinfection/sterilization treatment such as UV irradiation, γ ray irradiation, EB irradiation, hot packing, or boiling.

In the case of preparing a liquid content package using the odor-adsorbing sealant film of the present invention, these effects can reduce the amount of organic matter eluted into liquid contents packed therein and suppress change in taste and odor.

Thus, the odor-adsorbing sealant film of the present invention is suitable for packaging bags for liquid foods, medicaments, and medical products to be subjected to disinfection/sterilization treatment.

Furthermore, the odor-adsorbing sealant film of the present invention comprises an outer layer film and an inner layer film adhesively bonded only partially to each other. Therefore, the odor-adsorbing sealant film suppresses pinhole formation ascribable to friction during transport, etc. and can suppress liquid leakage, etc.

Object 3

The present inventors have found that the object described above is attained by an odor-adsorbing laminate comprising at least a base material layer, an adhesion layer, and a sealant layer, wherein the adhesion layer and/or the sealant layer contains an odor adsorbent material, and the odor adsorbent material comprises hydrophobic zeolite having a $SiO_2/Al_2O_3$ molar ratio of 30/1 or more and 8000/1 or less.

Features of the present invention are as follows.

1. An odor-adsorbing laminate comprising at least a base material layer, an adhesion layer, and a sealant layer, wherein the adhesion layer and/or the sealant layer contains an odor adsorbent material, when the adhesion layer contains the odor adsorbent material, a content of the odor adsorbent material in the adhesion layer is 0.3% by mass or more and 50% by mass or less, when the sealant layer contains the odor adsorbent material, a content of the odor adsorbent material in the sealant layer is 0.3% by mass or more and 15% by mass or less, and the odor adsorbent material comprises hydrophobic zeolite having a $SiO_2/Al_2O_3$ molar ratio of 30/1 or more and 8000/1 or less.

2. The odor-adsorbing laminate according to item 1, wherein the adhesion layer is a dry lamination adhesion layer or a non-solvent lamination adhesion layer.

3. The odor-adsorbing laminate according to item 1, wherein the adhesion layer is an extrusion coating adhesion layer or a sand lamination adhesion layer, and a content of the odor adsorbent material in the adhesion layer is 0.3% by mass or more and 15% by mass or less.

4. The odor-adsorbing laminate according to any one of items 1 to 3, wherein the odor adsorbent material further comprises a chemical adsorbent-supported inorganic porous material.

5. The odor-adsorbing laminate according to any one of items 1 to 4, wherein the odor adsorbent material is melt-kneaded with thermoplastic resin A in advance at an odor adsorbent material/thermoplastic resin mass ratio of 0.5/99.5 or more and 40/60 or less.

6. The odor-adsorbing laminate according to any one of items 1 to 5, wherein the adhesion layer further contains one or two or more members selected from the group consisting of a polyurethane resin, a polyester resin, a polyamide resin, and a polyolefin resin.

7. The odor-adsorbing laminate according to any one of items 1 to 6, wherein the sealant layer further contains thermoplastic resin C having a melt flow rate of 0.2 g/10 min or more and 10.0 g/10 min or less.

8. The odor-adsorbing laminate according to any one of items 1 to 7, wherein the adhesion layer comprises an odor-adsorbing adhesion layer containing the odor adsorbent material, and a non-odor-adsorbing adhesion layer containing no odor adsorbent material, and the non-odor-adsorbing adhesion layer is in contact with one side or both sides of the odor-adsorbing adhesion layer.

9. The odor-adsorbing laminate according to any one of items 1 to 8, wherein the sealant layer comprises an odor-adsorbing sealant layer containing the odor adsorbent material, and a non-odor-adsorbing sealant layer containing no odor adsorbent material, and the non-odor-adsorbing sealant layer is in contact with one side or both sides of the odor-adsorbing sealant layer.

10. The odor-adsorbing laminate according to any one of items 4 to 9, wherein a content of the hydrophobic zeolite in the adhesion layer is 0.3% by mass or more and 13% by mass or less, and a content of the chemical adsorbent-supported inorganic porous material in the adhesion layer is 0.3% by mass or more and 10% by mass or less.

11. The odor-adsorbing laminate according to any one of items 4 to 10, wherein a content of the hydrophobic zeolite in the sealant layer is 0.1% by mass or more and 13% by mass or less, and a content of the chemical adsorbent-supported inorganic porous material in the sealant layer is 0.1% by mass or more and 10% by mass or less.

12. The odor-adsorbing laminate according to any one of items 4 to 11, wherein the chemical adsorbent of the chemical adsorbent-supported inorganic porous material has a functional group reactive with one or two or more members selected from the group consisting of an aldehyde, a ketone, and a carboxylic acid.

13. The odor-adsorbing laminate according to item 12, wherein the chemical adsorbent has an amino group.

14. An odor-adsorbing film for a packaging material comprising an odor-adsorbing laminate according to any one of items 1 to 13.

15. An odor-adsorbing packaging material comprising an odor-adsorbing film for a packaging material according to item 14.

16. An odor-adsorbing packaging material comprising at least an outer layer film and an inner layer film, wherein the outer layer film and/or the inner layer film comprises an odor-adsorbing film for a packaging material according to item 14, and the outer layer film and the inner layer film are adhesively bonded only partially to each other.

17. An odor-adsorbing packaging material for BIB prepared from an odor-adsorbing packaging material according to item 16.

18. An odor-adsorbing liquid content packaging material for BIB prepared from an odor-adsorbing packaging material according to item 16.

Advantageous Effects of Invention

The odor-adsorbing laminate of the present invention has an odor-adsorbing layer having a specific configuration. Therefore, the odor-adsorbing laminate is effective for reducing odor and efficiently adsorbing, over a long period, odor generated by the decomposition, etc. of resins constituting laminates during disinfection/sterilization treatment such as UV irradiation, γ ray irradiation, EB irradiation, hot packing, or boiling.

In the case of preparing a package using the odor-adsorbing laminate of the present invention, these effects can reduce the amount of organic matter moving to contents packed therein and suppress change in taste and odor.

Thus, the odor-adsorbing laminate of the present invention is suitable for packaging bags for foods, medicaments, and medical products to be subjected to disinfection/sterilization treatment. The odor-adsorbing laminate of the present invention is suitable, particularly, when contents are liquids.

Object 4

The present inventors have found that the object described above is attained by a package having a double-bag portion comprising at least an outer layer film and an inner layer film, wherein the outer layer film and the inner layer film are adhesively bonded only partially to each other, each of the outer layer film and the inner layer film comprises a sealant layer containing low elutable polyethylene, the sealant layer of the inner layer film comprises an odor-adsorbing layer, and the odor-adsorbing layer contains the low elutable polyethylene and specific hydrophobic zeolite as an odor adsorbent material.

Features of the present invention are as follows.

1. A package having a double-bag portion comprising at least an outer layer film and an inner layer film, wherein the outer layer film and the inner layer film are adhesively bonded only partially to each other, each of the outer layer film and the inner layer film comprises a sealant layer containing low elutable polyethylene, the sealant layer of the inner layer film comprises an odor-adsorbing layer, the odor-adsorbing layer contains the low elutable polyethylene and an odor adsorbent material, the odor adsorbent material comprises hydrophobic zeolite, the hydrophobic zeolite has a $SiO_2/Al_2O_3$ molar ratio of 30/1 to 8000/1, and a content of the hydrophobic zeolite in the sealant layer of the inner layer film is 0.1% by mass or more and 13% by mass or less.

2. The package according to item 1, wherein the odor adsorbent material further comprises a chemical adsorbent-supported inorganic porous material, and a content of the chemical adsorbent-supported inorganic porous material in the sealant layer of the inner layer film is 0.1% by mass or more and 10% by mass or less.

3. The package according to item 1 or 2, wherein a density of the low elutable polyethylene is 0.90 g/cm$^3$ or larger and 0.94 g/cm$^3$ or smaller.

4. The package according to any one of items 1 to 3, wherein the low elutable polyethylene is LLDPE.

5. The package according to any one of items 1 to 4, wherein the low elutable polyethylene is one or two or more members selected from the group consisting of C4-LLDPE, C6-LLDPE, and C8-LLDPE.

6. The package according to any one of items 1 to 5, wherein the low elutable polyethylene which has the number of pinholes formed after 5000 Gelbo flexes at 23° C. in a 50 μm thick film prepared from only the low elutable polyethylene is 0 or 1 or more and 160 or less.

7. The package according to any one of items 1 to 6, wherein the low elutable polyethylene which has a concentration of elutable TOC contained in a film prepared from only the low elutable polyethylene is 1.5 ppm or higher and 250 ppm or lower.

8. The package according to any one of items 1 to 7, wherein the hydrophobic zeolite is melt-kneaded with a thermoplastic resin in advance at a hydrophobic zeolite/thermoplastic resin mass ratio of 0.5/99.5 to 40/60.

9. The package according to any one of items 2 to 8, wherein the chemical adsorbent-supported inorganic porous material is melt-kneaded with a thermoplastic resin in advance at a chemical adsorbent-supported inorganic porous material/thermoplastic resin ratio of 0.5/99.5 to 40/60.
10. The package according to item 8 or 9, wherein a melt flow rate of the thermoplastic resin is 0.2 to 10.0 g/10 min.
11. The package according to any one of items 2 to 10, wherein the chemical adsorbent constituting the chemical adsorbent-supported inorganic porous material has a functional group reactive with one or two or more members selected from the group consisting of an aldehyde, a ketone, and a carboxylic acid.
12. The package according to any one of items 2 to 11, wherein the chemical adsorbent constituting the chemical adsorbent-supported inorganic porous material has an amino group.
13. The package according to any one of items 1 to 12, wherein the inner layer film comprises a non-odor-adsorbing layer on one side or both sides of the odor-adsorbing layer, and the non-odor-adsorbing layer is a layer that comprises low elutable polyethylene and does not comprise the odor adsorbent material.
14. The package according to any one of items 1 to 13, wherein the outer layer film further comprises a base material layer.
15. A liquid content package for BIB comprising a package according to any one of items 1 to 14.
16. A packaging material constituting a package according to any one of items 1 to 14.

Advantageous Effects of Invention

The package of the present invention has an odor-adsorbing layer having a specific configuration, and contains specific low elutable polyethylene. Therefore, the package is effective for reducing elutable organic matter or odor originally contained in packaging materials, and efficiently adsorbing, over a long period, odor generated by the decomposition, etc. of resins constituting laminates during disinfection/sterilization treatment such as UV irradiation, γ ray irradiation, EB irradiation, hot packing, or boiling.

In the case of preparing a liquid content package using the package of the present invention, these effects can reduce the amount of organic matter eluted into liquid contents packed therein and suppress change in taste and odor.

Thus, the package of the present invention is suitable for packaging bags for liquid foods, medicaments, and medical products to be subjected to disinfection/sterilization treatment.

Furthermore, the double-bag portion of the package of the present invention comprises an outer layer film and an inner layer film adhesively bonded only partially to each other. Therefore, the package suppresses pinhole formation ascribable to friction during transport, etc. and can suppress liquid leakage, etc.

Object 5

The present inventors have conducted diligent studies and consequently found that the object described above is attained by a package comprising a double-bag portion comprising at least an outer layer film and an inner layer film, and a content spout comprising a resin molded article, wherein the outer layer film and the inner layer film are adhesively bonded only partially to each other, each of the outer layer film and the inner layer film comprises a sealant layer having an odor-adsorbing layer, the odor-adsorbing layer contains low elutable polyethylene and specific hydrophobic zeolite as an odor adsorbent material, and the content spout contains a polyolefin resin and the hydrophobic zeolite.

Features of the present invention are as follows.
1. A package comprising a double-bag portion comprising at least an outer layer film and an inner layer film, and a content spout comprising a resin molded article, wherein the outer layer film and the inner layer film are adhesively bonded only partially to each other, each of the outer layer film and the inner layer film comprises a sealant layer, the sealant layer comprises an odor-adsorbing layer, the odor-adsorbing layer contains low elutable polyethylene and an odor adsorbent material, the content spout contains a polyolefin resin and the odor adsorbent material, the odor adsorbent material comprises hydrophobic zeolite, the hydrophobic zeolite has a $SiO_2/Al_2O_3$ molar ratio of 30/1 to 8000/1, and a content of the hydrophobic zeolite in the sealant layer is 0.1% by mass or more and 13% by mass or less.
2. The package according to item 1, wherein the odor adsorbent material further comprises a chemical adsorbent-supported inorganic porous material, and a content of the chemical adsorbent-supported inorganic porous material in the sealant layer is 0.1% by mass or more and 10% by mass or less.
3. The package according to item 1 or 2, wherein a content of the hydrophobic zeolite in the content spout is 0.1% by mass or more and 13% by mass or less.
4. The package according to any one of items 1 to 3, wherein the odor adsorbent material further comprises a chemical adsorbent-supported inorganic porous material, and a content of the chemical adsorbent-supported inorganic porous material in the content spout is 0.1% by mass or more and 10% by mass or less.
5. The package according to any one of items 1 to 4, wherein a density of the low elutable polyethylene is 0.90 g/cm$^3$ or larger and 0.94 g/cm$^3$ or smaller.
6. The package according to any one of items 1 to 5, wherein the low elutable polyethylene is LLDPE.
7. The package according to any one of items 1 to 6, wherein the low elutable polyethylene is one or two or more members selected from the group consisting of C4-LLDPE, C6-LLDPE, and C8-LLDPE.
8. The package according to any one of items 1 to 7, wherein the low elutable polyethylene which has the number of pinholes formed after 5000 Gelbo flexes at 23° C. in a 50 μm thick film prepared from only the low elutable polyethylene is 0 or 1 or more and 160 or less.
9. The package according to any one of items 1 to 8, wherein the low elutable polyethylene which has a concentration of elutable TOC contained in a film prepared from only the low elutable polyethylene is 1.5 ppm or higher and 250 ppm or lower.
10. The package according to any one of items 1 to 9, wherein the hydrophobic zeolite is melt-kneaded with a thermoplastic resin in advance at a hydrophobic zeolite/thermoplastic resin mass ratio of 0.5/99.5 to 40/60.
11. The package according to any one of items 2 to 10, wherein the chemical adsorbent-supported inorganic porous material is melt-kneaded with a thermoplastic resin in advance at a chemical adsorbent-supported inorganic porous material/thermoplastic resin ratio of 0.5/99.5 to 40/60.
12. The package according to any one of items 1 to 11, wherein a melt flow rate of the thermoplastic resin is 0.2 to 10.0 g/10 min.
13. The package according to any one of items 2 to 12, wherein the chemical adsorbent constituting the chemical adsorbent-supported inorganic porous material has a functional group reactive with one or two or more members selected from the group consisting of an aldehyde, a ketone, and a carboxylic acid.

14. The package according to any one of items 2 to 13, wherein the chemical adsorbent constituting the chemical adsorbent-supported inorganic porous material has an amino group.

15. The package according to any one of items 1 to 14, wherein the outer layer film and/or the inner layer film comprises a non-odor-adsorbing layer on one side or both sides of the odor-adsorbing layer, and the non-odor-adsorbing layer is a layer that comprises low elutable polyethylene and does not comprise the odor adsorbent material.

16. The package according to any one of items 1 to 15, wherein the outer layer film further comprises a base material layer.

17. A liquid content package for BIB comprising a package according to any one of items 1 to 16.

18. A packaging material constituting a package according to any one of items 1 to 17.

Advantageous Effects of Invention

The package of the present invention has an odor-adsorbing layer having a specific configuration, and contains specific low elutable polyethylene. Therefore, the package is effective for reducing elutable organic matter or odor originally contained in packaging materials, and efficiently adsorbing, over a long period, odor generated by the decomposition, etc. of resins constituting laminates during disinfection/sterilization treatment such as UV irradiation, γ ray irradiation, EB irradiation, hot packing, or boiling.

In the case of preparing a liquid content package using the package of the present invention, these effects can reduce the amount of organic matter eluted into liquid contents packed therein and suppress change in taste and odor.

Thus, the package of the present invention is suitable for packaging bags for liquid foods, medicaments, and medical products to be subjected to disinfection/sterilization treatment.

Furthermore, the double-bag portion of the package of the present invention comprises an outer layer film and an inner layer film adhesively bonded only partially to each other. Therefore, the package suppresses pinhole formation ascribable to friction during transport, etc. and can suppress liquid leakage, etc.

BRIEF DESCRIPTION OF DRAWINGS

Object 1 (FIGS. 1 to 3)

DESCRIPTION OF EMBODIMENTS

Hereinafter, the present invention will be described in more detail. The present invention will be described with reference to specific examples. However, the present invention is not limited by these examples.

Object 1
<Composition of Resin Composition for Odor-Adsorbing Molded Article and Purpose of Odor-Adsorbing Molded Article>

The resin composition for an odor-adsorbing molded article of the present invention comprises at least thermoplastic resin A and an odor adsorbent material, wherein the odor adsorbent material comprises hydrophobic zeolite having a $SiO_2/Al_2O_3$ molar ratio of 30/1 to 8000/1, and a melt flow rate of the thermoplastic resin A is 5 g/min or more and 100 g/min or less.

Figure 1:
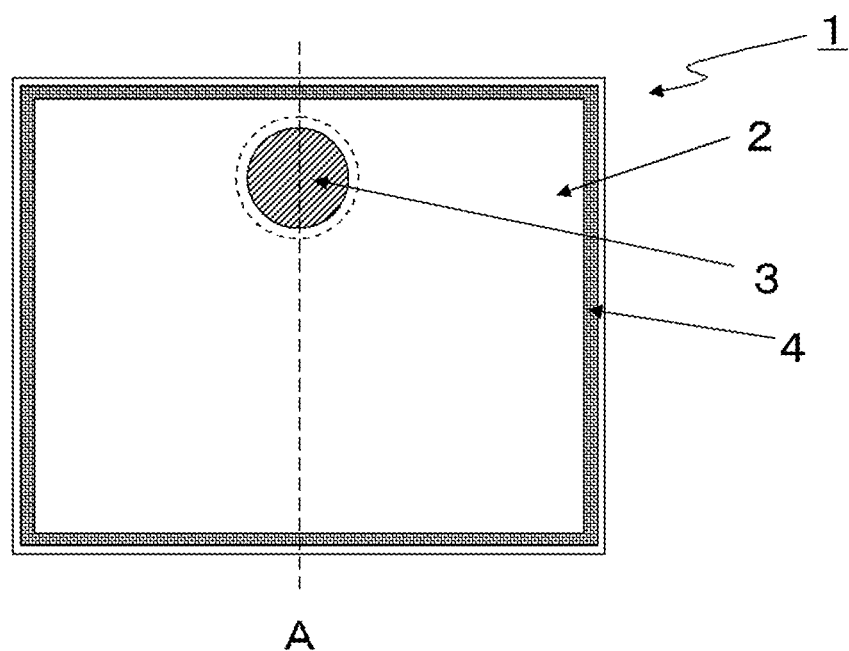
FIG. 1 is a plane view showing one example of a package using the odor-adsorbing molded article of the present invention.
Figure 2:
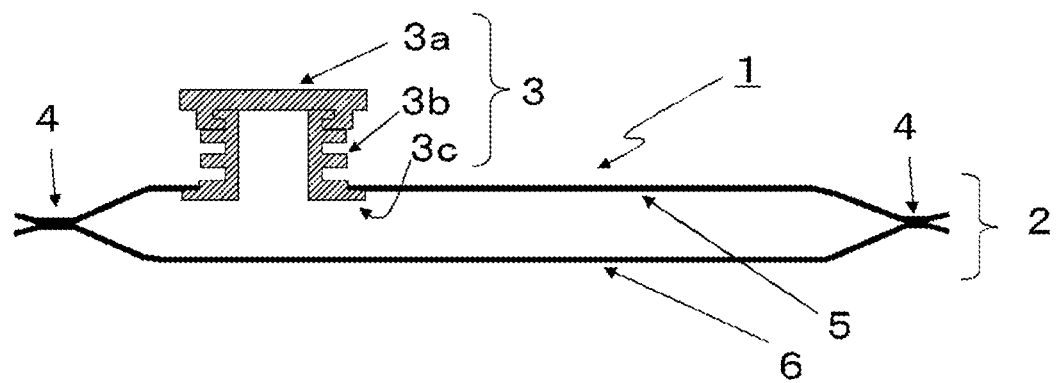
FIG. 2 is a cross-sectional view showing one example of a package using the odor-adsorbing molded article of the present invention.

The odor-adsorbing molded article of the present invention can be used, for example, as shown in FIG. 1 or 2, as a content spout molded article for a packaging bag.

The odor-adsorbing molded article can also contain various plastic compounding agents, additives, or the like for the purpose of improving or modifying processability, heat resistance, weather resistance, mechanical properties, dimensional stability, antioxidative properties, lubricity, mold release properties, flame retardancy, antimycotic properties, electric characteristics, strength, etc.

The resin composition for an odor-adsorbing molded article is obtained by mixing and kneading various raw materials described above by a method known in the art for preparation. The odor-adsorbing molded article can be obtained by molding the resin composition for an odor-adsorbing molded article by a method known in the art.

A kneading method known in the art or commonly used can be applied to a method for kneading the odor adsorbent material and the thermoplastic resin A.

The odor adsorbent material may be mixed and kneaded directly with the thermoplastic resin A. Alternatively, a so-called master batch system may be performed, which involves mixing the odor adsorbent material at a high concentration with thermoplastic resin B, then preparing a master batch by melt kneading, and mixing and melt-kneading this master batch with the thermoplastic resin A at a ratio appropriate for the target content percentages.

The content of the hydrophobic zeolite in the resin composition for an odor-adsorbing molded article and the odor-adsorbing molded article is preferably 0.3% by mass or more and 15° by mass or less.

The content of the chemical adsorbent-supported inorganic porous material in the resin composition for an odor-adsorbing molded article and the odor-adsorbing molded article is preferably 0.1% by mass or more and 10% by mass or less.

A content smaller than the range described above makes it difficult to exert a sufficient odor-adsorbing effect. A content larger than the range described above facilitates worsening the moldability of the odor-adsorbing molded article.

The content percentage of the hydrophobic zeolite in the master batch is preferably 0.5% by mass or more and 40% by mass or less, more preferably 1% by mass or more and 20% by mass or less.

The content percentage of the chemical adsorbent-supported inorganic porous material in the master batch is preferably 0.5% by mass or more and 40% by mass or less, more preferably 1% by mass or more and 20% by mass or less.

The master batch system can homogeneously disperse the hydrophobic zeolite or the chemical adsorbent-supported inorganic porous material into a polyolefin resin even if the combination of the hydrophobic zeolite or the chemical adsorbent-supported inorganic porous material with the polyolefin resin, which easily causes aggregation, is used.

The polyolefin resin described above is preferred as the thermoplastic resin for use in the master batch. However, the thermoplastic resin is not limited thereto, and any thermoplastic resin can be used without having an adverse effect.

<Thermoplastic Resin A>

MFR (melt flow rate) of the thermoplastic resin A contained in the resin composition for an odor-adsorbing molded article of the present invention is preferably 5 g/min or more and 100 g/min or less, more preferably 10 g/min or more and 70 g/min or less.

If MFR is less than 5 g/min, the melt viscosity of the resin composition for an odor-adsorbing molded article is too high so that fluidity at the time of molding is insufficient, easily causing poor molding such as incomplete packing. If MFR is larger than 100 g/min, the melt viscosity of the resin composition for an odor-adsorbing molded article is too low so that turbulent flow occurs in the melted resin composition for an odor-adsorbing molded article at the time of molding to mix up air into the resin composition, easily causing voids or causing sink marks on the surface of a molded article.

In the present specification, MFR is a value measured by an approach conforming to JIS K 7210.

Specific examples of the thermoplastic resin A include, but are not limited to, polyolefin resins, polystyrene resins, acrylonitrile-styrene copolymers (AS resin), acrylonitrile-butadiene-styrene copolymers (ABS resin), poly(meth)acrylic resins, polyester resins, polyamide resins, polyurethane resins, acetal resins, and cellulose resins.

Among the resins described above, a polyolefin resin or a low gas-permeable polyester resin is preferably contained.

Specific examples of the polyolefin resin include, but are not limited to, polyethylene resins (LDPE, MDPE, HDPE, LLDPE, etc.), various ethylene copolymers such as ethylene-vinyl alcohol copolymer resin, polypropylene resins, cyclic polyolefin resins, methylpentene polymers, and acid-modified polyolefin resins.

Examples of the polyester resin include, but are not limited to, polycarbonate resins, polyethylene terephthalate, and polyethylene naphthalate.

<Thermoplastic Resin B>

The thermoplastic resin B is preferably selected as a thermoplastic resin suitable for dispersing the odor adsorbent material in master batch preparation.

MFR (melt flow rate) of the thermoplastic resin B is preferably 5 g/min or more and 100 g/min or less, more preferably 10 g/min or more and 70 g/min or less.

If MFR is less than 5 g/min, the melt viscosity of the master batch is too high, easily reducing the dispersibility of the odor adsorbent material. If MFR is larger than 100 g/min, the melt viscosity of the master batch is too low so that shear force is difficult to apply, easily reducing the dispersibility of the odor adsorbent material. If MFR falls outside the range described above, the melt viscosity of the resin composition for an odor-adsorbing molded article is difficult to adjust to a proper range.

The same resin as the thermoplastic resin A contained in the resin composition for an odor-adsorbing molded article is preferably used as the thermoplastic resin B for use in the master batch. A polyolefin resin is more preferred. However, the thermoplastic resin is not limited thereto, and any thermoplastic resin can be used without having an adverse effect.

Specific examples of the thermoplastic resin B include, but are not limited to, polyolefin resins, polystyrene resins, acrylonitrile-styrene copolymers (AS resin), acrylonitrile-butadiene-styrene copolymers (ABS resin), poly(meth)acrylic resins, polyester resins, polyamide resins, polyurethane resins, acetal resins, and cellulose resins.

Among the resins described above, a polyolefin resin or a low gas-permeable polyester resin is preferably contained.

Specific examples of the polyolefin resin include, but are not limited to, polyethylene resins (LDPE, MDPE, HDPE, LLDPE, etc.), various ethylene copolymers such as ethylene-vinyl alcohol copolymer resin, polypropylene resins, cyclic polyolefin resins, methylpentene polymers, and acid-modified polyolefin resins.

Examples of the polyester resin include, but are not limited to, polycarbonate resins, polyethylene terephthalate, and polyethylene naphthalate.

<Odor Adsorbent Material>

The odor adsorbent material contained in the resin composition for an odor-adsorbing molded article and the odor-adsorbing molded article of the present invention comprises hydrophobic zeolite having a $SiO_2/Al_2O_3$ molar ratio of 30/1 to 8000/1 and may further comprise a chemical adsorbent-supported inorganic porous material, if necessary.

[Hydrophobic Zeolite]

Zeolite having a higher $SiO_2/Al_2O_3$ molar ratio generally has higher hydrophobicity. In the present invention, the hydrophobic zeolite contained in the odor-adsorbing layer preferably has a $SiO_2/Al_2O_3$ molar ratio of 30/1 to 8000/1.

The hydrophobic zeolite can exert an odor-eliminating effect by the adsorption of odor components without losing the ability to adsorb odor even when a package or a packaging material is exposed to 230° C. or higher.

The hydrophobic zeolite can have an arbitrary outer shape such as a spherical, rod-like, or elliptic shape and may be in any form such as a powder, a mass, or particles. The form of a powder is preferred from the viewpoint of the moldability of the resin composition containing the hydrophobic zeolite, uniform dispersion in the thermoplastic resin A or B, kneading characteristics, etc.

In the present invention, the average particle size of the hydrophobic zeolite can be appropriately selected as an arbitrary average particle size and is preferably an average particle size of 0.01 µm to 10 µm. In this context, the average particle size is a value measured by a dynamic light scattering method.

If the average particle size is smaller than 0.01 µm, the hydrophobic zeolite aggregates easily with a tendency to reduce dispersibility in the thermoplastic resin A or B. If the average particle size is larger than 10 µm, it tends to be difficult to add a large amount of the hydrophobic zeolite because the resin composition containing the hydrophobic zeolite tends to have poor moldability. Furthermore, the possibility arises that a sufficient odor-eliminating effect is not obtained, because the surface area is also decreased.

The hydrophobic zeolite, which is hydrophobic, has the difficulty in adsorbing highly polar water molecules or the like, but has high affinity for low polar odor molecules, hydrophobic gases, and lipophilic gases (including solvent gases) and easily adsorbs them. The zeolite surface exhibits basicity by the action of an alkali metal and an alkaline earth metal, such as Ca, Na, and K, present on the zeolite surface, and easily adsorbs acidic gases through neutralization reaction.

[Chemical Adsorbent-Supported Inorganic Porous Material]

In the present invention, the chemical adsorbent-supported inorganic porous material is an inorganic porous material on which a chemical adsorbent is supported, and has the function of adsorbing odorous organic matter, or odor substances generated from packages during disinfection/sterilization treatment such as UV irradiation, γ ray irradiation, EB irradiation, hot packing, or boiling.

A supporting method known in the art or commonly used can be applied to a supporting method. For example, the inorganic porous material can be impregnated with a solution containing the chemical adsorbent described below, and dried for supporting.

In the present invention, the containment of the odor adsorbent material containing the chemical adsorbent-supported inorganic porous material in an odor-adsorbing layer can drastically enhance adsorbing ability per unit mass of the chemical adsorbent and can decrease the content of the chemical adsorbent-supported inorganic porous material in the odor-adsorbing layer. Furthermore, the physical adsorption characteristics of the pore portion of the inorganic porous material can also be expected.

Owing to such a decreased content, the resin composition containing the chemical adsorbent-supported inorganic porous material acquires excellent fluidity and packing properties and can retain excellent moldability required for molding materials.

The chemical adsorbent-supported inorganic porous material can have an arbitrary outer shape such as a spherical, rod-like, or elliptic shape and may be in any form such as a powder, a mass, or particles. The form of a powder is preferred from the viewpoint of the moldability of the resin composition containing the chemical adsorbent-supported inorganic porous material, uniform dispersion in the thermoplastic resin A or B, kneading characteristics, etc.

The chemical adsorbent-supported inorganic porous material can be appropriately selected so as to have an arbitrary average particle size according to a purpose. In the present invention, the average particle size is particularly preferably 0.01 µm to 10 µm, more preferably 0.1 µm to 8 µm, further preferably 1 µm to 7 µm. In this context, the average particle size is a value measured by a dynamic light scattering method.

If the average particle size is smaller than 0.01 µm, the chemical adsorbent-supported inorganic porous material aggregates easily with a tendency to reduce the dispersibility of the chemical adsorbent-supported inorganic porous material in the thermoplastic resin A or B.

If the average particle size is larger than 10 µm, it tends to be difficult to add a large amount of the chemical adsorbent-supported inorganic porous material because the resin composition containing the chemical adsorbent-supported inorganic porous material has poor moldability. The possibility arises that a sufficient adsorbing effect is not obtained.

(Inorganic Porous Material)

In the present invention, an arbitrary inorganic compound having many pores on its surface can be used as the inorganic porous material. Examples thereof include zeolite, silicon dioxide, silicate, activated carbon, titania, inorganic phosphate such as calcium phosphate, alumina, aluminum hydroxide, magnesium hydroxide, and mixtures thereof.

Particularly, aluminum hydroxide, zeolite, or silicate is preferably utilized from the viewpoint of a porous state with a pore size effective for the molecular size or cluster size of a substance to be adsorbed, and safety.

The inorganic porous material can have an arbitrary outer shape such as a spherical, rod-like, or elliptic shape and may be in any form such as a powder, a mass, or particles. The form of a powder is preferred from the viewpoint of the moldability of the resin composition containing the hydrophobic zeolite after preparation of the odor adsorbent material by the supporting of the chemical adsorbent, uniform dispersion in the thermoplastic resin A or B, kneading characteristics, etc.

The inorganic porous material can be appropriately selected so as to have an arbitrary average particle size according to a purpose. In the present invention, the average particle size is particularly preferably 0.01 µm to 10 µm, more preferably 0.1 µm to 8 µm, further preferably 1 µm to 7 μm, for obtaining the chemical adsorbent-supported inorganic porous material having the average particle size described above.

(Chemical Adsorbent)

In the present invention, the chemical adsorbent is a compound that has a reactive functional group binding through chemical reaction to odorous organic matter, or an odor substance generated by the decomposition, etc. of a resin during disinfection/sterilization treatment, and can be supported onto the inorganic porous material described above.

More specifically, the chemical adsorbent is a compound having a reactive functional group binding to various aldehydes, ketones, carboxylic acids, and the like resulting from disinfection/sterilization treatment such as UV irradiation, γ ray irradiation, EB irradiation, hot packing, or boiling.

Examples of such a compound include compounds having a basic functional group such as an amino group or a hydroxyl group, metal carbonates, metal bicarbonates, and amide group-containing compounds. Specific examples of each compound include, but are not limited to, the following compounds.

Examples of the compound containing an amino group include alkylamine, ethylenediamine, tetramethylenediamine, diethylenetriamine, triethylenetriamine, tetraethylenepentamine, piperazine, m-phenylenediamine, and polyamine.

Examples of the compound having a hydroxyl group include metal hydroxides such as sodium hydroxide, potassium hydroxide, magnesium hydroxide, and iron hydroxide.

Examples of the metal carbonate include sodium carbonate and calcium carbonate.

Examples of the metal carbonate include sodium bicarbonate.

Examples of the amide group-containing compound include 2-acrylamido-2-methylpropanesulfonate.

In the present invention, the chemical adsorbent is preferably a compound having an amino group because the compound particularly exerts an excellent adsorbing effect.

The adsorption mechanism of the chemical adsorbent for a substance to be adsorbed such as organic matter or an odor substance will be described in more detail with reference to specific examples of FIGS. 3(a) to 3(b). However, the present invention is not limited by these examples.

Figure 3:
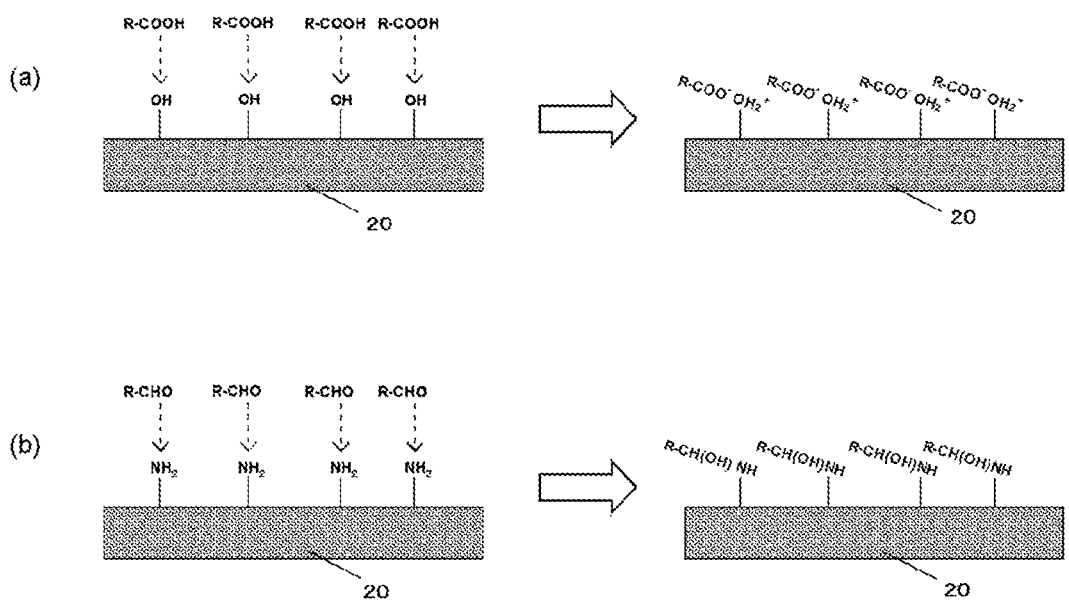
FIG. 3 is a diagram showing the adsorption mechanism of a chemical adsorbent-supported inorganic porous material for an odor substance.
Object 2 (FIGS. 4 to 12)

When the substance to be adsorbed (odor substance) is, for example, an acidic odor substance, as shown in FIG. 3(a), for example, a compound having a hydroxyl group can be selected as the chemical adsorbent and supported onto the inorganic porous material to prepare a chemical adsorbent-supported inorganic porous material for use. As a result, the hydroxyl group causes chemical reaction with a carboxyl group so that the substance to be adsorbed is adsorbed.

When the substance to be adsorbed is an aldehyde, as shown in FIG. 3(b), for example, a compound having an amino group can be selected as the chemical adsorbent and supported onto the inorganic porous material to prepare a chemical adsorbent-supported inorganic porous material for use. As a result, the aldehyde group causes chemical reaction with an amino group so that the substance to be adsorbed is adsorbed.

By such chemical adsorption, odor can be efficiently adsorbed without desorbing the substance to be adsorbed (odor substance) once adsorbed.

Unlike a physical adsorbent which adsorbs a substance to be adsorbed (odor substance) and water vapor at the same adsorption site, the chemical adsorbent according to the present invention binds, at its specific functional group, to the substance to be adsorbed and is therefore insusceptible to various substances reducing the ability to adsorb odor, for example, water vapor.

<Preparation of Resin Composition for Odor-Adsorbing Molded Article>

A kneading method known in the art or commonly used can be applied to a method for kneading the odor adsorbent material and the thermoplastic resin A.

The odor adsorbent material may be mixed and kneaded directly with the thermoplastic resin A. Alternatively, a so-called master batch system may be performed, which involves mixing the odor adsorbent material at a high concentration with thermoplastic resin B, then preparing a master batch by melt kneading, and mixing and melt-kneading this master batch with the thermoplastic resin A at a ratio appropriate for the target content percentages.

The content percentage of the hydrophobic zeolite in the master batch is preferably 0.5% by mass or more and 40% by mass or less, more preferably 1% by mass or more and 20% by mass or less.

The content percentage of the chemical adsorbent-supported inorganic porous material in the master batch is preferably 0.5% by mass or more and 40% by mass or less, more preferably 1% by mass or more and 20% by mass or less.

The master batch system can homogeneously disperse the odor adsorbent material into the thermoplastic resin A even if the combination of the odor adsorbent material with the thermoplastic resin A, which easily causes aggregation, is used.

In this respect, the thermoplastic resin B in the master batch may or may not be the same as the thermoplastic resin A in the resin composition for an odor-adsorbing molded article. Thermoplastic resins of the same type may be combined according to a purpose.

For example, provided that the odor adsorbent material and the thermoplastic resin B are melt-mixed in advance, homogeneous and favorable moldability and odor-adsorbing properties can be obtained by mixing or melt kneading with the thermoplastic resin B again.

The resin composition for an odor-adsorbing molded article may contain a thermoplastic resin other than the thermoplastic resin A. Such a thermoplastic resin preferably has a melt flow rate equivalent to that of the thermoplastic resin A and can be used without having a significant adverse effect on the moldability and odor-adsorbing properties of the resin composition for an odor-adsorbing molded article.

<Molding into Odor-Adsorbing Molded Article>

The odor-adsorbing molded article can be prepared at 100 to 250° C. by a molding approach known in the art such as injection molding or transfer molding using the resin composition for an odor-adsorbing molded article.

<Content Spout>

The odor-adsorbing molded article of the present invention can be used in a content spout for a package such as packaging bags.

The content spout is an entrance and/or exit port through which contents are packed and/or taken out. The contents may be packed into and taken out of one content spout, or two or more content spouts may be provided and the contents can be packed into and taken out of the separate content spouts.

The content spout is not particularly limited by its installation position and is preferably installed at or near an end portion of a package.

The content spout can be constituted by, for example, as shown in FIG. 2, a flange at a lower end, a cylindrical part installed in a hole of an inner bag by the flange, and a cap fitted and fixed to the opening of this cylindrical part.

All the spout, the connector, and the cap are preferably formed from the resin composition for an odor-adsorbing molded article and may have the same or different composition as or from each other.

<Packaging Bag>

The packaging bag using the odor-adsorbing molded article of the present invention as a content spout is a packaging bag that is packed with contents, for example, a liquid content packaging bag.

The packaging bag can be prepared, for example, by using a packaging material having heat sealing properties, bending the packaging material or overlaying two such packaging materials such that faces having favorable heat sealing properties are opposed to each other, and heat-sealing peripheral edges in a heat-seal form, for example, lateral seal type, two-sided seal type, three-sided seal type, four-sided seal type, envelope-like seal type, center seal type (pillow seal type), pleated seal type, flat bottom seal type, square bottom seal type, or a gazette type.

A method known in the art, for example, bar sealing, rotating roll sealing, belt sealing, impulse sealing, high-frequency sealing, or ultrasonic sealing can be applied to a heat sealing method.

<BIB Packaging Bag>

The BIB (bag in box) packaging bag is a package in which a packaging bag or a molded container having a content spout is housed in a cardboard box or the like.

<Content>

In the present invention, the contents are not particularly limited, and foods or medicaments are suitable because the odor-adsorbing molded article or the packaging bag of the present invention is subjected to disinfection/sterilization treatment or odor components move thereto and offer strange taste or strange odor.

Examples of the liquid contents include general liquids such as drinking water, juices, drip infusions, seasoning liquids such as soy sauce and sauce, soups, honey, baste, and dressing.

Object 2

<Odor-Adsorbing Sealant Film>

Figure 4:
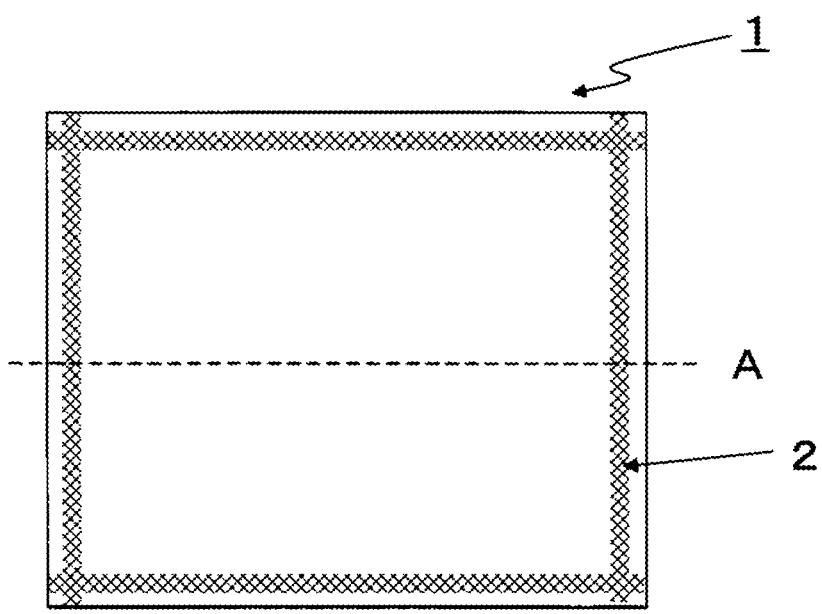
FIG. 4 is a schematic plane view showing one example of the odor-adsorbing sealant film of the present invention.
Figure 5:
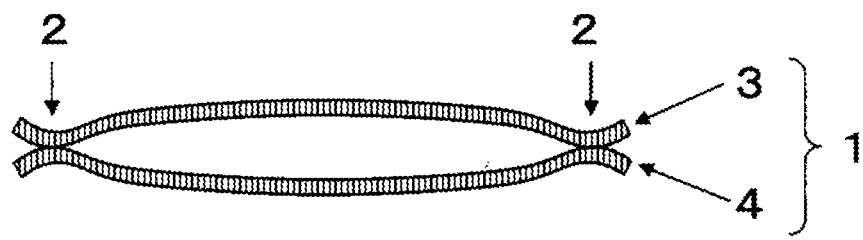
FIG. 5 shows one example of a schematic cross-sectional view taken along cross-sectional line A of the odor-adsorbing sealant film in FIG. 4.

The odor-adsorbing sealant film of the present invention comprises, as shown in FIG. 4 or 5, at least an outer layer film and an inner layer film, wherein the outer layer film and the inner layer film are adhesively bonded only partially to each other.

The adhesively bonded portion between the outer layer film and the inner layer film is preferably located at least at the periphery of the odor-adsorbing sealant film and is in a lattice shape composed of continuous lines, in a shape composed of discontinuous lines, or in a dot shape.

When the odor-adsorbing sealant film of the present invention is used as a packaging material, pinhole resistance is important, particularly, for packaging materials for foods or medical products, etc. because fatigue failure progresses due to local repeated flexion ascribable to vibration during a packaging step or during transport, or due to the contact of package parts such as a content spout so that pinholes, which cause leakage of liquid contents in liquid content packages for BIB used, are formed.

For use in aseptic packaging, packages are disinfected with an electron beam, a γ ray, ethylene oxide gas, or the like and then supplied to subsequent steps or users.

<Layer Configurations of Outer Layer Film and Inner Layer Film>

Each of the outer layer film and the inner layer film is a film having at least a sealant layer containing low elutable polyethylene.

The sealant layer of the inner layer film comprises an odor-adsorbing layer. The sealant layer of the outer layer film can also comprise the odor-adsorbing layer, if necessary.

Figure 6:
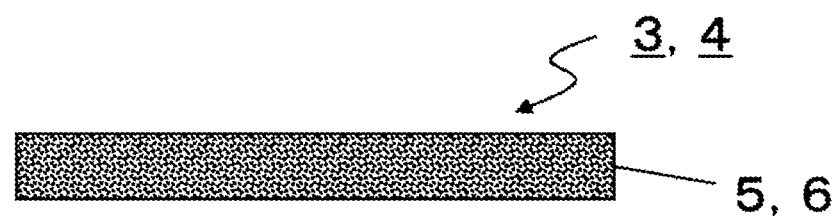
FIG. 6 is a cross-sectional view showing one example of the layer configuration of an outer layer film or an inner layer film.
Figure 7:
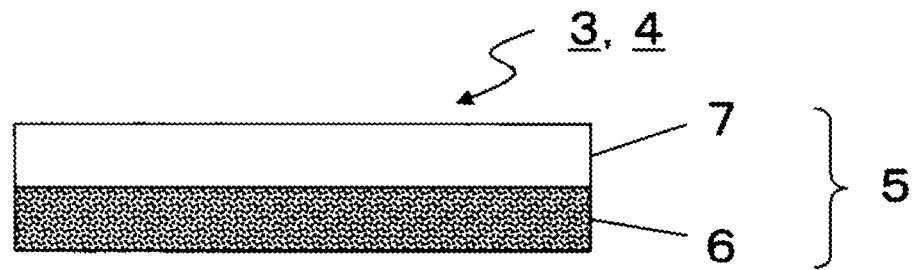
FIG. 7 is a cross-sectional view showing one example of another embodiment of the layer configuration of the outer layer film or the inner layer film.
Figure 8:
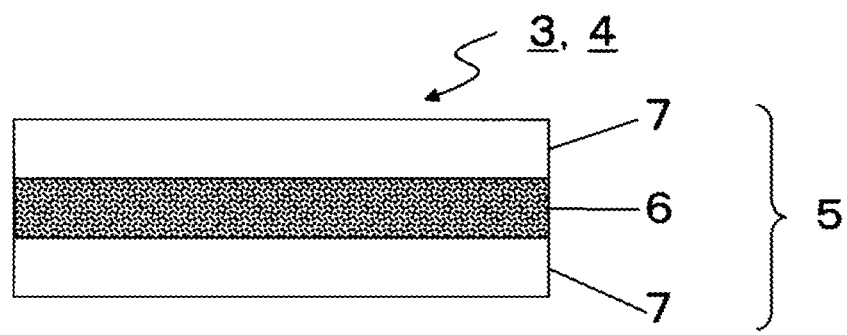
FIG. 8 is a cross-sectional view showing one example of a further alternative embodiment of the layer configuration of the outer layer film or the inner layer film.

The sealant layer having the odor-adsorbing layer may be a layer consisting of the odor-adsorbing layer as shown in FIG. 6, or may have a multilayered structure with a non-odor-adsorbing layer containing low elutable polyethylene but containing no odor adsorbent material, in order to improve sealing strength and interlayer adhesion strength, as shown in FIG. 7 or 8.

Figure 9:
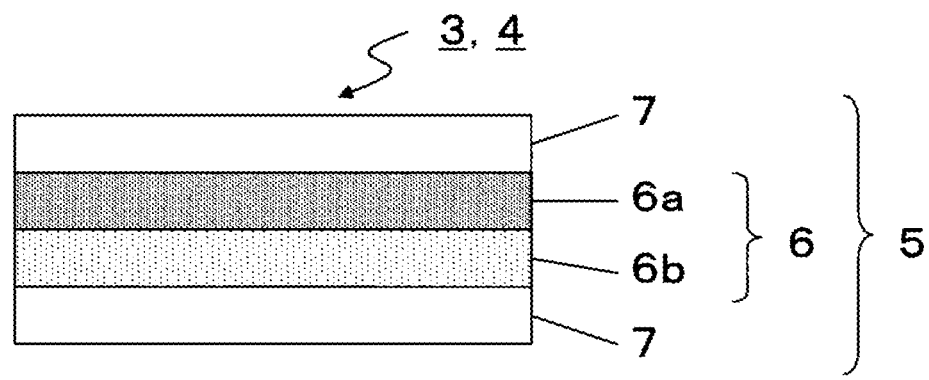
FIG. 9 is a cross-sectional view showing one example of a further alternative embodiment of the layer configuration of the outer layer film or the inner layer film.

As shown in FIG. 9, the odor-adsorbing layer may have a multilayered structure having the same or different types of low elutable polyethylene as a main component or the same or different types or contents of the odor adsorbent material.

In a packaging bag using the odor-adsorbing sealant film of the present invention, an innermost layer, which comes into contact with liquid contents, may be an odor-adsorbing layer or may be a non-odor-adsorbing layer. The non-odor-adsorbing layer serving as an innermost layer can improve the sealing strength of the packaging bag. The odor-adsorbing layer serving as an innermost layer can improve interlayer adhesion strength within the packaging bag.

Figure 10:
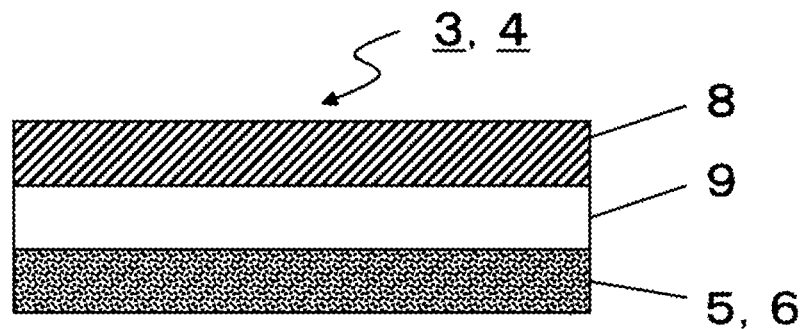
FIG. 10 is a cross-sectional view showing one example of an alternative embodiment of the layer configuration of the outer layer film.

Each of the outer layer film and the inner layer film can also comprise, as shown in FIG. 10, a base material layer, a functional layer such as a reinforcing layer, an adhesion layer, or the like in order to improve the strength of the film or impart various functions thereto. Particularly, the outer layer film preferably comprises a base material layer. A layer known in the art can be laminated for use as the base material layer, the functional layer, or the adhesion layer by a method known in the art.

<Sealant Layers of Outer Layer Film and Inner Layer Film>

The sealant layer of the inner layer film comprises an odor-adsorbing layer and may further comprise a non-odor-adsorbing layer.

The sealant layer of the outer layer film can comprise a non-odor-adsorbing layer and/or an odor-adsorbing layer.

[Odor-Adsorbing Layer]

The odor-adsorbing layer according to the present invention comprise a resin composition comprising low elutable polyethylene and an odor adsorbent material.

The resin composition may further comprise general-purpose polyethylene, polypropylene, a methylpentene polymer, an acid-modified polyolefin resin, and a mixture of these thermoplastic resins, etc., without inhibiting the low eluting properties or heat sealing properties of the sealant film, though the resin is not limited thereto.

In one embodiment of the present invention, the odor-adsorbing layer has a single-layered configuration formed using a resin composition obtained by kneading the odor adsorbent material and the low elutable polyethylene. In this context, the odor adsorbent material may be uniformly dispersed in the layer or may be dispersed with a concentration gradient.

For example, the odor adsorbent material may be dispersed with a concentration gradient on the increase from the inner surface toward the outer surface at the time of package formation. This configuration improves heat sealing properties. In contrast to this, the odor adsorbent material may be dispersed with a concentration gradient on the decrease from the inner surface toward the outer surface at the time of package formation. This configuration improves interlayer adhesion strength.

Alternatively, the odor adsorbent material may be dispersed with a concentration gradient on the decrease from the central portion in the thickness direction of the odor-adsorbing layer toward both surfaces. This configuration improves heat sealing properties and interlayer adhesion strength.

In another embodiment, the odor-adsorbing layer may have a multilayered configuration in which two or more layers are laminated. In this context, these layers may comprise resin compositions differing in the type of the low elutable polyethylene as a main component or the type or content of the odor adsorbent material.

The total layer thickness of the odor-adsorbing layer can be at least 5 μm for film formation and is preferably 10 μm to 200 μm for obtaining favorable film formability, heat sealing properties, interlayer adhesion strength and odor-adsorbing properties.

The odor adsorbent material comprises hydrophobic zeolite and can further comprise a chemical adsorbent-supported inorganic porous material.

The hydrophobic zeolite or the chemical adsorbent-supported inorganic porous material may be mixed and kneaded directly with the low elutable polyethylene. Alternatively, a so-called master batch system may be performed, which involves mixing the hydrophobic zeolite or the chemical adsorbent-supported inorganic porous material at a high concentration with a thermoplastic resin, then preparing a master batch by melt kneading, and mixing and melt-kneading this master batch with the low elutable polyethylene at a ratio appropriate for the target content percentages.

In the present invention, the amount of the hydrophobic zeolite added can be at least 0.05% by mass of the hydrophobic zeolite contained in the sealant layer comprising the odor-adsorbing layer, for exerting a sufficient odor-adsorbing effect, and is preferably 0.1% by mass or more, more preferably 0.25% by mass or more, for obtaining a favorable odor-adsorbing effect as a package. On the other hand, the content of the hydrophobic zeolite is preferably 13% by mass or less, more preferably 10% by mass or less, for obtaining favorable film formability at the time of laminate preparation and, in addition, for achieving favorable heat sealing properties.

The content of the chemical adsorbent-supported inorganic porous material can be at least 0.05° by mass of the chemical adsorbent-supported inorganic porous material contained in the sealant layer comprising the odor-adsorbing layer, for exerting a sufficient adsorbing effect, and is preferably 0.1% by mass or more, more preferably 0.25% by mass or more, for obtaining a favorable adsorbing effect as a package.

On the other hand, the content of the chemical adsorbent-supported inorganic porous material is preferably 10% by mass or less, more preferably 9% by mass or less, in the sealant layer comprising the odor-adsorbing layer, for obtaining favorable film formability at the time of laminate preparation and, in addition, for achieving favorable heat sealing properties.

[Low Elutable Polyethylene]

In the present invention, the sealant layer of each of the outer layer film and the inner layer film has heat sealing properties and contains low elutable polyethylene attaining a small amount of organic matter eluted.

Such a small amount of organic matter eluted can decrease the concentration of organic matter eluted into liquid contents packed in the package of the present invention and suppress change in taste and odor.

In this context, the concentration of the organic matter in liquid contents is indicated by the concentration of TOC (total organic carbon) in the present invention.

TOC represents the total concentration organic matter (organic carbon) oxidizable in water by the concentration of carbon. TOC is used as a typical water quality index and is standardized by JIS K 0805 (automatic total organic carbon (TOC) analyzer), etc.

The concentration of elutable TOC contained in a film consisting of the low elutable polyethylene is 1.5 ppm or higher and 250 ppm or lower.

In this context, the concentration of elutable TOC as to the low elutable polyethylene as a single raw material is measured in a film state, not in a state such as raw material pellets, because the low elutable polyethylene may increase the amount of TOC eluted by the application of various heat histories, etc. during film preparation such as sealant layer formation.

After packing of 1 kg of distilled water as filling water into a 15 cm×44 cm×50 μm thick pouch packaging bag prepared from the low elutable polyethylene according to the present invention, followed by elution, the increased concentration of TOC in the filling water is preferably 0.01 ppm or higher and 1.5 ppm or lower, more preferably 0.02 ppm or higher and 1.45 ppm or lower, further preferably 0.025 ppm or higher and 1.4 ppm or lower.

If the increased concentration of TOC in the filling water is larger than 1.5 ppm, it is difficult to suppress change in taste and odor of the filling water. In order to obtain this concentration of smaller than 0.01 ppm, effects are limited though cost is high. The range described above is preferred from the viewpoint of the balance between cost and performance.

In order to specifically determine the increased concentration of TOC, for example, 1000 g of distilled water of 40° C. to 80° C. is packed as filling water into the pouch packaging bag described above, which is then stored at 25° C. to 50° C. for several days to 4 weeks. Then, the TOC concentration of the filling water is measured using a total organic carbon meter or HS-GC. The TOC concentration of the distilled water as a blank can be subtracted therefrom to determine the increased concentration of TOC.

In the present invention, the increased concentration of TOC is determined by a standard method which involves preparing a package of a pouch bag (15 cm×44 cm) using the outer layer film, the inner layer film, and the odor-adsorbing sealant film, packing thereinto 1000 g of water (distilled water for high-performance liquid chromatography, Junsei Chemical Co., Ltd.) of 65° C. to prepare a liquid-packed package, which is then stored at 35° C. for 2 weeks, and then measuring the TOC concentration of the filling water using TOC-L total organic carbon meter manufactured by Shimadzu Corp.

Then, the concentration of elutable TOC contained in the sealant film is calculated from the obtained increased TOC concentration of the filling water, parts by mass of the filling water, and parts by mass of the sealant film.

Specific examples of the low elutable polyethylene include low-elution resins such as low-density polyethylene (LDPE), medium-density polyethylene (MDPE), high-density polyethylene (HDPE), linear low-density polyethylene (LLDPE), ethylene-vinyl acetate copolymers, ethylene-ethyl acrylate copolymers, ethylene-acrylic acid copolymers, ethylene-methacrylic acid copolymers, ethylene-methyl methacrylate copolymers, and ethylene-propylene copolymers, and mixtures of these resins, though the low elutable polyethylene is not limited to these resins.

Examples of the method for decreasing the amount of organic matter eluted from a low elutable polyethylene film include, but are not limited to, the following methods.

Decrease in residual amounts of unreacted raw materials or amounts of low-molecular-weight products or by-products, or the removal of a polymerization catalyst in the production of the polyethylene is effective. A specific method involves improving a raw material purity, precisely controlling conditions such as a reaction temperature or a pressure, removing unreacted raw materials, low-molecular-weight products, by-products or a polymerization catalyst by distillation or washing, or preventing oxidation ascribable to contact with oxygen in air at a high temperature.

For the pelletization of the produced polyethylene, a method involves restricting use of a lubricant, an antioxidant, and other additives which may elevate the amount of organic matter eluted.

For the film preparation of the polyethylene, a method involves restricting use of a lubricant, an antioxidant, a solvent, and other additives which may elevate the amount of organic matter eluted, or preventing oxidation ascribable to a high temperature.

In the present invention, the sealant layer has heat sealing properties and contains low elutable polyethylene. Thus, a packaging material prepared from the odor-adsorbing sealant film has excellent heat sealing properties, attains a small amount of organic matter eluted, and can reduce increase in TOC concentration in liquid contents in the package.

The polyethylene is suitable because of its properties of being resistant to sterilization/disinfection treatment such as UV and being less decomposable.

Among these low elutable polyethylenes, the type is preferably LLDPE. Since LLDPE having a C4, C6, or C8 side chain tends to be capable of decreasing the amount of organic matter eluted, C4-LLDPE, C6-LLDPE, C8-LLDPE, or the like is more preferred.

In this context, C4, C6, or C8 means that a monomer having the described numerical value as the number of carbon atoms is present at a side chain by partial copolymerization with LLDPE. For example, C4 represents a side chain having a butene-1 structure; C6 represents a side chain having a hexene-1 or 4-methylpentene-1 structure; and C8 represents a side chain having an octene-1 structure.

Alternatively, low elutable polyethylene having a density of 0.90 $g/cm^3$ or larger and 0.94 $g/cm^3$ or smaller is preferred, and low elutable polyethylene having a density of 0.905 $g/cm^3$ or larger and 0.933 $g/cm^3$ or smaller is more preferred. The low elutable polyethylene having a density within this range tends to be capable of decreasing the amount of organic matter eluted.

The low elutable polyethylene may contain a small amount of an additive such as an antioxidant or an antiblocking agent.

The low elutable polyethylene according to the present invention is preferably excellent in resistance to pinholes attributed to flexion when singly prepared into a film.

As for the pinhole resistance of the low elutable polyethylene according to the present invention, for example, the number of pinholes formed after 5000 Gelbo flexes at 23° C. in a 50 µm thick film consisting of the low elutable polyethylene singly is preferably 0 or 1 or more and 160 or less.

When the number of pinholes formed in the sealant film falls within the range described above, a packaging material workable for an application requiring pinhole resistance can be prepared.

[Odor Adsorbent Material]

In the present invention, the odor adsorbent material comprises specific hydrophobic zeolite and can further comprise a chemical adsorbent-supported inorganic porous material.

(Hydrophobic Zeolite)

The hydrophobic zeolite is the same as in the object 1.

(Chemical Adsorbent-Supported Inorganic Porous Material)

In the present invention, the chemical adsorbent-supported inorganic porous material is an inorganic porous material on which a chemical adsorbent is supported, and has the function of adsorbing elutable organic matter, or odor substances generated from packages during disinfection/sterilization treatment such as UV irradiation, γ ray irradiation, EB irradiation, hot packing, or boiling.

A supporting method known in the art or commonly used can be applied to a supporting method. For example, the inorganic porous material can be impregnated with a solution containing the chemical adsorbent described below, and dried for supporting.

In the present invention, the containment of the odor adsorbent material containing the chemical adsorbent-supported inorganic porous material in an odor-adsorbing layer can drastically enhance adsorbing ability per unit mass of the chemical adsorbent and can decrease the content of the chemical adsorbent-supported inorganic porous material in the odor-adsorbing layer. Furthermore, the physical adsorption characteristics of the pore portion of the inorganic porous material can also be expected.

Owing to such a decreased content, the sealant film acquires high sealing strength and can retain excellent heat sealing properties and film formability required for sealant films.

The chemical adsorbent-supported inorganic porous material can have an arbitrary outer shape such as a spherical, rod-like, or elliptic shape and may be in any form such as a powder, a mass, or particles. The form of a powder is preferred from the viewpoint of the film formability of the odor-adsorbing layer, uniform dispersion in a thermoplastic resin, kneading characteristics, etc.

The chemical adsorbent-supported inorganic porous material can be appropriately selected so as to have an arbitrary average particle size according to a purpose. In the present invention, the average particle size is particularly preferably 0.01 µm to 10 µm, more preferably 0.1 µm to 8 µm, further preferably 1 µm to 7 µm. In this context, the average particle size is a value measured by a dynamic light scattering method.

If the average particle size is smaller than 0.01 µm, the chemical adsorbent-supported inorganic porous material aggregates easily with a tendency to reduce the dispersibility of the chemical adsorbent-supported inorganic porous material in the low elutable polyethylene.

If the average particle size is larger than 10 µm, it tends to be difficult to add a large amount of the chemical adsorbent-supported inorganic porous material because the odor-adsorbing layer has poor film formability. The possibility arises that a sufficient adsorbing effect is not obtained.

(Inorganic Porous Material)

In the present invention, an arbitrary inorganic compound having many pores on its surface can be used as the inorganic porous material. Examples thereof include zeolite, silicon dioxide, silicate, activated carbon, titania, inorganic phosphate such as calcium phosphate, alumina, aluminum hydroxide, magnesium hydroxide, and mixtures thereof.

Particularly, aluminum hydroxide, zeolite, or silicate is preferably utilized from the viewpoint of a porous state with a pore size effective for the molecular size or cluster size of a substance to be adsorbed, and safety.

The inorganic porous material can have an arbitrary outer shape such as a spherical, rod-like, or elliptic shape and may be in any form such as a powder, a mass, or particles. The form of a powder is preferred from the viewpoint of the film formability of the odor-adsorbing layer after preparation of the odor adsorbent material by the supporting of the chemical adsorbent, uniform dispersion in a thermoplastic resin, kneading characteristics, etc.

The inorganic porous material can be appropriately selected so as to have an arbitrary average particle size according to a purpose. In the present invention, the average particle size is particularly preferably 0.01 µm to 10 µm, more preferably 0.1 µm to 8 µm, further preferably 1 µm to 7 µm, for obtaining the chemical adsorbent-supported inorganic porous material having the average particle size described above.

(Chemical Adsorbent)

The chemical adsorbent is the same as in the object 1.

<Method for Preparing Outer Layer Film or Inner Layer Film>

(Method for Dispersing Odor Adsorbent Material)

A kneading method known in the art or commonly used can be applied to a method for kneading the odor adsorbent material and the low elutable polyethylene.

The odor adsorbent material may be mixed and kneaded directly with the low elutable polyethylene. Alternatively, a so-called master batch system may be performed, which involves mixing the odor adsorbent material at a high concentration with a thermoplastic resin, then preparing a master batch by melt kneading, and mixing and melt-kneading this master batch with the low elutable polyethylene at a ratio appropriate for the target content percentages.

The content percentage of the hydrophobic zeolite in the master batch is preferably 0.5% by mass or more and 40% by mass or less, more preferably 1% by mass or more and 20% by mass or less.

The content percentage of the chemical adsorbent-supported inorganic porous material in the master batch is preferably 0.5% by mass or more and 40% by mass or less, more preferably 1% by mass or more and 20% by mass or less.

The master batch system can homogeneously disperse the odor adsorbent material into the low elutable polyethylene even if the combination of the odor adsorbent material with the low elutable polyethylene, which easily causes aggregation, is used.

In this respect, the thermoplastic resin in the master batch may or may not be the same as the low elutable polyethylene in the odor-adsorbing layer. Low elutable polyethylenes of the same type or the low elutable polyethylene and a thermoplastic resin of different type may be combined according to a purpose.

For example, provided that the odor adsorbent material and the low elutable polyethylene are melt-mixed in advance, homogeneous and favorable film formability, heat sealing properties, interlayer adhesion strength and odor-adsorbing properties can be obtained by mixing or melt kneading with the low elutable polyethylene again.

Examples of the thermoplastic resin other than the low elutable polyethylene in the odor-adsorbing layer include polyolefin resins such as general-purpose non-low-elutable polyethylene, polypropylene, methylpentene polymers, and acid-modified polyolefin resins, and mixtures of these resins, though the thermoplastic resin is not limited to these resins.

The thermoplastic resin preferably has low eluting properties equivalent to that of the low elutable polyethylene according to the present invention, and a general-purpose thermoplastic resin can be used without having a significant adverse effect on the amount of organic matter eluted from the whole sealant layer.

(Film Formation and Lamination Methods)

In the present invention, the film formation and lamination methods for each layer of the outer layer film or the inner layer film are not particularly limited, and a film formation method and a lamination method known in the art or commonly used can be applied thereto.

The odor-adsorbing layer or the non-odor-adsorbing layer may be laminated onto a different layer, optionally via an adhesion layer, by extrusion coating, or, for example, a plurality of odor-adsorbing layers and non-odor-adsorbing layers may be formed by coextrusion according to an inflation method or a casting method.

For the lamination by extrusion coating, first, a resin composition forming the odor-adsorbing layer or a resin composition forming the non-odor-adsorbing layer is melted by heating, expanded and extended in a necessary width direction using a T-die, and extruded into a curtain-like form. The melted resin is allowed to flow down onto a surface to be laminated, which is then sandwiched between a rubber roll and a cooled metal roll to perform the formation of the odor-adsorbing layer or the non-odor-adsorbing layer and its adhesive bonding and lamination to the surface to be laminated at the same time.

For the lamination by extrusion coating, the melt flow rate (MFR) of the low elutable polyethylene contained in the odor-adsorbing layer or the thermoplastic resin contained in the non-odor-adsorbing layer is preferably 0.2 to 50 g/10 min, more preferably 0.5 to 30 g/10 min. In the present specification, MFR is a value measured by an approach conforming to JIS K 7210.

If MFR is less than 0.2 g/min or more than 50 g/min, processing suitability is less effective.

In the case of using an inflation method, the melt flow rate (MFR) of the low elutable polyethylene contained in the odor-adsorbing layer or the thermoplastic resin contained in the non-odor-adsorbing layer is preferably 0.2 to 10.0 g/10 min, more preferably 0.2 to 9.5 g/10 min.

If MFR is less than 0.2 g/10 min or more than 10.0 g/10 min, processing suitability tends to be poor.

Alternatively, the odor-adsorbing layer and the non-odor-adsorbing layer film-formed in advance may be laminated via an adhesion layer by dry lamination, non-solvent lamination, sand lamination, or the like.

<Adhesion Layer>

In the present invention, an adhesion layer may be provided between layers in the sealant layer or between the sealant layer and the base material layer, etc. for lamination.

The adhesion layer may comprise an adhesive or an arbitrary anchor coating agent.

The adhesive can be of thermosetting type, ultraviolet cure type, electron beam cure type, or the like and may be in any form such as an aqueous, solution, emulsion, or dispersed form. Its nature is in any form such as a film or sheet, a powder, or a solid. The adhesion mechanism may be in any form such as chemical reaction, solvent volatilization, heat melting, or thermal compression.

The adhesion layer can be an EC (extrusion coating) layer or a layer comprising an adhesive for dry lamination, an adhesive for non-solvent lamination, or the like.

Examples of the component forming such an adhesion layer include polyvinyl acetate adhesives such as polyvinyl acetate and vinyl acetate-ethylene copolymers, polyacrylic acid adhesives consisting of a copolymer of polyacrylic acid with polystyrene, polyester, polyvinyl acetate, or the like, cyano acrylate adhesives, ethylene copolymer adhesives consisting of a copolymer of ethylene with a monomer such as vinyl acetate, ethyl acrylate, acrylic acid, or methacrylic acid, cellulose adhesives, polyurethane adhesives, polyester adhesives, polyamide adhesives, polyimide adhesives, polyolefin adhesives such as LDPE, amino resin adhesives consisting of urea resin or melamine resin, phenol resin adhesives, epoxy adhesives, reactive (meth)acrylic adhesives, elastomer adhesives consisting of chloroprene rubber, nitrile rubber, styrene-butadiene rubber, or the like, silicone adhesives, and inorganic adhesives consisting of alkali metal silicate, low-melting glass, or the like.

For example, an organotitanium, isocyanate, polyethylenimine, acid-modified polyethylene, or polybutadiene anchor coating agent can be used as the anchor coating agent.

In the case of laminating the adhesion layer by extrusion coating, a layer to be adhesively bonded can be extrusion-coated with the adhesive to form the adhesion layer, though the method is not particularly limited thereto.

For the extrusion coating, first, the adhesive is melted by heating, expanded and extended in a necessary width direction using a T-die, and extruded into a curtain-like form. The melted product is allowed to flow down onto a layer to be adhesively bonded, which is then sandwiched between a rubber roll and a cooled metal roll to perform the formation of the adhesion layer and its adhesive bonding and lamination to the layer to be adhesively bonded at the same time.

In the case of using an adhesive for dry lamination in the adhesion layer, the adhesive dispersed or dissolved in a solvent is applied onto one of the layers and dried, and the other layer to be adhesively bonded is overlaid and laminated thereto. Then, the adhesive is cured by aging at 30 to 120° C. for several hours to several days for lamination.

In the case of using an adhesive for non-solvent lamination, the adhesive itself is applied, without being dispersed or dissolved in a solvent, onto one of the layers and dried, and the other layer to be adhesively bonded is overlaid and laminated thereto. Then, the adhesive is cured by aging at 30 to 120° C. for several hours to several days for lamination.

The adhesion layer is formed by, for example, roll coating, gravure roll coating, or kiss coating with the adhesive. The amount of coating is desirably on the order of 0.1 to 10 $g/m^2$ (dry state). When the amount of coating with the adhesive falls within the range described above, favorable adhesiveness is obtained.

For the lamination by sand lamination, an arbitrary resin that can be melted by heating and applied to an extruder can be used in the adhesion layer. Specifically, the thermoplastic resin for use in the non-odor-adsorbing layer described above can be preferably used.

<Packaging Material>

The odor-adsorbing sealant film of the present invention can be used directly or after being laminated with a base material layer or a functional layer, if necessary, to prepare a packaging material. The odor-adsorbing sealant film of the present invention is also suitable, particularly, for a packaging material for a liquid content for BIB.

<Package and Liquid Content Packaging Bag for BIB>

The package of the present invention is used as, for example, a liquid content packaging bag for BIB and subjected to the packing of contents in a hermetically sealed state with its content spout capped. Specifically, the hermetically sealed liquid content package for BIB, when used for an ordinary purpose, is placed in a cardboard box and supplied to a user. The hermetically sealed liquid content package for BIB, when used in aseptic packaging, is disinfected with an electron beam, a γ ray, ethylene oxide gas, or the like and then supplied to a user.

Figure 11:
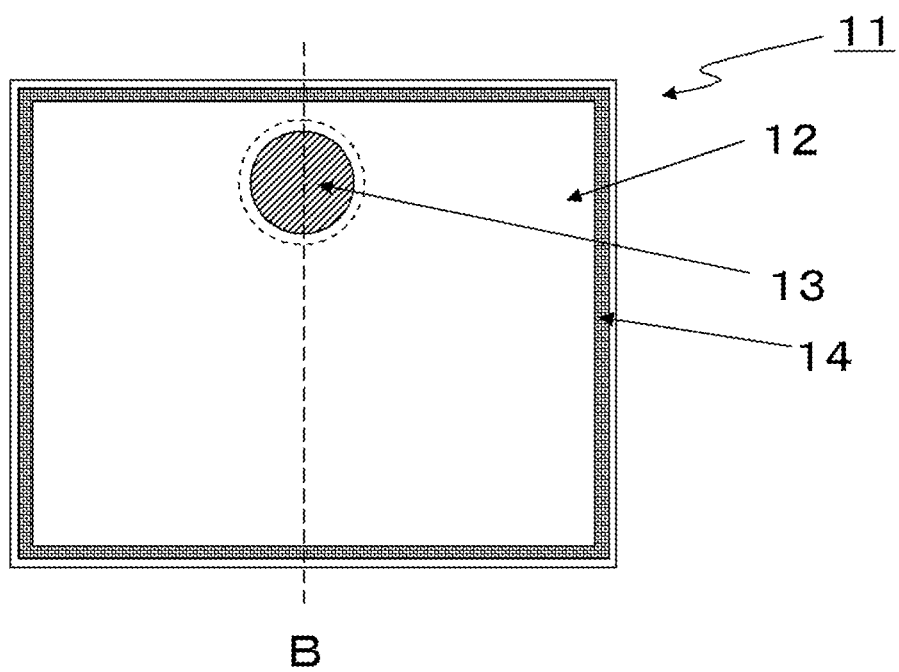
FIG. 11 is a diagram showing the adsorption mechanism of a chemical adsorbent-supported inorganic porous material for an odor substance.

The liquid content packaging bag for BIB of the present invention is constituted by, for example, as shown in FIG. 11, at least a double-bag portion comprising a packaging material prepared from the odor-adsorbing sealant film of the present invention, and a content spout comprising a resin molded article.

Figure 12:
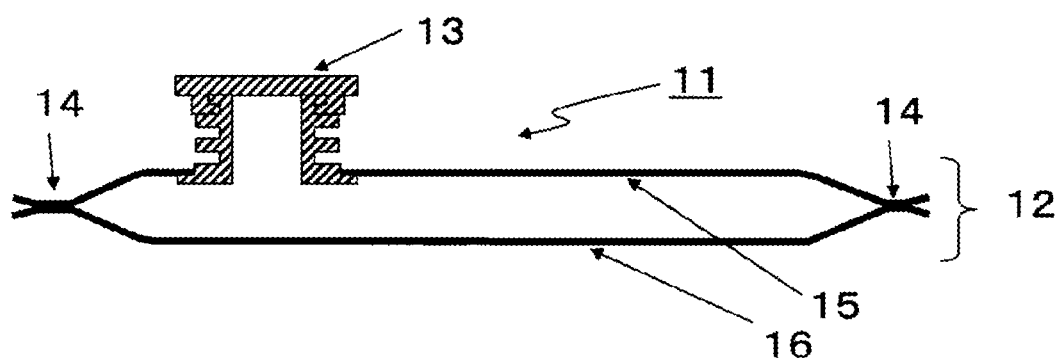
FIG. 12 is a schematic plane view showing one example of a liquid content packaging bag for BIB.
Object 3 (FIGS. 13 to 15)
Figure 13:
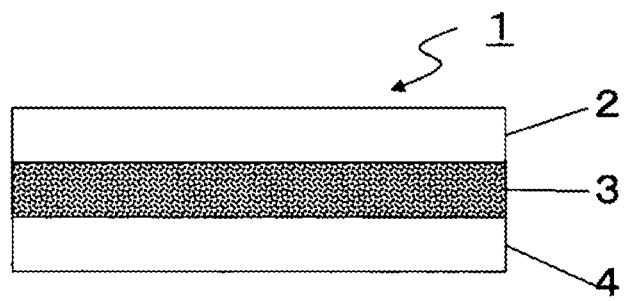
FIG. 13 is a schematic cross-sectional view showing one example of the layer configuration of the odor-adsorbing laminate of the present invention.
Figure 14:
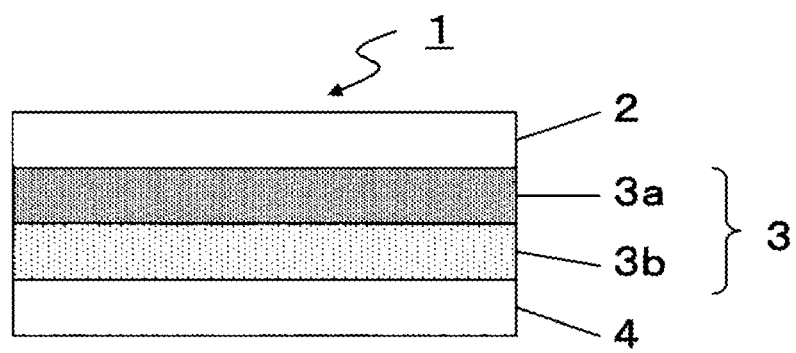
FIG. 14 is a schematic cross-sectional view showing one example of another embodiment of the layer configuration of the odor-adsorbing laminate of the present invention.
Figure 15:
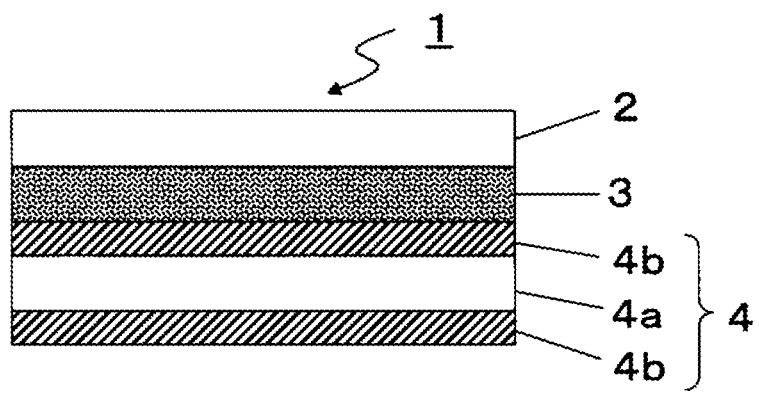
FIG. 15 is a schematic cross-sectional view showing one example of a further alternative embodiment of the layer configuration of the odor-adsorbing laminate of the present invention.
Objects 4 and 5 (FIGS. 16 to 24)

The double-bag portion is constituted by, as shown in FIG. 11 or 12, an upper film and a lower film, and the content spout is installed in the upper film.

<Liquid Content>

In the present invention, the liquid contents refer to general liquids such as drinking water, juices, drip infusions, seasoning liquids such as soy sauce and sauce, soups, honey, baste, and dressing.

[Method for Preparing Package]

The package of the present invention can be prepared, for example, as shown in FIG. 12, by bending a packaging material or overlaying two packaging materials such that the sealant layer of the content spout-installed upper film and the sealant layer of the lower film are opposed to each other, and heat-sealing peripheral edges in a heat-seal form, for example, lateral seal type, two-sided seal type, three-sided seal type, four-sided seal type, envelope-like seal type, center seal type (pillow seal type), pleated seal type, flat bottom seal type, square bottom seal type, or a gazette type.

A method known in the art, for example, bar sealing, rotating roll sealing, belt sealing, impulse sealing, high-frequency sealing, or ultrasonic sealing can be applied to a heat sealing method.

The method for installing the content spout in the upper film involves making a hole at a content spout installation position of the upper film, inserting the content spout to the hole from the inner side of the upper film, fixing the inner face of the upper film to the outer side of a flange of the content spout by heat sealing, and further capping the content spout to create a hermetically sealed state.

<Content Spout>

The content spout is an entrance and/or exit port through which contents are packed and/or taken out. The contents may be packed into and taken out of one content spout, or two or more content spouts may be provided and the contents can be packed into and taken out of the separate content spouts.

The content spout is not particularly limited by its installation position and is preferably installed at or near any of four sides of the package.

The content spout contains a polyolefin resin. Specific examples of the polyolefin resin include, but are not limited to, polyethylene resins (LDPE, MDPE, HDPE, LLDPE, etc.), various ethylene copolymers, polypropylene resins, cyclic polyolefin resins, methylpentene polymers, and acid-modified polyolefin resins.

The melt flow rate of the polyolefin resin is preferably 5 g/min or more and 100 g/min or less from the viewpoint of moldability.

The content spout can also contain various plastic compounding agents, additives, or the like for the purpose of improving or modifying processability, heat resistance, weather resistance, mechanical properties, dimensional stability, antioxidative properties, lubricity, mold release properties, flame retardancy, antimycotic properties, electric characteristics, strength, etc.

The content spout may further contain low elutable polyethylene or an odor adsorbent material, if necessary.

The content spout can be obtained by mixing and kneading various raw materials described above by a method known in the art to prepare a resin composition, and molding the resin composition by a method known in the art.

Object 3

<Layer Configuration of Odor-Adsorbing Laminate>

The odor-adsorbing laminate of the present invention comprises at least a base material layer, an adhesion layer, and a sealant layer, wherein the adhesion layer and/or the sealant layer contains an odor adsorbent material.

<Odor Adsorbent Material>

In the present invention, the odor adsorbent material comprises specific hydrophobic zeolite and can further comprise a chemical adsorbent-supported inorganic porous material.

The odor adsorbent material may be mixed and kneaded directly with a resin constituting each layer. A so-called master batch system may be used, which involves mixing the odor adsorbent material at a high concentration with thermoplastic resin A, then preparing a master batch by melt kneading, and mixing and melt-kneading this master batch with the resin constituting each layer at a ratio appropriate for the target content percentages.

[Master Batching of Odor Adsorbent Material]

The master batching can homogeneously disperse the odor adsorbent material into the resin constituting each layer even if the combination of the odor adsorbent material with the resin, which easily causes aggregation, is used.

A kneading method known in the art or commonly used can be applied to a method for kneading the odor adsorbent material and the thermoplastic resin A.

In this respect, the thermoplastic resin A in the master batch may or may not be the same as the resin in each layer. Resins of the same type or resins of different types may be combined according to a purpose.

For example, provided that the thermoplastic resin A is the same as the resin constituting each layer, homogeneous and favorable film formability, interlayer adhesion strength, heat sealing properties, etc. can be retained and excellent odor-adsorbing properties can be obtained, by mixing or melt kneading with the thermoplastic resin A again for each layer.

The content percentage of the odor adsorbent material in the master batch is preferably 0.5% by mass or more and 40% by mass or less, more preferably 1% by mass or more and 20% by mass or less.

The content percentage of the hydrophobic zeolite in the master batch is preferably 0.5% by mass or more and 40% by mass or less, more preferably 1% by mass or more and 20% by mass or less.

The content percentage of the chemical adsorbent-supported inorganic porous material in the master batch is preferably 0.5% by mass or more and 40% by mass or less, more preferably 1% by mass or more and 20% by mass or less.

[Thermoplastic Resin A]

In the master batch of the odor adsorbent material, the thermoplastic resin A dispersing the odor adsorbent material is not particularly limited as long as the thermoplastic resin is capable of dispersing the odor adsorbent material in the master batch and is easily kneaded and homogenized with good affinity for the resin of each layer to be supplemented with the master batch. Resins of the same type or resins of different types may be combined according to a purpose.

[Hydrophobic Zeolite]

Zeolite having a higher $SiO_2/Al_2O_3$ molar ratio generally has higher hydrophobicity. In the present invention, the hydrophobic zeolite contained in the odor-adsorbing layer preferably has a $SiO_2/Al_2O_3$ molar ratio of 30/1 to 8000/1.

The hydrophobic zeolite can exert an odor-eliminating effect by the adsorption of odor components without losing the ability to adsorb odor even when a package or a packaging material is exposed to 230° C. or higher.

The hydrophobic zeolite can have an arbitrary outer shape such as a spherical, rod-like, or elliptic shape and may be in any form such as a powder, a mass, or particles. The form of a powder is preferred from the viewpoint of uniform dispersion in a resin, kneading characteristics, subsequent film formability, etc.

In the present invention, the average particle size of the hydrophobic zeolite can be appropriately selected as an arbitrary average particle size and is preferably an average particle size of 0.01 μm to 10 μm. In this context, the average particle size is a value measured by a dynamic light scattering method.

If the average particle size is smaller than 0.01 μm, the hydrophobic zeolite aggregates easily with a tendency to reduce dispersibility in a resin. If the average particle size is larger than 10 μm, it tends to be difficult to add a large amount of the hydrophobic zeolite because film formability tends to be poor. Furthermore, the possibility arises that a sufficient odor-eliminating effect is not obtained, because the surface area is also decreased.

The hydrophobic zeolite, which is hydrophobic, has the difficulty in adsorbing highly polar water molecules or the like, but has high affinity for low polar odor molecules, hydrophobic gases, and lipophilic gases (including solvent gases) and easily adsorbs them. The zeolite surface exhibits basicity by the action of an alkali metal and an alkaline earth metal, such as Ca, Na, and K, present on the zeolite surface, and easily adsorbs acidic gases through neutralization reaction.

[Chemical Adsorbent-Supported Inorganic Porous Material]

In the present invention, the chemical adsorbent-supported inorganic porous material is an inorganic porous material on which a chemical adsorbent is supported, and has the function of adsorbing elutable organic matter, or odor substances generated from packages during disinfection/sterilization treatment such as UV irradiation, γ ray irradiation, EB irradiation, hot packing, or boiling.

A supporting method known in the art or commonly used can be applied to a supporting method. For example, the inorganic porous material can be impregnated with a solution containing the chemical adsorbent described below, and dried for supporting.

In the present invention, the containment of the odor adsorbent material containing the chemical adsorbent-supported inorganic porous material in an odor-adsorbing layer can drastically enhance adsorbing ability per unit mass of the chemical adsorbent and can decrease the content of the chemical adsorbent-supported inorganic porous material in the odor-adsorbing layer. Furthermore, the physical adsorption characteristics of the pore portion of the inorganic porous material can also be expected.

Owing to such a decreased content, the resin composition containing the chemical adsorbent-supported inorganic porous material can retain excellent film formability, adhesiveness, sealing strength, etc.

The chemical adsorbent-supported inorganic porous material can have an arbitrary outer shape such as a spherical, rod-like, or elliptic shape and may be in any form such as a powder, a mass, or particles. The form of a powder is preferred from the viewpoint of the film formability of the odor-adsorbing layer, uniform dispersion in a thermoplastic resin, kneading characteristics, etc.

The chemical adsorbent-supported inorganic porous material can be appropriately selected so as to have an arbitrary average particle size according to a purpose. In the present invention, the average particle size is particularly preferably 0.01 µm to 10 µm, more preferably 0.1 µm to 8 µm, further preferably 1 µm to 7 µm. In this context, the average particle size is a value measured by a dynamic light scattering method.

If the average particle size is smaller than 0.01 µm, the chemical adsorbent-supported inorganic porous material aggregates easily with a tendency to reduce the dispersibility of the chemical adsorbent-supported inorganic porous material in a resin.

If the average particle size is larger than 10 µm, it tends to be difficult to add a large amount of the chemical adsorbent-supported inorganic porous material because the resin composition containing the chemical adsorbent-supported inorganic porous material easily has poor film formability. The possibility arises that a sufficient adsorbing effect is not obtained.

(Inorganic Porous Material)

In the present invention, an arbitrary inorganic compound having many pores on its surface can be used as the inorganic porous material. Examples thereof include zeolite, silicon dioxide, silicate, activated carbon, titania, inorganic phosphate such as calcium phosphate, alumina, aluminum hydroxide, magnesium hydroxide, and mixtures thereof.

Particularly, aluminum hydroxide, zeolite, or silicate is preferably utilized from the viewpoint of a porous state with a pore size effective for the molecular size or cluster size of a substance to be adsorbed, and safety.

The inorganic porous material can have an arbitrary outer shape such as a spherical, rod-like, or elliptic shape and may be in any form such as a powder, a mass, or particles. The form of a powder is preferred from the viewpoint of uniform dispersion in a resin after preparation of the chemical adsorbent-supported inorganic porous material by the supporting of the chemical adsorbent, kneading characteristics, the film formability of the resin composition containing the chemical adsorbent-supported inorganic porous material, etc.

The inorganic porous material can be appropriately selected so as to have an arbitrary average particle size according to a purpose. In the present invention, the average particle size is particularly preferably 0.01 µm to 10 µm, more preferably 0.1 µm to 8 µm, further preferably 1 µm to 7 µm, for obtaining the chemical adsorbent-supported inorganic porous material having the average particle size described above.

(Chemical Adsorbent)

The chemical adsorbent is the same as in the object 1.

<Base Material Layer>

A film or a sheet, such as a resin film or sheet, synthetic paper, or a paper base material, which is generally used in packaging materials for packaging bags can be used as the base material layer contained in the odor-adsorbing laminate of the present invention. A film or a sheet excellent in mechanical strength such as tensile strength, flexural strength, and impact strength and also excellent in printability is preferred.

The base material layer may be constituted by one layer or by two or more layers. The two or more layers may be layers having the same composition or may be layers differing in composition.

A monoaxially or biaxially drawn resin film or sheet is preferred.

Specific examples of the resin include: polyester resins such as polyethylene terephthalate (PET), polybutylene terephthalate (PBT), and polyethylene naphthalate; polyamide resins such as nylon 6, nylon 66, and MXD6 (poly-m-xylylene adipamide); cellophane; polyolefin resins such as polyethylene resins, polypropylene resins, and acid-modified polyolefin resins; polystyrene resins; polyurethane resins; acetal resins; and EVOH.

In the case of using the odor-adsorbing laminate of the present invention as a packaging material, a suitable resin can be freely selected for use according to the type of contents to be packaged and use conditions such as the presence or absence of heating treatment after packing. Among those described above, a polyester resin or a polyamide resin is preferred.

Particularly, a monoaxially or biaxially drawn polyethylene terephthalate film or sheet or a biaxially drawn polypropylene film or sheet, etc. is suitable.

The resin film or sheet for use in the base material layer can be supplemented, if necessary, with, for example, plastic compounding agents or additives such as a lubricant, a cross-linking agent, an antioxidant, an ultraviolet absorber, a light stabilizer, a filler, a reinforcing agent, an antistatic agent, and a pigment for the purpose of improving or modifying processability, heat resistance, weather resistance, mechanical properties, dimensional stability, antioxidative properties, lubricity, mold release properties, flame retardancy, antimycotic properties, electric characteristics, strength, etc. The amount of these agents added can be an arbitrary amount according to a purpose without having an adverse effect on different performance.

Specifically, for example, a hard sized bleached or unbleached paper base material, or pure white roll paper, kraft paper, paper board, coated paper, cast coated paper, processed paper, or high-quality paper can be used as the paper base material.

A paper base material having a basis weight of approximately 80 to 600 $g/m^2$, preferably a basis weight of approximately 100 to 450 $g/m^2$, can be used.

A metal or a metal oxide may be vapor-deposited on the resin film or sheet for use in the base material layer.

The base material layer and the film or the sheet constituting the base material layer may be subjected in advance to physical treatment such as corona discharge treatment, ozone treatment, low-temperature plasma treatment using oxygen gas or nitrogen gas, or glow discharge treatment, or chemical treatment such as oxidation treatment using a chemical agent, before lamination in order to improve adhesion properties.

Alternatively, various coating agent layers such as a primer coating agent layer, an undercoating agent layer, an anchor coating agent layer, an adhesive layer, and a vapor-deposited anchor coating agent layer may be arbitrarily formed on the surface of the thermoplastic resin layer to prepare a surface-treated layer.

For example, a resin composition composed mainly of a vehicle such as a polyester resin, a polyamide resin, a polyurethane resin, an epoxy resin, a phenol resin, a (meth) acrylic resin, a polyvinyl acetate resin, a polyolefin resin such as polyethylene or polypropylene or a copolymer or modified resin thereof, or a cellulose resin can be used in various coating agent layers described above.

The thickness of the base material layer is preferably 10 μm or larger and 50 μm or smaller, more preferably 15 μm or larger and 40 μm or smaller.

If the thickness is smaller than the range described above, it tends to be difficult to exert high bag drop strength due to too low rigidity of the laminate. If the thickness is larger than the range described above, too high rigidity of the laminate facilitates difficult processing of the laminate and also facilitates worsening content packing properties.

<Adhesion Layer>

In the odor-adsorbing laminate of the present invention, an adhesion layer may be provided between layers such as the base material layer, the sealant layer, and other layers, and between layers in each layer having a multilayered configuration, for lamination.

<Adhesion Layer Containing Odor Adsorbent Material>

The adhesion layer can contain an odor adsorbent material.

The adhesion layer can further contain an adhesive suitable for use in combination with the odor adsorbent material. Furthermore, the adhesion layer can comprise an odor-adsorbing adhesion layer containing an odor adsorbent material and an adhesive, and a non-odor-adsorbing adhesion layer containing no odor adsorbent material but having an adhesive. The non-odor-adsorbing adhesion layer is preferably in contact with one side or both sides of the odor-adsorbing adhesion layer.

The content of the odor adsorbent material in the adhesion layer is preferably 0.3% by mass or more and 50% by mass or less.

The content of the hydrophobic zeolite in the adhesion layer can be at least 0.05% by mass of the hydrophobic zeolite contained in the whole adhesion layer, for exerting a sufficient odor-adsorbing effect, and is more preferably 0.3% by mass or more for obtaining a favorable odor-adsorbing effect as a package. On the other hand, the content of the hydrophobic zeolite is preferably 50% by mass or less for obtaining favorable film formability at the time of laminate preparation and, in addition, for achieving favorable adhesiveness.

The content of the chemical adsorbent-supported inorganic porous material in the adhesion layer can be at least 0.05% by mass of the chemical adsorbent-supported inorganic porous material contained in the whole adhesion layer, for exerting a sufficient adsorbing effect, and is preferably 0.3% by mass or more for obtaining a favorable adsorbing effect as a package.

On the other hand, the content of the chemical adsorbent-supported inorganic porous material in the whole adhesion layer is preferably 10% by mass or less for obtaining favorable film formability at the time of laminate preparation and, in addition, for achieving favorable adhesiveness.

The adhesion layer can be a layer formed by various systems such as EC (extrusion coating), dry lamination, non-solvent lamination, and sand lamination.

When the adhesion layer is a dry lamination adhesion layer or a non-solvent lamination adhesion layer, the contents of the odor adsorbent material, the hydrophobic zeolite, and the chemical adsorbent-supported inorganic porous material are preferably in the ranges described above.

When the adhesion layer is an EC (extrusion coating) adhesion layer or a sand lamination adhesion layer, the content of the odor adsorbent material is preferably 0.3% by mass or more and 15% by mass or less for the same reason as above. The content of the hydrophobic zeolite is preferably 0.3% by mass or more and 15% by mass or less. The content of the chemical adsorbent-supported inorganic porous material is preferably 0.3% by mass or more and 10% by mass or less. In the case of comprising hydrophobic zeolite and a chemical adsorbent-supported inorganic porous material, the content of the hydrophobic zeolite is preferably 0.3% by mass or more and 13% by mass or less, and the content of the chemical adsorbent-supported inorganic porous material is preferably 0.3% by mass or more and 10% by mass or less.

Although the method for forming the adhesion layer by extrusion coating or sand lamination is not particularly limited, first, a resin composition for forming the adhesion layer is melted by heating, expanded and extended in a necessary width direction using a T-die, and extruded into a curtain-like form. The melted product is allowed to flow down onto a layer to be adhesively bonded, which is then sandwiched between a rubber roll and a cooled metal roll to perform the formation of the adhesion layer and its adhesive bonding and lamination to the layer to be adhesively bonded at the same time.

In the case of forming the adhesion layer by dry lamination, the resin composition dispersed or dissolved in a solvent is applied onto one of the layers and dried, and the other layer to be adhesively bonded is overlaid and laminated thereto. Then, the resin composition is cured by aging at 30 to 120° C. for several hours to several days for lamination.

Examples of the application method described above include roll coating, gravure roll coating, and kiss coating. The amount of coating is desirably on the order of 0.1 to 10 g/m$^2$ (dry state). When the amount of coating with the resin composition falls within the range described above, favorable adhesiveness is obtained.

In the case of forming the adhesion layer by non-solvent lamination, the solvent-free resin composition is applied onto one of the layers, and the other layer to be adhesively bonded is overlaid and laminated thereto. Then, the resin composition is cured by aging at 30 to 120° C. for several hours to several days for lamination.

Examples of the application method described above include roll coating, gravure roll coating, and kiss coating. The amount of coating is desirably on the order of 0.1 to 15 g/m$^2$. When the amount of coating with the resin composition falls within the range described above, favorable adhesiveness is obtained.

[Adhesive Suitable for Use in Combination with Odor Adsorbent Material]

The adhesive suitable for use in combination with the odor adsorbent material can be of thermosetting type, ultraviolet cure type, electron beam cure type, or the like and may be in any form such as an aqueous, solution, emulsion, or dispersed form. Its nature is in any form such as a film or sheet, a powder, or a solid. The adhesion mechanism may be in any form such as chemical reaction, solvent volatilization, heat melting, or thermal compression.

Specific examples of the adhesive include polyvinyl acetate adhesives such as polyvinyl acetate and vinyl acetate-ethylene copolymers, polyacrylic acid adhesives consisting of a copolymer of polyacrylic acid with polystyrene, polyester, polyvinyl acetate, or the like, cyano acrylate adhesives, ethylene copolymer adhesives consisting of a copolymer of ethylene with a monomer such as vinyl acetate, ethyl acrylate, acrylic acid, or methacrylic acid, cellulose adhesives, polyurethane adhesives, polyester adhesives, polyamide adhesives, polyimide adhesives, polyolefin adhesives such as LDPE, amino resin adhesives consisting of urea resin or melamine resin, phenol resin adhesives, epoxy adhesives, reactive (meth)acrylic adhesives, elastomer adhesives consisting of chloroprene rubber, nitrile rubber, styrene-butadiene rubber, or the like, silicone adhesives, and inorganic adhesives consisting of alkali metal silicate, low-melting glass, or the like, and further, anchor coating agents.

For example, an organotitanium, isocyanate, polyethylenimine, acid-modified polyethylene, or polybutadiene anchor coating agent can be used as the anchor coating agent.

The adhesive is preferably one or two or more members selected from the group consisting of a polyurethane resin, a polyester resin, a polyamide resin, and a polyolefin resin among them.

<Sealant Layer>

The sealant layer is a layer that imparts heat sealing properties and functions such as flex resistance and impact resistance to the laminate.

The sealant layer may be constituted by one layer or by two or more layers. The two or more layers may be layers having the same composition or may be layers differing in composition.

The sealant layer of the odor adsorbent material of the present invention preferably contains thermoplastic resin C.

The sealant layer can further comprise an odor-adsorbing sealant layer and a non-odor-adsorbing sealant layer. The non-odor-adsorbing sealant layer is preferably in contact with one side or both sides of the odor-adsorbing sealant layer.

The content of the odor adsorbent material in the whole sealant layer is preferably 0.3% by mass or more and 15% by mass or less.

The content of the hydrophobic zeolite in the whole sealant layer can be at least 0.05% by mass of the hydrophobic zeolite contained in the whole sealant layer, for exerting a sufficient odor-adsorbing effect, and is preferably 0.1% by mass or more, more preferably 0.25% by mass or more, for obtaining a favorable odor-adsorbing effect as a package. On the other hand, the content of the hydrophobic zeolite is preferably 13% by mass or less, more preferably 10% by mass or less, for obtaining favorable film formability at the time of laminate preparation and, in addition, for achieving favorable heat sealing properties.

The content of the chemical adsorbent-supported inorganic porous material in the whole sealant layer can be at least 0.05% by mass of the chemical adsorbent-supported inorganic porous material contained in the whole sealant layer, for exerting a sufficient adsorbing effect, and is preferably 0.1% by mass or more, more preferably 0.25% by mass or more, for obtaining a favorable adsorbing effect as a package.

On the other hand, the content of the chemical adsorbent-supported inorganic porous material in the whole sealant layer is preferably 10% by mass or less, more preferably 9% by mass or less, for obtaining favorable film formability at the time of laminate preparation and, in addition, for achieving favorable heat sealing properties.

The thickness of the sealant layer is preferably 5 to 500 μm, more preferably 10 to 250 μm. A thickness smaller than the range described above facilitates difficult obtainment of sufficient heat sealing strength. A thickness larger than the range described above incurs elevation of cost and tends to facilitate hardening a film and worsening workability.

[Thermoplastic Resin C]

In the present invention, the thermoplastic resin C is a resin that may be used in the sealant layer and has heat sealing properties. Its melt flow rate is preferably 0.2 g/10 min or more and 10.0 g/10 min or less, more preferably 0.2 g/10 min or more and 9.5 g/10 min or less. In the present specification, MFR is a value measured by an approach conforming to JIS K 7210.

If MFR is less than 0.2 g/min or more than 10 g/min, processing suitability is less effective.

Specific examples of the thermoplastic resin C include, but are not limited to, polyethylene, low-density polyethylene, medium-density polyethylene, high-density polyethylene, linear low-density polyethylene, metallocene polyethylene, polypropylene, ethylene-vinyl acetate copolymers, ionomer resins, ethylene-ethyl (meth)acrylate copolymers, ethylene-(meth)acrylic acid copolymers, ethylene-propylene copolymers, methylpentene polymers, polyolefin resins such as polyethylene and polypropylene, modified polyolefin resins obtained by modifying the polyolefin resins with unsaturated carboxylic acid such as acrylic acid, methacrylic acid, maleic anhydride, or fumaric acid, ethylene-(meth)acrylic acid ester-unsaturated carboxylic acid ternary copolymer resins, cyclic polyolefin resins, cyclic olefin copolymers, polyethylene terephthalate (PET), and polyacrylonitrile (PAN).

Among those described above, a polyolefin resin is preferably contained from the viewpoint of heat sealing properties. Particularly, low-density polyethylene (LDPE) or linear low-density polyethylene (LLDPE) is preferably contained, and LLDPE is particularly preferably contained.

The thermoplastic resin C may comprise a small amount of an additive such as an antioxidant or an antiblocking agent and may be supplemented, if necessary, with a flex resistance improving agent, an inorganic or organic additive, or the like known in the art.

Furthermore, the thermoplastic resin C is preferably excellent in resistance to pinholes attributed to flexion when singly prepared into a film.

Pinhole resistance is important, particularly, for packaging materials for foods or medical products, etc. because fatigue failure progresses in packages due to local repeated flexion ascribable to vibration during a packaging step or during transport so that pinholes are formed.

As for the pinhole resistance of the thermoplastic resin C according to the present invention, for example, the number of pinholes formed after 5000 Gelbo flexes at 23° C. in a 50 μm thick film consisting of thermoplastic resin C singly is preferably 0 or 1 or more and 160 or less.

When the number of pinholes formed in the sealant film falls within the range described above, a packaging material workable for an application requiring pinhole resistance can be prepared.

[Odor-Adsorbing Sealant Layer]

The odor-adsorbing sealant layer according to the present invention is a layer formed from a resin composition comprising thermoplastic resin C and an odor adsorbent material.

In one embodiment of the present invention, the odor-adsorbing sealant layer has a single-layered configuration formed using a resin composition obtained by kneading the odor adsorbent material and the thermoplastic resin C. In this context, the odor adsorbent material may be uniformly dispersed in the layer or may be dispersed with a concentration gradient.

For example, the odor adsorbent material may be dispersed with a concentration gradient on the increase from the inner surface toward the outer surface at the time of package formation. This configuration improves heat sealing properties. In contrast to this, the odor adsorbent material may be dispersed with a concentration gradient on the decrease from the inner surface toward the outer surface at the time of package formation. This configuration improves interlayer adhesion strength.

Alternatively, the odor adsorbent material may be dispersed with a concentration gradient on the decrease from the central portion in the thickness direction of the odor-adsorbing sealant layer toward both surfaces. This configuration improves heat sealing properties and interlayer adhesion strength.

In another embodiment, the odor-adsorbing sealant layer may have a multilayered configuration in which two or more layers are laminated. In this context, these layers may comprise resin compositions differing in the type of the thermoplastic resin C or the type or content of the odor adsorbent material.

An additional component may be further contained without inhibiting odor-adsorbing properties or heat sealing properties.

The total layer thickness of the odor-adsorbing sealant layer can be at least 5 μm for film formation and is preferably 10 μm to 200 μm for obtaining favorable film formability, heat sealing properties, interlayer adhesion strength and odor-adsorbing properties.

[Non-Odor-Adsorbing Sealant Layer]

The non-odor-adsorbing sealant layer according to the present invention is a layer containing thermoplastic resin C and containing no odor adsorbent material.

The non-odor-adsorbing sealant layer containing no odor adsorbent material is superior in heat sealing properties to the odor-adsorbing sealant layer containing the odor adsorbent material. Because of this property, the non-odor-adsorbing sealant layer is preferably laminated on one side or both sides of the odor-adsorbing sealant layer. This lamination configuration enables the odor-adsorbing sealant layer to be adhesively bonded firmly in a laminate and enables laminates to be heat-sealed firmly.

(Film Formation and Lamination Methods for Sealant Layer)

In the present invention, the film formation and lamination methods for the sealant layer are not particularly limited, and a film formation method and a lamination method known in the art or commonly used can be applied thereto. The sealant layer can be formed by, for example, an inflation method, a casting method, or an extrusion method (or a coextrusion method).

The sealant layer film-formed in advance may be laminated on the multiple layers via an adhesion layer by dry lamination, non-solvent lamination, sand lamination, or the like.

Alternatively, on the multiple layers, an extrusion method is used for a multilayered configuration. A resin composition forming the sealant layer is melted by heating, expanded and extended in a necessary width direction using a T-die, and extruded into a curtain-like form. The melted resin is allowed to flow down onto a surface to be laminated, which is then sandwiched between a rubber roll and a cooled metal roll to perform the formation of the sealant layer and its adhesive bonding and lamination to the surface to be laminated at the same time. The adhesive bonding may be performed via an adhesive layer, if necessary.

In this context, in any of the film formation and lamination methods described above, the sealant layer may be constituted by a plurality of odor-adsorbing sealant layers or non-odor-adsorbing sealant layers, and these layers may be adhesively bonded via an adhesive.

<Odor-Adsorbing Film for Packaging Material>

The odor-adsorbing laminate of the present invention can be used as an odor-adsorbing film for a packaging material.

<Odor-Adsorbing Packaging Material>

The odor-adsorbing film for a packaging material of the present invention can be used to prepare an odor-adsorbing packaging material.

In order to prepare a packaging bag using the odor-adsorbing packaging material of the present invention, the packaging bag can be prepared, for example, by bending the packaging material or overlaying two such packaging materials such that faces having favorable heat sealing properties are opposed to each other, and heat-sealing peripheral edges in a heat-seal form, for example, lateral seal type, two-sided seal type, three-sided seal type, four-sided seal type, envelope-like seal type, center seal type (pillow seal type), pleated seal type, flat bottom seal type, square bottom seal type, or a gazette type.

A method known in the art, for example, bar sealing, rotating roll sealing, belt sealing, impulse sealing, high-frequency sealing, or ultrasonic sealing can be applied to a heat sealing method.

<Odor-Adsorbing Packaging Material for BIB>

The odor-adsorbing packaging material of the present invention can be used as an odor-adsorbing packaging material for BIB.

The odor-adsorbing packaging material of the present invention can be used as an odor-adsorbing liquid content packaging material for BIB, particularly, intended for liquid contents.

In the present invention, examples of the liquid contents can include general liquids such as drinking water, juices, drip infusions, seasoning liquids such as soy sauce and sauce, soups, honey, baste, and dressing.

Object 4

<Package and Liquid Content Package for BIB>

Figure 16:
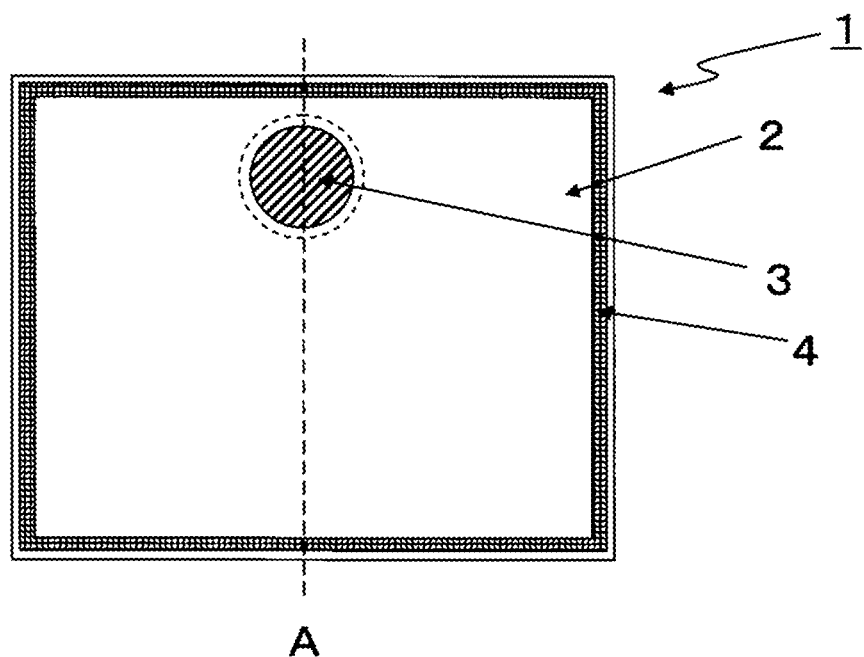
FIG. 16 is a schematic plane view showing one example of the package of the present invention.

The package of the present invention is constituted by, for example, as shown in FIG. 16, at least a double-bag portion and a content spout comprising a resin molded article.

Figure 17:
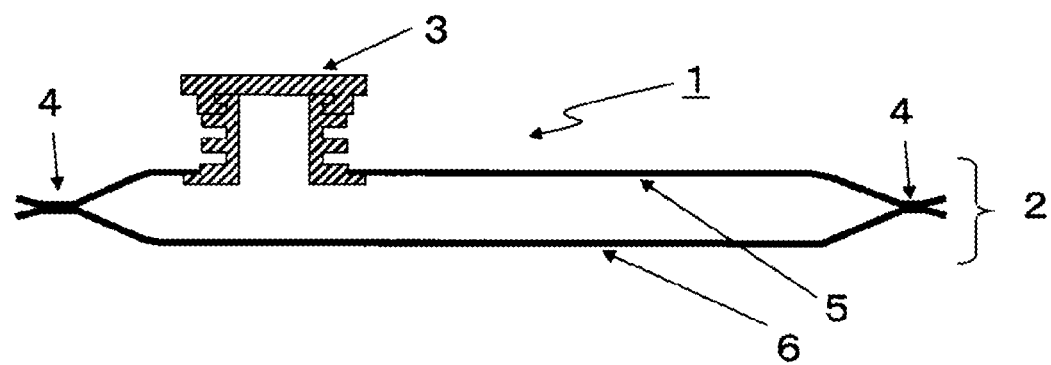
FIG. 17 shows one example of a schematic cross-sectional view taken along cross-sectional line A of the package in FIG. 16.

The double-bag portion is constituted by, as shown in FIG. 17, an upper film and a lower film, and the content spout is installed in the upper film.

Figure 18:
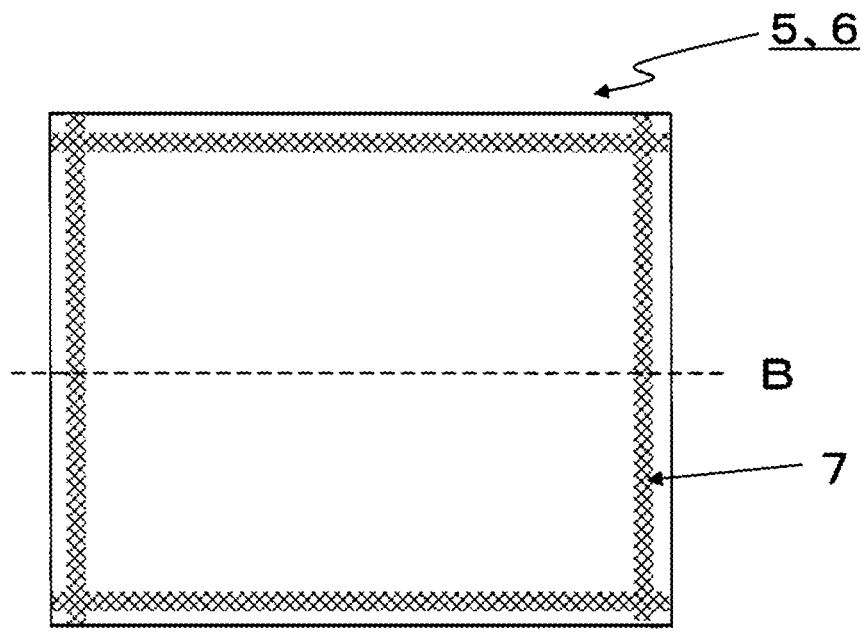
FIG. 18 is a schematic plane view showing one example of an inner layer film.
Figure 19:
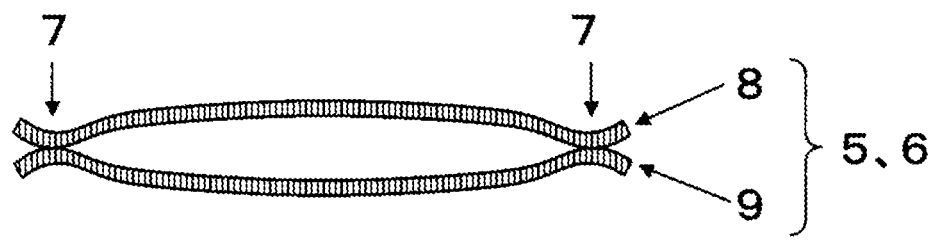
FIG. 19 shows one example of a schematic cross-sectional view taken along cross-sectional line B of the inner layer film in FIG. 18.

Each of the upper film and the lower film comprises, as shown in FIG. 18 or 19, at least an outer layer film and an inner layer film. The outer layer film and the inner layer film are adhesively bonded only partially to each other.

The adhesively bonded portion between the outer layer film and the inner layer film is preferably located at least at the periphery of the package and is in a lattice shape composed of continuous lines, in a shape composed of discontinuous lines, or in a dot shape.

The package of the present invention is used as, for example, a liquid content package for BIB and subjected to the packing of contents in a hermetically sealed state with its content spout capped. Specifically, the hermetically sealed liquid content package for BIB, when used for an ordinary purpose, is placed in a cardboard box and supplied to a user. The hermetically sealed liquid content package for BIB, when used in aseptic packaging, is disinfected with an electron beam, a γ ray, ethylene oxide gas, or the like and then supplied to a user.

For the package of the present invention, pinhole resistance is important, particularly, for packaging materials for foods or medical products, etc. because fatigue failure progresses due to local repeated flexion ascribable to vibration during a packaging step or during transport, or due to the contact of a content spout so that pinholes, which cause leakage of liquid contents in liquid content packages for BIB used, are formed.

[Method for Preparing Package]

The package of the present invention can be prepared, for example, as shown in FIG. 17, by bending a packaging material or overlaying two packaging materials such that the sealant layer of the content spout-installed upper film and the sealant layer of the lower film are opposed to each other, and heat-sealing peripheral edges in a heat-seal form, for example, lateral seal type, two-sided seal type, three-sided seal type, four-sided seal type, envelope-like seal type, center seal type (pillow seal type), pleated seal type, flat bottom seal type, square bottom seal type, or a gazette type.

A method known in the art, for example, bar sealing, rotating roll sealing, belt sealing, impulse sealing, high-frequency sealing, or ultrasonic sealing can be applied to a heat sealing method.

The method for installing the content spout in the upper film involves making a hole at a content spout installation position of the upper film, inserting the content spout to the hole from the inner side of the upper film, fixing the inner face of the upper film to the outer side of a flange of the content spout by heat sealing, and further capping the content spout to create a hermetically sealed state.

<Content Spout>

The content spout is an entrance and/or exit port through which contents are packed and/or taken out. The contents may be packed into and taken out of one content spout, or two or more content spouts may be provided and the contents can be packed into and taken out of the separate content spouts.

The content spout is not particularly limited by its installation position and is preferably installed at or near any of four sides of the package.

The content spout preferably contains a polyolefin resin.

Specific examples of the polyolefin resin include, but are not limited to, polyethylene resins (LDPE, MDPE, HDPE, LLDPE, etc.), various ethylene copolymers, polypropylene resins, cyclic polyolefin resins, methylpentene polymers, and acid-modified polyolefin resins.

The melt flow rate of the polyolefin resin is preferably 5 g/min or more and 100 g/min or less from the viewpoint of moldability.

The content spout can also be supplemented with various plastic compounding agents, additives, or the like for the purpose of improving or modifying processability, heat resistance, weather resistance, mechanical properties, dimensional stability, antioxidative properties, lubricity, mold release properties, flame retardancy, antimycotic properties, electric characteristics, strength, etc.

The content spout can be obtained by mixing and kneading various raw materials described above by a method known in the art to prepare a resin composition, and molding the resin composition by a method known in the art.

The resin contained in the content spout is preferably the polyolefin resin described above, though the resin is not limited thereto. Various thermoplastic resins can be contained without having an adverse effect.

The melt flow rate of the thermoplastic resin contained therein is preferably 5 g/min or more and 100 g/min or less from the viewpoint of moldability.

<Layer Configurations of Outer Layer Film and Inner Layer Film>

Each of the upper film and the lower film constituting the double-bag portion of the liquid content package for BIB of the present invention comprises, as shown in FIG. 18 or 19, at least an outer layer film and an inner layer film. The outer layer film and the inner layer film are adhesively bonded only partially to each other.

Each of the outer layer film and the inner layer film is a film having at least a sealant layer containing low elutable polyethylene.

The sealant layer of the inner layer film comprises an odor-adsorbing layer.

Figure 20:
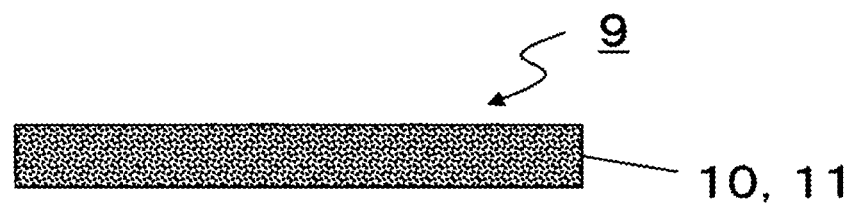
FIG. 20 is a cross-sectional view showing one example of the layer configuration of the inner layer film.
Figure 21:
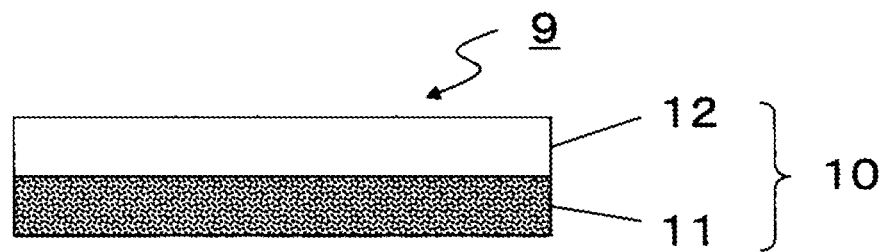
FIG. 21 is a cross-sectional view showing one example of another embodiment of the layer configuration of the inner layer film.
Figure 22:
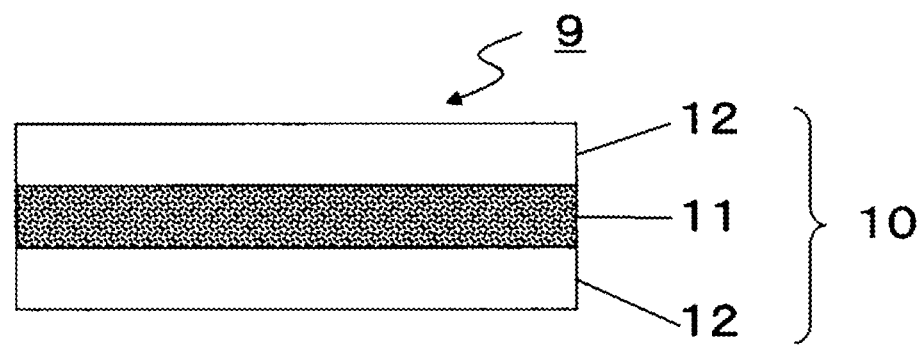
FIG. 22 is a cross-sectional view showing one example of a further alternative embodiment of the layer configuration of the inner layer film.

The sealant layer of the inner layer film may be a layer consisting of the odor-adsorbing layer as shown in FIG. 20, or may have a multilayered structure with a non-odor-adsorbing layer containing low elutable polyethylene but containing no odor adsorbent material, in order to improve sealing strength and interlayer adhesion strength, as shown in FIG. 21 or 22.

Figure 23:
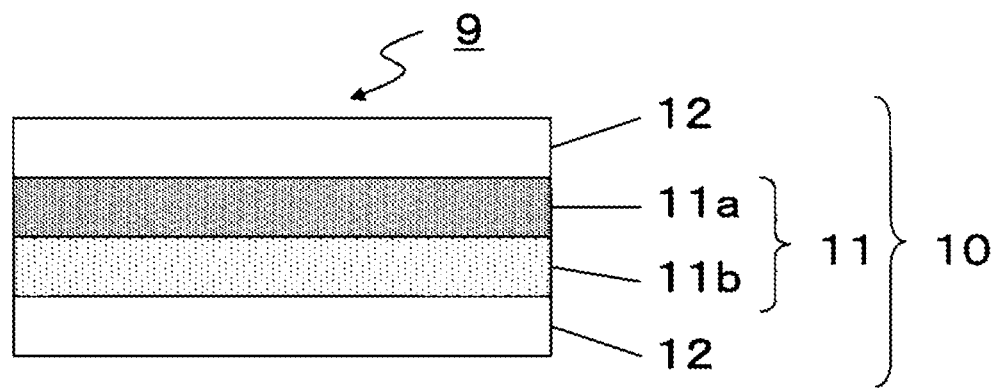
FIG. 23 is a cross-sectional view showing one example of a further alternative embodiment of the layer configuration of the inner layer film.

As shown in FIG. 23, the odor-adsorbing layer may have a multilayered structure having the same or different types of low elutable polyethylene as a main component or the same or different types or contents of the odor adsorbent material.

In the package of the present invention, an innermost layer, which comes into contact with contents, may be an odor-adsorbing layer or may be a non-odor-adsorbing layer. The non-odor-adsorbing layer serving as an innermost layer can improve the sealing strength of the package. The odor-adsorbing layer serving as an innermost layer can improve interlayer adhesion strength within the package.

Figure 24:
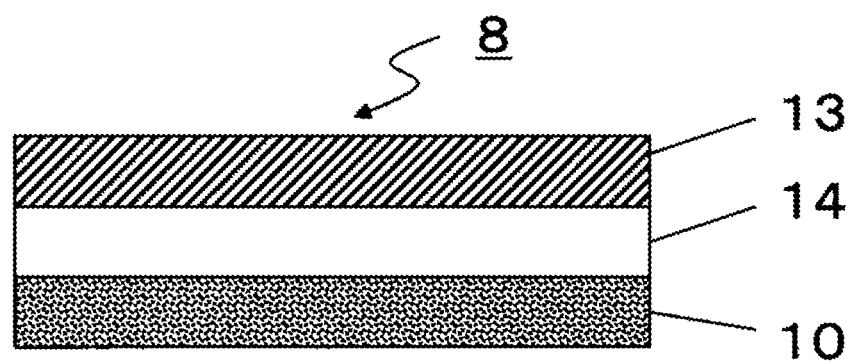
FIG. 24 is a cross-sectional view showing one example of an alternative embodiment of the layer configuration of the inner layer film.

Each of the outer layer film and the inner layer film can also comprise, as shown in FIG. 24, a base material layer, a functional layer such as a reinforcing layer, an adhesion layer, or the like in order to improve the strength of the film or impart various functions thereto. Particularly, the outer layer film preferably comprises a base material layer. A layer known in the art can be laminated for use as the base material layer, the functional layer, or the adhesion layer by a method known in the art.

<Sealant Layers of Outer Layer Film and Inner Layer Film>

The sealant layer of the inner layer film comprises an odor-adsorbing layer and may further comprise a non-odor-adsorbing layer.

The sealant layer of the outer layer film comprises only a non-odor-adsorbing layer and comprises no odor-adsorbing layer.

[Odor-Adsorbing Layer]

The odor-adsorbing layer according to the present invention comprise a resin composition comprising low elutable polyethylene and an odor adsorbent material.

The resin composition may further comprise general-purpose polyethylene, polypropylene, a methylpentene polymer, an acid-modified polyolefin resin, and a mixture of these thermoplastic resins, etc., without inhibiting the low eluting properties or heat sealing properties of the sealant film, though the resin is not limited thereto.

In one embodiment of the present invention, the odor-adsorbing layer has a single-layered configuration formed using a resin composition obtained by kneading the odor adsorbent material and the low elutable polyethylene. In this context, the odor adsorbent material may be uniformly dispersed in the layer or may be dispersed with a concentration gradient.

For example, the odor adsorbent material may be dispersed with a concentration gradient on the increase from the inner surface toward the outer surface at the time of package formation. This configuration improves heat sealing properties. In contrast to this, the odor adsorbent material may be dispersed with a concentration gradient on the decrease from the inner surface toward the outer surface at the time of package formation. This configuration improves interlayer adhesion strength.

Alternatively, the odor adsorbent material may be dispersed with a concentration gradient on the decrease from the central portion in the thickness direction of the odor-adsorbing layer toward both surfaces. This configuration improves heat sealing properties and interlayer adhesion strength.

In another embodiment, the odor-adsorbing layer may have a multilayered configuration in which two or more layers are laminated. In this context, these layers may comprise resin compositions differing in the type of the low elutable polyethylene as a main component or the type or content of the odor adsorbent material.

The total layer thickness of the odor-adsorbing layer can be at least 5 μm for film formation and is preferably 10 μm to 200 μm for obtaining favorable film formability, heat sealing properties, interlayer adhesion strength and odor-adsorbing properties.

The odor adsorbent material comprises hydrophobic zeolite and can further comprise a chemical adsorbent-supported inorganic porous material.

The hydrophobic zeolite or the chemical adsorbent-supported inorganic porous material may be mixed and kneaded directly with the low elutable polyethylene. Alternatively, a so-called master batch system may be performed, which involves mixing the hydrophobic zeolite or the chemical adsorbent-supported inorganic porous material at a high concentration with a thermoplastic resin, then preparing a master batch by melt kneading, and mixing and melt-kneading this master batch with the low elutable polyethylene at a ratio appropriate for the target content percentages.

In the present invention, the amount of the hydrophobic zeolite added can be at least 0.05% by mass of the hydrophobic zeolite contained in the whole sealant layer of the inner layer film, for exerting a sufficient odor-adsorbing effect, and is preferably 0.1% by mass or more, more preferably 0.25% by mass or more, for obtaining a favorable odor-adsorbing effect as a package. On the other hand, the content of the hydrophobic zeolite is preferably 13% by mass or less, more preferably 10% by mass or less, for obtaining favorable film formability at the time of laminate preparation and, in addition, for achieving favorable heat sealing properties.

The content of the chemical adsorbent-supported inorganic porous material can be at least 0.05% by mass of the chemical adsorbent-supported inorganic porous material contained in the whole sealant layer of the inner layer film, for exerting a sufficient adsorbing effect, and is preferably 0.1% by mass or more, more preferably 0.25% by mass or more, for obtaining a favorable adsorbing effect as a package.

On the other hand, the content of the chemical adsorbent-supported inorganic porous material is preferably 10% by mass or less, more preferably 9% by mass or less, in the whole sealant layer of the inner layer film, for obtaining favorable film formability at the time of laminate preparation and, in addition, for achieving favorable heat sealing properties.

[Low Elutable Polyethylene]

In the present invention, the sealant layer of each of the outer layer film and the inner layer film has heat sealing properties and contains low elutable polyethylene attaining a small amount of organic matter eluted.

Such a small amount of organic matter eluted can decrease the concentration of organic matter eluted into liquid contents packed in the package of the present invention and suppress change in taste and odor.

In this context, the concentration of the organic matter in liquid contents is indicated by the concentration of TOC (total organic carbon) in the present invention.

TOC represents the total concentration organic matter (organic carbon) oxidizable in water by the concentration of carbon. TOC is used as a typical water quality index and is standardized by JIS K 0805 (automatic total organic carbon (TOC) analyzer), etc.

The concentration of elutable TOC contained in a film consisting of the low elutable polyethylene is 1.5 ppm or higher and 250 ppm or lower.

In this context, the concentration of elutable TOC as to the low elutable polyethylene as a single raw material is measured in a film state, not in a state such as raw material pellets, because the low elutable polyethylene may increase the amount of TOC eluted by the application of various heat histories, etc. during film preparation such as sealant layer formation.

After packing of 1 kg of distilled water as filling water into a 15 cm×44 cm×50 μm thick pouch packaging bag prepared from the low elutable polyethylene according to the present invention, followed by elution, the increased concentration of TOC in the filling water is preferably 0.01 ppm or higher and 1.5 ppm or lower, more preferably 0.02 ppm or higher and 1.45 ppm or lower, further preferably 0.025 ppm or higher and 1.4 ppm or lower.

If the increased concentration of TOC in the filling water is larger than 1.5 ppm, it is difficult to suppress change in taste and odor of the filling water. In order to obtain this concentration of smaller than 0.01 ppm, effects are limited though cost is high. The range described above is preferred from the viewpoint of the balance between cost and performance.

In order to specifically determine the increased concentration of TOC, for example, 1000 g of distilled water of 40° C. to 80° C. is packed as filling water into the pouch packaging bag described above, which is then stored at 25° C. to 50° C. for several days to 4 weeks. Then, the TOC concentration of the filling water is measured using a total organic carbon meter or HS-GC. The TOC concentration of the distilled water as a blank can be subtracted therefrom to determine the increased concentration of TOC.

In the present invention, the increased concentration of TOC is determined by a standard method which involves preparing a package of a pouch bag (15 cm×44 cm) using the packaging material for a package, the outer layer film, and the inner layer film, packing thereinto 1000 g of water (distilled water for high-performance liquid chromatography, Junsei Chemical Co., Ltd.) of 65° C. to prepare a liquid-packed package, which is then stored at 35° C. for 2 weeks, and then measuring the TOC concentration of the filling water using TOC-L total organic carbon meter manufactured by Shimadzu Corp.

Then, the concentration of elutable TOC contained in the sealant film is calculated from the obtained increased TOC concentration of the filling water, parts by mass of the filling water, and parts by mass of the sealant film.

Specific examples of the low elutable polyethylene include low-elution resins such as low-density polyethylene (LDPE), medium-density polyethylene (MDPE), high-density polyethylene (HDPE), linear low-density polyethylene (LLDPE), ethylene-vinyl acetate copolymers, ethylene-ethyl acrylate copolymers, ethylene-acrylic acid copolymers, ethylene-methacrylic acid copolymers, ethylene-methyl methacrylate copolymers, and ethylene-propylene copolymers, and mixtures of these resins, though the low elutable polyethylene is not limited to these resins.

Examples of the method for decreasing the amount of organic matter eluted from a low elutable polyethylene film include, but are not limited to, the following methods.

Decrease in residual amounts of unreacted raw materials or amounts of low-molecular-weight products or by-products, or the removal of a polymerization catalyst in the production of the polyethylene is effective. A specific method involves improving a raw material purity, precisely controlling conditions such as a reaction temperature or a pressure, removing unreacted raw materials, low-molecular-weight products, by-products or a polymerization catalyst by distillation or washing, or preventing oxidation ascribable to contact with oxygen in air at a high temperature.

For the pelletization of the produced polyethylene, a method involves restricting use of a lubricant, an antioxidant, and other additives which may elevate the amount of organic matter eluted.

For the film preparation of the polyethylene, a method involves restricting use of a lubricant, an antioxidant, a solvent, and other additives which may elevate the amount of organic matter eluted, or preventing oxidation ascribable to a high temperature.

In the present invention, the sealant layer has heat sealing properties and contains low elutable polyethylene. Thus, a packaging material comprising the sealant film has excellent heat sealing properties, attains a small amount of organic matter eluted, and can reduce increase in TOC concentration in liquid contents in the package.

The polyethylene is suitable because of its properties of being resistant to sterilization/disinfection treatment such as UV and being less decomposable.

Among these low elutable polyethylenes, the type is preferably LLDPE. Since LLDPE having a C4, C6, or C8 side chain tends to be capable of decreasing the amount of organic matter eluted, C4-LLDPE, C6-LLDPE, C8-LLDPE, or the like is more preferred.

In this context, C4, C6, or C8 means that a monomer having the described numerical value as the number of carbon atoms is present at a side chain by partial copolymerization with LLDPE. For example, C4 represents a side chain having a butene-1 structure; C6 represents a side chain having a hexene-1 or 4-methylpentene-1 structure; and C8 represents a side chain having an octene-1 structure.

Alternatively, low elutable polyethylene having a density of 0.90 g/cm$^3$ or larger and 0.94 g/cm$^3$ or smaller is preferred, and low elutable polyethylene having a density of 0.905 g/cm$^3$ or larger and 0.933 g/cm$^3$ or smaller is more preferred. The low elutable polyethylene having a density within this range tends to be capable of decreasing the amount of organic matter eluted.

The low elutable polyethylene may contain a small amount of an additive such as an antioxidant or an anti-blocking agent.

The low elutable polyethylene according to the present invention is preferably excellent in resistance to pinholes attributed to flexion when singly prepared into a film.

As for the pinhole resistance of the low elutable polyethylene according to the present invention, for example, the number of pinholes formed after 5000 Gelbo flexes at 23° C. in a 50 µm thick film consisting of the low elutable polyethylene singly is preferably 0 or 1 or more and 160 or less.

When the number of pinholes formed in the sealant layer falls within the range described above, a packaging material workable for an application requiring pinhole resistance can be prepared.

[Odor Adsorbent Material]

In the present invention, the odor adsorbent material comprises specific hydrophobic zeolite and can further comprise a chemical adsorbent-supported inorganic porous material.

(Hydrophobic Zeolite)

Zeolite having a higher $SiO_2/Al_2O_3$ molar ratio generally has higher hydrophobicity. In the present invention, the hydrophobic zeolite contained in the odor-adsorbing layer preferably has a $SiO_2/Al_2O_3$ molar ratio of 30/1 to 8000/1.

The hydrophobic zeolite can exert an odor-eliminating effect by the adsorption of odor components without losing the ability to adsorb odor even when a package or a packaging material is exposed to 230° C. or higher.

The hydrophobic zeolite can have an arbitrary outer shape such as a spherical, rod-like, or elliptic shape and may be in any form such as a powder, a mass, or particles. The form of a powder is preferred from the viewpoint of the film formability of the odor-adsorbing layer, uniform dispersion in polyethylene, kneading characteristics, etc.

In the present invention, the average particle size of the hydrophobic zeolite can be appropriately selected as an arbitrary average particle size and is preferably an average particle size of 0.01 µm to 10 µm. In this context, the average particle size is a value measured by a dynamic light scattering method.

If the average particle size is smaller than 0.01 µm, the hydrophobic zeolite aggregates easily with a tendency to reduce dispersibility in the low elutable polyethylene. If the average particle size is larger than 10 µm, it tends to be difficult to add a large amount of the hydrophobic zeolite because the odor-adsorbing layer tends to have poor film formability. Furthermore, the possibility arises that a sufficient odor-eliminating effect is not obtained, because the surface area is also decreased.

The hydrophobic zeolite, which is hydrophobic, has the difficulty in adsorbing highly polar water molecules or the like, but has high affinity for low polar odor molecules, hydrophobic gases, and lipophilic gases (including solvent gases) and easily adsorbs them. The zeolite surface exhibits basicity by the action of an alkali metal and an alkaline earth metal, such as Ca, Na, and K, present on the zeolite surface, and easily adsorbs acidic gases through neutralization reaction.

(Chemical Adsorbent-Supported Inorganic Porous Material)

In the present invention, the chemical adsorbent-supported inorganic porous material is an inorganic porous material on which a chemical adsorbent is supported, and has the function of adsorbing elutable organic matter, or odor substances generated from packages during disinfection/sterilization treatment such as UV irradiation, γ ray irradiation, EB irradiation, hot packing, or boiling.

A supporting method known in the art or commonly used can be applied to a supporting method. For example, the inorganic porous material can be impregnated with a solution containing the chemical adsorbent described below, and dried for supporting.

In the present invention, the containment of the odor adsorbent material containing the chemical adsorbent-supported inorganic porous material in an odor-adsorbing layer can drastically enhance adsorbing ability per unit mass of the chemical adsorbent and can decrease the content of the chemical adsorbent-supported inorganic porous material in the odor-adsorbing layer. Furthermore, the physical adsorption characteristics of the pore portion of the inorganic porous material can also be expected.

Owing to such a decreased content, the sealant film acquires high sealing strength and can retain excellent heat sealing properties and film formability required for sealant layers.

The chemical adsorbent-supported inorganic porous material can have an arbitrary outer shape such as a spherical, rod-like, or elliptic shape and may be in any form such as a powder, a mass, or particles. The form of a powder is preferred from the viewpoint of the film formability of the odor-adsorbing layer, uniform dispersion in a thermoplastic resin, kneading characteristics, etc.

The chemical adsorbent-supported inorganic porous material can be appropriately selected so as to have an arbitrary average particle size according to a purpose. In the present invention, the average particle size is particularly preferably 0.01 µm to 10 µm, more preferably 0.1 µm to 8 µm, further preferably 1 µm to 7 µm. In this context, the average particle size is a value measured by a dynamic light scattering method.

If the average particle size is smaller than 0.01 µm, the chemical adsorbent-supported inorganic porous material aggregates easily with a tendency to reduce the dispersibility of the chemical adsorbent-supported inorganic porous material in the low elutable polyethylene.

If the average particle size is larger than 10 µm, it tends to be difficult to add a large amount of the chemical adsorbent-supported inorganic porous material because the odor-adsorbing layer has poor film formability. The possibility arises that a sufficient adsorbing effect is not obtained.

(Inorganic Porous Material)

The inorganic porous material is the same as in the object 3.

(Chemical Adsorbent)

In the present invention, the chemical adsorbent is a compound that has a reactive functional group binding through chemical reaction to elutable organic matter, or an odor substance generated by the decomposition, etc. of a resin during disinfection/sterilization treatment, and can be supported onto the inorganic porous material described above.

More specifically, the chemical adsorbent is a compound having a reactive functional group binding to various aldehydes, ketones, carboxylic acids, and the like resulting from disinfection/sterilization treatment such as UV irradiation, γ ray irradiation, EB irradiation, hot packing, or boiling.

Examples of such a compound include compounds having a basic functional group such as an amino group or a hydroxyl group, metal carbonates, metal bicarbonates, and amide group-containing compounds. Specific examples of each compound include, but are not limited to, the following compounds.

Examples of the compound containing an amino group include alkylamine, ethylenediamine, tetramethylenediamine, diethylenetriamine, triethylenetriamine, tetraethylenepentamine, piperazine, m-phenylenediamine, and polyamine.

Examples of the compound having a hydroxyl group include metal hydroxides such as sodium hydroxide, potassium hydroxide, magnesium hydroxide, and iron hydroxide.

Examples of the metal carbonate include sodium carbonate and calcium carbonate.

Examples of the metal carbonate include sodium bicarbonate.

Examples of the amide group-containing compound include 2-acrylamido-2-methylpropanesulfonate.

In the present invention, the chemical adsorbent is preferably a compound having an amino group because the compound particularly exerts an excellent adsorbing effect.

The adsorption mechanism of the chemical adsorbent for an eluted substance to be adsorbed such as organic matter or an odor substance will be described in more detail with reference to specific examples of FIGS. 3(a) to 3(b). However, the present invention is not limited by these examples.

When the substance to be adsorbed (odor substance) is, for example, an acidic odor substance, as shown in FIG. 3(a), for example, a compound having a hydroxyl group can be selected as the chemical adsorbent and supported onto the inorganic porous material to prepare a chemical adsorbent-supported inorganic porous material for use. As a result, the hydroxyl group causes chemical reaction with a carboxyl group so that the substance to be adsorbed is adsorbed.

When the substance to be adsorbed is an aldehyde, as shown in FIG. 3(b), for example, a compound having an amino group can be selected as the chemical adsorbent and supported onto the inorganic porous material to prepare a chemical adsorbent-supported inorganic porous material for use. As a result, the aldehyde group causes chemical reaction with an amino group so that the substance to be adsorbed is adsorbed.

By such chemical adsorption, odor can be efficiently adsorbed without desorbing the substance to be adsorbed (odor substance) once adsorbed.

Unlike a physical adsorbent which adsorbs a substance to be adsorbed (odor substance) and water vapor at the same adsorption site, the chemical adsorbent according to the present invention binds, at its specific functional group, to the substance to be adsorbed and is therefore insusceptible to various substances reducing the ability to adsorb odor, for example, water vapor.

<Non-Odor-Adsorbing Layer>

The non-odor-adsorbing layer according to the present invention is a layer containing low elutable polyethylene and containing no odor adsorbent material.

The non-odor-adsorbing layer may further comprise highly elutable polyethylene, polypropylene, a methylpentene polymer, an acid-modified polyolefin resin, and a mixture of these thermoplastic resins, etc. without inhibiting the low eluting properties or heat sealing properties of the sealant film, though the resin is not limited thereto.

<Method for Preparing Inner Layer Film>

(Method for Dispersing Odor Adsorbent Material)

A kneading method known in the art or commonly used can be applied to a method for kneading the odor adsorbent material and the low elutable polyethylene.

The odor adsorbent material may be mixed and kneaded directly with the low elutable polyethylene. Alternatively, a so-called master batch system may be performed, which involves mixing the odor adsorbent material at a high concentration with a thermoplastic resin, then preparing a master batch by melt kneading, and mixing and melt-kneading this master batch with the low elutable polyethylene at a ratio appropriate for the target content percentages.

The content percentage of the hydrophobic zeolite in the master batch is preferably 0.5% by mass or more and 40% by mass or less, more preferably 1% by mass or more and 20% by mass or less.

The content percentage of the chemical adsorbent-supported inorganic porous material in the master batch is preferably 0.5% by mass or more and 40% by mass or less, more preferably 1% by mass or more and 20% by mass or less.

The master batch system can homogeneously disperse the odor adsorbent material into the low elutable polyethylene even if the combination of the odor adsorbent material with the low elutable polyethylene, which easily causes aggregation, is used.

In this respect, the thermoplastic resin in the master batch may or may not be the same as the low elutable polyethylene in the odor-adsorbing layer. Low elutable polyethylenes of the same type or the low elutable polyethylene and a thermoplastic resin of different type may be combined according to a purpose.

For example, provided that the odor adsorbent material and the low elutable polyethylene are melt-mixed in advance, homogeneous and favorable film formability, heat sealing properties, interlayer adhesion strength and odor-adsorbing properties can be obtained by mixing or melt kneading with the low elutable polyethylene again.

Examples of the thermoplastic resin other than the low elutable polyethylene in the odor-adsorbing layer include polyolefin resins such as general-purpose non-low-elutable polyethylene, polypropylene, methylpentene polymers, and acid-modified polyolefin resins, and mixtures of these resins, though the thermoplastic resin is not limited to these resins.

The thermoplastic resin preferably has low eluting properties equivalent to that of the low elutable polyethylene according to the present invention, and a general-purpose thermoplastic resin can be used without having a significant adverse effect on the amount of organic matter eluted from the whole sealant layer.

(Film Formation and Lamination Methods)

In the present invention, the film formation and lamination methods for each layer of the outer layer film or the inner layer film are not particularly limited, and a film formation method and a lamination method known in the art or commonly used can be applied thereto.

The odor-adsorbing layer or the non-odor-adsorbing layer may be laminated onto a different layer, optionally via an adhesion layer, by extrusion coating, or, for example, a plurality of odor-adsorbing layers and non-odor-adsorbing layers may be formed by coextrusion according to an inflation method or a casting method.

For the lamination by extrusion coating, first, a resin composition forming the odor-adsorbing layer or a resin composition forming the non-odor-adsorbing layer is melted by heating, expanded and extended in a necessary width direction using a T-die, and extruded into a curtain-like form. The melted resin is allowed to flow down onto a surface to be laminated, which is then sandwiched between a rubber roll and a cooled metal roll to perform the formation of the odor-adsorbing layer or the non-odor-adsorbing layer and its adhesive bonding and lamination to the surface to be laminated at the same time.

For the lamination by extrusion coating, the melt flow rate (MFR) of the low elutable polyethylene contained in the odor-adsorbing layer or the thermoplastic resin contained in the non-odor-adsorbing layer is preferably 0.2 to 50 g/10 min, more preferably 0.5 to 30 g/10 min. In the present specification, MFR is a value measured by an approach conforming to JIS K 7210.

If MFR is less than 0.2 g/min or more than 50 g/min, processing suitability is less effective.

In the case of using an inflation method, the melt flow rate (MFR) of the low elutable polyethylene contained in the odor-adsorbing layer or the thermoplastic resin contained in the non-odor-adsorbing layer is preferably 0.2 to 10.0 g/10 min, more preferably 0.2 to 9.5 g/10 min.

If MFR is less than 0.2 g/10 min or more than 10.0 g/10 min, processing suitability tends to be poor.

Alternatively, the odor-adsorbing layer and the non-odor-adsorbing layer film-formed in advance may be laminated via an adhesion layer by dry lamination, non-solvent lamination, sand lamination, or the like.

<Method for Preparing Outer Layer Film>

The outer layer film can be prepared by the same operation as in the inner layer film except that the odor adsorbent material is not dispersed.

<Adhesion Layer>

In the present invention, an adhesion layer may be provided between layers in the sealant layer or between the sealant layer and the base material layer, etc. for lamination.

The adhesion layer may comprise an adhesive or an arbitrary anchor coating agent.

The adhesive can be of thermosetting type, ultraviolet cure type, electron beam cure type, or the like and may be in any form such as an aqueous, solution, emulsion, or dispersed form. Its nature is in any form such as a film or sheet, a powder, or a solid. The adhesion mechanism may be in any form such as chemical reaction, solvent volatilization, heat melting, or thermal compression.

The adhesion layer can be an EC (extrusion coating) layer or a layer comprising an adhesive for dry lamination, an adhesive for non-solvent lamination, or the like.

Examples of the component forming such an adhesion layer include polyvinyl acetate adhesives such as polyvinyl acetate and vinyl acetate-ethylene copolymers, polyacrylic acid adhesives consisting of a copolymer of polyacrylic acid with polystyrene, polyester, polyvinyl acetate, or the like, cyano acrylate adhesives, ethylene copolymer adhesives consisting of a copolymer of ethylene with a monomer such as vinyl acetate, ethyl acrylate, acrylic acid, or methacrylic acid, cellulose adhesives, polyurethane adhesives, polyester adhesives, polyamide adhesives, polyimide adhesives, polyolefin adhesives such as LDPE, amino resin adhesives consisting of urea resin or melamine resin, phenol resin adhesives, epoxy adhesives, reactive (meth)acrylic adhesives, elastomer adhesives consisting of chloroprene rubber, nitrile rubber, styrene-butadiene rubber, or the like, silicone adhesives, and inorganic adhesives consisting of alkali metal silicate, low-melting glass, or the like.

For example, an organotitanium, isocyanate, polyethylenimine, acid-modified polyethylene, or polybutadiene anchor coating agent can be used as the anchor coating agent.

In the case of laminating the adhesion layer by extrusion coating, a layer to be adhesively bonded can be extrusion-coated with the adhesive to form the adhesion layer, though the method is not particularly limited thereto.

For the extrusion coating, first, the adhesive is melted by heating, expanded and extended in a necessary width direction using a T-die, and extruded into a curtain-like form. The melted product is allowed to flow down onto a layer to be adhesively bonded, which is then sandwiched between a rubber roll and a cooled metal roll to perform the formation of the adhesion layer and its adhesive bonding and lamination to the layer to be adhesively bonded at the same time.

In the case of using an adhesive for dry lamination in the adhesion layer, the adhesive dispersed or dissolved in a solvent is applied onto one of the layers and dried, and the other layer to be adhesively bonded is overlaid and laminated thereto. Then, the adhesive is cured by aging at 30 to 120° C. for several hours to several days for lamination.

In the case of using an adhesive for non-solvent lamination, the adhesive itself is applied, without being dispersed or dissolved in a solvent, onto one of the layers and dried, and the other layer to be adhesively bonded is overlaid and laminated thereto. Then, the adhesive is cured by aging at 30 to 120° C. for several hours to several days for lamination.

The adhesion layer is formed by, for example, roll coating, gravure roll coating, or kiss coating with the adhesive. The amount of coating is desirably on the order of 0.1 to 10 g/m$^2$ (dry state). When the amount of coating with the adhesive falls within the range described above, favorable adhesiveness is obtained.

For the lamination by sand lamination, an arbitrary resin that can be melted by heating and applied to an extruder can be used in the adhesion layer. Specifically, the thermoplastic resin for use in the non-odor-adsorbing layer described above can be preferably used.

<Packaging material for liquid content for BIB>

The packaging material for a liquid content for BIB of the present invention is a packaging material for preparing the upper film and the lower film of the bag portion of the liquid content package for BIB of the present invention, and comprises at least an outer layer film and an inner layer film. The outer layer film and the inner layer film are adhesively bonded only partially to each other, as described above.

<Liquid Content>

In the present invention, the liquid contents refer to general liquids such as drinking water, juices, drip infusions, seasoning liquids such as soy sauce and sauce, soups, honey, baste, and dressing.

Object 5

<Package and Liquid Content Package for BIB>

The package and the liquid content package for BIB are the same as in the object 4.

[Method for Preparing Package]

The method for preparing the package is the same as in the object 4.

<Content Spout>

The content spout is an entrance and/or exit port through which contents are packed and/or taken out. The contents may be packed into and taken out of one content spout, or two or more content spouts may be provided and the contents can be packed into and taken out of the separate content spouts.

The content spout is not particularly limited by its installation position and is preferably installed at or near any of four sides of the package.

The content spout contains a polyolefin resin and hydrophobic zeolite. The content spout may further contain a chemical adsorbent-supported inorganic porous material.

Specific examples of the polyolefin resin include, but are not limited to, polyethylene resins (LDPE, MDPE, HDPE, LLDPE, etc.), various ethylene copolymers, polypropylene resins, cyclic polyolefin resins, methylpentene polymers, and acid-modified polyolefin resins.

The melt flow rate of the polyolefin resin is preferably 5 g/min or more and 100 g/min or less from the viewpoint of moldability.

The content spout can also be supplemented with various plastic compounding agents, additives, or the like for the purpose of improving or modifying processability, heat resistance, weather resistance, mechanical properties, dimensional stability, antioxidative properties, lubricity, mold release properties, flame retardancy, antimycotic properties, electric characteristics, strength, etc.

The content spout can be obtained by mixing and kneading various raw materials described above by a method known in the art to prepare a resin composition, and molding the resin composition by a method known in the art.

A kneading method known in the art or commonly used can be applied to a method for kneading the hydrophobic zeolite or the chemical adsorbent-supported inorganic porous material and the polyolefin resin.

The hydrophobic zeolite or the chemical adsorbent-supported inorganic porous material may be mixed and kneaded directly with the polyolefin resin. Alternatively, a so-called master batch system may be performed, which involves mixing the hydrophobic zeolite or the chemical adsorbent-supported inorganic porous material at a high concentration with a thermoplastic resin, then preparing a master batch by melt kneading, and mixing and melt-kneading this master batch with the polyolefin resin at a ratio appropriate for the target content percentages.

The content of the hydrophobic zeolite in the whole content spout is preferably 0.1% by mass or more and 13% by mass or less.

The content of the chemical adsorbent-supported inorganic porous material in the whole content spout is preferably 0.1% by mass or more and 10% by mass or less.

A content smaller than the range described above makes it difficult to exert a sufficient odor-adsorbing effect. A content larger than the range described above facilitates worsening the moldability of the content spout.

The content percentage of the hydrophobic zeolite in the master batch is preferably 0.5% by mass or more and 40% by mass or less, more preferably 1% by mass or more and 20% by mass or less.

The content percentage of the chemical adsorbent-supported inorganic porous material in the master batch is preferably 0.5% by mass or more and 40% by mass or less, more preferably 1% by mass or more and 20° by mass or less.

The master batch system can homogeneously disperse the hydrophobic zeolite or the chemical adsorbent-supported inorganic porous material into a polyolefin resin even if the combination of the hydrophobic zeolite or the chemical adsorbent-supported inorganic porous material with the polyolefin resin, which easily causes aggregation, is used.

The polyolefin resin described above is preferred as the thermoplastic resin for use in the master batch. However, the thermoplastic resin is not limited thereto, and various thermoplastic resins can be used without having an adverse effect.

Specific examples of the thermoplastic resin include, but are not limited to, polyolefin resins, polystyrene resins, acrylonitrile-styrene copolymers (AS resin), acrylonitrile-butadiene-styrene copolymers (ABS resin), poly(meth)

acrylic resins, polyester resins, polyamide resins, polyurethane resins, acetal resins, and cellulose resins.

Among the resins described above, a polyolefin resin or a low gas-permeable polyester resin is preferably contained.

Specific examples of the polyolefin resin include, but are not limited to, polyethylene resins (LDPE, MDPE, HDPE, LLDPE, etc.), various ethylene copolymers such as ethylene-vinyl alcohol copolymer resin, polypropylene resins, cyclic polyolefin resins, methylpentene polymers, and acid-modified polyolefin resins.

Examples of the polyester resin include, but are not limited to, polycarbonate resins, polyethylene terephthalate, and polyethylene naphthalate.

The melt flow rate of the thermoplastic resin for use in the master batch is preferably 5 g/min or more and 100 g/min or less from the viewpoint of moldability.

<Layer Configurations of Outer Layer Film and Inner Layer Film>

Each of the upper film and the lower film constituting the double-bag portion of the liquid content package for BIB of the present invention comprises, as shown in FIG. 18 or 19, at least an outer layer film and an inner layer film. The outer layer film and the inner layer film are adhesively bonded only partially to each other.

Each of the outer layer film and the inner layer film is a film having at least a sealant layer comprising an odor-adsorbing layer.

The sealant layer may be a layer consisting of the odor-adsorbing layer as shown in FIG. 20, or may have a multilayered structure with a non-odor-adsorbing layer containing low elutable polyethylene but containing no odor adsorbent material, in order to improve sealing strength and interlayer adhesion strength, as shown in FIG. 21 or 22.

As shown in FIG. 23, the odor-adsorbing layer may have a multilayered structure having the same or different types of low elutable polyethylene as a main component or the same or different types or contents of the odor adsorbent material.

In the liquid content package for BIB of the present invention, an innermost layer, which comes into contact with liquid contents, may be an odor-adsorbing layer or may be a non-odor-adsorbing layer. The non-odor-adsorbing layer serving as an innermost layer can improve the sealing strength of the package. The odor-adsorbing layer serving as an innermost layer can improve interlayer adhesion strength within the package.

Each of the outer layer film and the inner layer film can also comprise, as shown in FIG. 24, a base material layer, a functional layer such as a reinforcing layer, an adhesion layer, or the like in order to improve the strength of the film or impart various functions thereto. Particularly, the outer layer film preferably comprises a base material layer. A layer known in the art can be laminated for use as the base material layer, the functional layer, or the adhesion layer by a method known in the art.

<Sealant Layers of Outer Layer Film and Inner Layer Film>

[Odor-Adsorbing Layer]

The odor-adsorbing layer is the same as in the object 4.

[Low Elutable Polyethylene]

In the present invention, the sealant layer has heat sealing properties and contains low elutable polyethylene attaining a small amount of organic matter eluted.

Such a small amount of organic matter eluted can decrease the concentration of organic matter eluted into liquid contents packed in the liquid content package for BIB of the present invention and suppress change in taste and odor.

In this context, the concentration of the organic matter in liquid contents is indicated by the concentration of TOC (total organic carbon) in the present invention.

TOC represents the total concentration organic matter (organic carbon) oxidizable in water by the concentration of carbon. TOC is used as a typical water quality index and is standardized by JIS K 0805 (automatic total organic carbon (TOC) analyzer), etc.

The concentration of elutable TOC contained in a film consisting of the low elutable polyethylene is 1.5 ppm or higher and 250 ppm or lower.

In this context, the concentration of elutable TOC as to the low elutable polyethylene as a single raw material is measured in a film state, not in a state such as raw material pellets, because the low elutable polyethylene may increase the amount of TOC eluted by the application of various heat histories, etc. during film preparation such as sealant layer formation.

After packing of 1 kg of distilled water as filling water into a 15 cm×44 cm×50 µm thick pouch packaging bag prepared from the low elutable polyethylene according to the present invention, followed by elution, the increased concentration of TOC in the filling water is preferably 0.01 ppm or higher and 1.5 ppm or lower, more preferably 0.02 ppm or higher and 1.45 ppm or lower, further preferably 0.025 ppm or higher and 1.4 ppm or lower.

If the increased concentration of TOC in the filling water is larger than 1.5 ppm, it is difficult to suppress change in taste and odor of the filling water. In order to obtain this concentration of smaller than 0.01 ppm, effects are limited though cost is high. The range described above is preferred from the viewpoint of the balance between cost and performance.

In order to specifically determine the increased concentration of TOC, for example, 1000 g of distilled water of 40° C. to 80° C. is packed as filling water into the pouch packaging bag described above, which is then stored at 25° C. to 50° C. for several days to 4 weeks. Then, the TOC concentration of the filling water is measured using a total organic carbon meter or HS-GC. The TOC concentration of the distilled water as a blank can be subtracted therefrom to determine the increased concentration of TOC.

In the present invention, the increased concentration of TOC is determined by a standard method which involves preparing a package of a pouch bag (15 cm×44 cm) using the packaging material for a liquid content package for BIB, the outer layer film, and the inner layer film, packing thereinto 1000 g of water (distilled water for high-performance liquid chromatography, Junsei Chemical Co., Ltd.) of 65° C. to prepare a liquid-packed package, which is then stored at 35° C. for 2 weeks, and then measuring the TOC concentration of the filling water using TOC-L total organic carbon meter manufactured by Shimadzu Corp.

Then, the concentration of elutable TOC contained in the sealant film is calculated from the obtained increased TOC concentration of the filling water, parts by mass of the filling water, and parts by mass of the sealant film.

Specific examples of the low elutable polyethylene include low-elution resins such as low-density polyethylene (LDPE), medium-density polyethylene (MDPE), high-density polyethylene (HDPE), linear low-density polyethylene (LLDPE), ethylene-vinyl acetate copolymers, ethylene-ethyl acrylate copolymers, ethylene-acrylic acid copolymers, ethylene-methacrylic acid copolymers, ethylene-methyl methacrylate copolymers, and ethylene-propylene copolymers, and mixtures of these resins, though the low elutable polyethylene is not limited to these resins.

Examples of the method for decreasing the amount of organic matter eluted from a low elutable polyethylene film include, but are not limited to, the following methods.

Decrease in residual amounts of unreacted raw materials or amounts of low-molecular-weight products or by-products, or the removal of a polymerization catalyst in the production of the polyethylene is effective. A specific method involves improving a raw material purity, precisely controlling conditions such as a reaction temperature or a pressure, removing unreacted raw materials, low-molecular-weight products, by-products or a polymerization catalyst by distillation or washing, or preventing oxidation ascribable to contact with oxygen in air at a high temperature.

For the pelletization of the produced polyethylene, a method involves restricting use of a lubricant, an antioxidant, and other additives which may elevate the amount of organic matter eluted.

For the film preparation of the polyethylene, a method involves restricting use of a lubricant, an antioxidant, a solvent, and other additives which may elevate the amount of organic matter eluted, or preventing oxidation ascribable to a high temperature.

In the present invention, the sealant layer has heat sealing properties and contains low elutable polyethylene. Thus, a packaging material comprising the sealant film has excellent heat sealing properties, attains a small amount of organic matter eluted, and can reduce increase in TOC concentration in liquid contents in the package.

The polyethylene is suitable because of its properties of being resistant to sterilization/disinfection treatment such as UV and being less decomposable.

Among these low elutable polyethylenes, the type is preferably LLDPE. Since LLDPE having a C4, C6, or C8 side chain tends to be capable of decreasing the amount of organic matter eluted, C4-LLDPE, C6-LLDPE, C8-LLDPE, or the like is more preferred.

In this context, C4, C6, or C8 means that a monomer having the described numerical value as the number of carbon atoms is present at a side chain by partial copolymerization with LLDPE. For example, C4 represents a side chain having a butene-1 structure; C6 represents a side chain having a hexene-1 or 4-methylpentene-1 structure; and C8 represents a side chain having an octene-1 structure.

Alternatively, low elutable polyethylene having a density of 0.90 g/cm$^3$ or larger and 0.94 g/cm$^3$ or smaller is preferred, and low elutable polyethylene having a density of 0.905 g/cm$^3$ or larger and 0.933 g/cm$^3$ or smaller is more preferred. The low elutable polyethylene having a density within this range tends to be capable of decreasing the amount of organic matter eluted.

The low elutable polyethylene may contain a small amount of an additive such as an antioxidant or an antiblocking agent.

The low elutable polyethylene according to the present invention is preferably excellent in resistance to pinholes attributed to flexion when singly prepared into a film.

As for the pinhole resistance of the low elutable polyethylene according to the present invention, for example, the number of pinholes formed after 5000 Gelbo flexes at 23° C. in a 50 μm thick film consisting of the low elutable polyethylene singly is preferably 0 or 1 or more and 160 or less.

When the number of pinholes formed in the sealant layer falls within the range described above, a packaging material workable for an application requiring pinhole resistance can be prepared.

[Odor Adsorbent Material]

The odor adsorbent material is the same as in the object 4.

<Non-Odor-Adsorbing Layer>

The non-odor-adsorbing layer is the same as in the object 4.

<Method for Preparing Outer Layer Film or Inner Layer Film>

(Method for Dispersing Odor Adsorbent Material)

A kneading method known in the art or commonly used can be applied to a method for kneading the odor adsorbent material and the low elutable polyethylene.

The odor adsorbent material may be mixed and kneaded directly with the low elutable polyethylene. Alternatively, a so-called master batch system may be performed, which involves mixing the odor adsorbent material at a high concentration with a thermoplastic resin, then preparing a master batch by melt kneading, and mixing and melt-kneading this master batch with the low elutable polyethylene at a ratio appropriate for the target content percentages.

The content percentage of the hydrophobic zeolite in the master batch is preferably 0.5% by mass or more and 40% by mass or less, more preferably 1% by mass or more and 20% by mass or less.

The content percentage of the chemical adsorbent-supported inorganic porous material in the master batch is preferably 0.5% by mass or more and 40% by mass or less, more preferably 1% by mass or more and 20% by mass or less.

The master batch system can homogeneously disperse the odor adsorbent material into the low elutable polyethylene even if the combination of the odor adsorbent material with the low elutable polyethylene, which easily causes aggregation, is used.

In this respect, the thermoplastic resin in the master batch may or may not be the same as the low elutable polyethylene in the odor-adsorbing layer. Low elutable polyethylenes of the same type or the low elutable polyethylene and a thermoplastic resin of different type may be combined according to a purpose.

For example, provided that the odor adsorbent material and the low elutable polyethylene are melt-mixed in advance, homogeneous and favorable film formability, heat sealing properties, interlayer adhesion strength and odor-adsorbing properties can be obtained by mixing or melt kneading with the low elutable polyethylene again.

Examples of the thermoplastic resin other than the low elutable polyethylene in the odor-adsorbing layer include polyolefin resins such as general-purpose non-low-elutable polyethylene, polypropylene, methylpentene polymers, and acid-modified polyolefin resins, and mixtures of these resins, though the thermoplastic resin is not limited to these resins.

The thermoplastic resin preferably has low eluting properties equivalent to that of the low elutable polyethylene according to the present invention, and a general-purpose thermoplastic resin can be used without having a significant adverse effect on the amount of organic matter eluted from the whole sealant layer.

(Film Formation and Lamination Methods)

In the present invention, the film formation and lamination methods for each layer of the outer layer film or the inner layer film are not particularly limited, and a film formation method and a lamination method known in the art or commonly used can be applied thereto.

The odor-adsorbing layer or the non-odor-adsorbing layer may be laminated onto a different layer, optionally via an adhesion layer, by extrusion coating, or, for example, a plurality of odor-adsorbing layers and non-odor-adsorbing layers may be formed by coextrusion according to an inflation method or a casting method.

For the lamination by extrusion coating, first, a resin composition forming the odor-adsorbing layer or a resin composition forming the non-odor-adsorbing layer is melted by heating, expanded and extended in a necessary width direction using a T-die, and extruded into a curtain-like form. The melted resin is allowed to flow down onto a surface to be laminated, which is then sandwiched between a rubber roll and a cooled metal roll to perform the formation of the odor-adsorbing layer or the non-odor-adsorbing layer and its adhesive bonding and lamination to the surface to be laminated at the same time.

For the lamination by extrusion coating, the melt flow rate (MFR) of the low elutable polyethylene contained in the odor-adsorbing layer or the thermoplastic resin contained in the non-odor-adsorbing layer is preferably 0.2 to 50 g/10 min, more preferably 0.5 to 30 g/10 min. In the present specification, MFR is a value measured by an approach conforming to JIS K 7210.

If MFR is less than 0.2 g/min or more than 50 g/min, processing suitability is less effective.

In the case of using an inflation method, the melt flow rate (MFR) of the low elutable polyethylene contained in the odor-adsorbing layer or the thermoplastic resin contained in the non-odor-adsorbing layer is preferably 0.2 to 10.0 g/10 min, more preferably 0.2 to 9.5 g/10 min.

If MFR is less than 0.2 g/10 min or more than 10.0 g/10 min, processing suitability tends to be poor.

Alternatively, the odor-adsorbing layer and the non-odor-adsorbing layer film-formed in advance may be laminated via an adhesion layer by dry lamination, non-solvent lamination, sand lamination, or the like.

<Adhesion Layer>

The adhesion layer is the same as in the object 4.

<Packaging Material for Liquid Content for BIB>

The packaging material for a liquid content for BIB is the same as in the object 4.

<Liquid Content>

The liquid contents are the same as in the object 4.

EXAMPLES

Object 1

<Raw Material>

The detailed raw materials used in Examples are as described below.

[Thermoplastic Resin a of Odor-Adsorbing Molded Article]

TABLE 1

| Polyethylene No. | Supplier | Type of Polyethylene | Density [g/cm$^3$] | MFR [g/10 minutes] |
|---|---|---|---|---|
| Novatec UF370 | Japan Polyethylene Corporation | LLDPE | 0.921 | 16 |
| Novatec UF580 | Japan Polyethylene Corporation | LLDPE | 0.925 | 20 |
| Novatec LJ8041 | Japan Polyethylene Corporation | LDPE | 0.918 | 23 |
| Novatec LJ902 | Japan Polyethylene Corporation | LDPE | 0.915 | 45 |
| Novatec HJ362N | Japan Polyethylene Corporation | HDPE | 0.953 | 5 |

[Hydrophobic Zeolite]

MIZUKASIEVES EX-122: manufactured by Mizusawa Industrial Chemicals, Ltd., $SiO_2/AL_2O_3$ molar ratio=32/1, average particle size=2.5 to 5.5 μm.

SILTON MT400: manufactured by Mizusawa Industrial Chemicals, Ltd., $SiO_2/AL_2O_3$ molar ratio=400/1, average particle size=5 to 7 μm.

SILTON MT-8000: manufactured by Mizusawa Industrial Chemicals, Ltd., $SiO_2/AL_2O_3$ molar ratio=8000/1, average particle size=0.8 μm.

[Hydrophilic Zeolite]

MIZUKASIEVES Y-420: manufactured by Mizusawa Industrial Chemicals, Ltd., $SiO_2/AL_2O_3$ molar ratio=5/1, average particle size=5 μm.

[Chemical Adsorbent-Supported Inorganic Porous Material]

KESMON NS-241: manufactured by Toagosei Co., Ltd., an amino group-containing compound-supported inorganic porous material, average particle size: 3.5 μm.

<Preparation of Master Batch>

Each master batch was prepared as described below.

[Preparation of Master Batch 1]

Novatec UF370 as the thermoplastic resin A and MIZUKASIEVES EX-122 as the hydrophobic zeolite were melt-blended at the following proportions to obtain master batch 1 (MB1).

| | |
|---|---|
| Novatec UF370 | 90 parts by mass |
| MIZUKASIEVES EX-122 | 10 parts by mass |

(Preparation of Master Batches 2 to 5)

The thermoplastic resin B and the hydrophobic zeolite or the chemical adsorbent-supported inorganic porous material were melt-blended in the same way as in the master batch 1 according to the formulation of Table 2 to obtain master batches 2 to 5 (MB2 to MB5).

TABLE 2

| | | Unit | MB for resin composition for odor-adsorbing molded article | | | | |
|---|---|---|---|---|---|---|---|
| | | | MB1 | MB2 | MB3 | MB4 | MB5 |
| Composition | Thermoplastic resin B Novatec UF370 | Parts by mass | 90 | 90 | 90 | 90 | 80 |
| | Hydrophobic zeolite Mizukasieves EX-122 | Parts by mass | 10 | | | | |
| | Silton MT400 | Parts by mass | | 10 | | | 20 |
| | Silton MT8000 | Parts by mass | | | 10 | | |
| | Chemical adsorbent-supported inorganic porous material Kesmon NS-241 | Parts by mass | | | | 10 | |

Example 1

The master batch 1 obtained as described above and Novatec UF370 were dry-blended at the following proportions to obtain a resin composition.

| Master batch 1 | 10 parts by mass |
|---|---|
| Novatec UF370 | 90 parts by mass |

Then, the resin composition obtained as described above was injection-molded at 200° C. to prepare a content spout molded article.

Examples 2 to 10

The master batch and the thermoplastic resin A were selected according to the description of Table 3. Each resin composition was obtained by the same operation as in Example 1, and each content spout molded article was prepared.

Comparative Example 1

A content spout molded article was prepared by the same operation as in Example 1 using only Novatec UF370 without being supplemented with the master batch.

<Evaluation>
[Sensory Evaluation]
According to the dry lamination method, an adhesive (Rock Paint Co., Ltd., RU004/H1, amount of dry coating: 3.5 g/m$^2$) was applied to each of a PET film (manufactured by Toyobo Co., Ltd., ESPET T4102, thickness: 12 μm), an aluminum foil (manufactured by Toyo Aluminium K.K., thickness: 12 μm), and a LLDPE film (manufactured by Toyobo Co., Ltd., LIX L6100, thickness: 50 μm) and dried at 70° C. to obtain a PET 12 μm/adhesion layer/Al foil 7 μm/adhesion layer/LLDPE 50 μm multilayered film. The multilayered film was used to prepare a pouch bag (13 cm×17 cm). The inner face of each laminate was subjected to disinfection treatment by UV irradiation in advance.

When each pouch bag thus obtained was hot-packed with 100 g of water (manufactured by Suntory Holdings Ltd., Minami Alps no Tennensui) of 65° C., one content spout molded article obtained in each Example or Comparative Example was also installed therein to prepare a liquid-packed package, which was then stored at 10° C. for 1 week. Then, sensory evaluation was conducted as to change in taste and odor.

The evaluation index is as described below. The number of participants in the sensory evaluation experiment was 5, and an average value was calculated and used as evaluation results.
1: Taste and odor were heavy.
2: Taste and odor were slightly lessened.
3: Taste and odor were drastically lessened.
4: Taste and odor were equivalent to those of water before packing.

TABLE 3

| | | | Unit | Example | | | | | | | | | | Comparative Example |
|---|---|---|---|---|---|---|---|---|---|---|---|---|---|---|
| | | | | 1 | 2 | 3 | 4 | 5 | 6 | 7 | 8 | 9 | 10 | 1 |
| Composition of resin composition | Master Batch | MB1 | Parts by mass | 10 | | | | | | | | | | |
| | | MB2 | Parts by mass | | 10 | | 7.5 | | | 10 | 10 | 10 | 10 | |
| | | MB3 | Parts by mass | | | 10 | | | | | | | | |
| | | MB4 | Parts by mass | | | | 2.5 | | | | | | | |
| | | MB5 | Parts by mass | | | | | 5 | 50 | | | | | |
| | Thermoplastic Resin A | NovatecUF370 | Parts by mass | 90 | 90 | 90 | 90 | 95 | 50 | | | | | 100 |
| | | NovatecUF580 | Parts by mass | | | | | | | 90 | | | | |
| | | NovatecLJ8041 | Parts by mass | | | | | | | | 90 | | | |

TABLE 3-continued

|  |  |  | Unit | Example 1 | 2 | 3 | 4 | 5 | 6 | 7 | 8 | 9 | 10 | Comparative Example 1 |
|---|---|---|---|---|---|---|---|---|---|---|---|---|---|---|
|  |  | NovatecLJ902 | Parts by mass |  |  |  |  |  |  |  |  | 90 |  |  |
|  |  | NovatecHJ362N | Parts by mass |  |  |  |  |  |  |  |  |  | 90 |  |
| Characteristics | Odor adsorbent material content | Hydrophobic zeolite | % by mass | 1 | 1 | 1 | 0.75 | 1 | 5 | 1 | 1 | 1 | 1 | 0 |
|  |  | Chemical adsorbent-supported inorganic porous material | % by mass | 0 | 0 | 0 | 0.25 | 0 | 0 | 0 | 0 | 0 | 0 | 0 |
| Evaluation results |  | Moldability | — | ○ | ○ | ○ | ○ | ○ | ○ | ○ | ○ | ○ | ○ | ○ |
|  |  | Change in odor and taste | — | 3.0 | 3.5 | 3.5 | 3.0 | 2.5 | 4.0 | 3.5 | 3.5 | 3.5 | 3.5 | 1.0 |

<Summary of Results>

Favorable results about moldability and change in taste and odor were obtained in all Examples containing the thermoplastic resin A and the odor adsorbent material, whereas favorable results about change in taste and odor were not obtained in Comparative Example 1 containing no odor adsorbent material.

Object 2

EXAMPLES

The detailed raw materials used in Examples are as described below.

[Low Elutable Polyethylene for Inner Layer Film and Outer Layer Film and General-Purpose Polyethylene]

The polyethylenes described in Table 1 and the following polyethylenes were used.

UMERIT 0520F: manufactured by Ube Industries, Ltd., LLDPE.

Novatec LC520: manufactured by Japan Polyethylene Corp., LDPE resin.

TABLE 1

| Elution property | Polyethylene No | Supplier | Type of Polyethylene | Density [g/cm$^3$] | MFR [g/10 minutes] |
|---|---|---|---|---|---|
| Low elution property | Ultzex1520L | Prime Polymer Co., Ltd. | C6-LLDPE | 0.916 | 2.3 |
|  | Ultzex2021L | Prime Polymer Co., Ltd. | C6-LLDPE | 0.920 | 2.0 |
|  | Ultzex3520L | Prime Polymer Co., Ltd. | C6-LLDPE | 0.931 | 2.1 |
|  | Neo-Zex3510F | Prime Polymer Co., Ltd. | C4-LLDPE | 0.933 | 1.6 |
| General purpose | EvolueSP2020 | Prime Polymer Co., Ltd. | C6-LLDPE | 0.916 | 2.1 |

[Resin for Content Spout and Molding]

Content spouts A to E were obtained by injection molding at 200° C. using the low elutable polyethylene for a resin molded article described in the table.

TABLE 2

| Content spout | Polyethylene No. | Supplier | Type of Polyethylene | Density [g/cm$^3$] | MFR [g/10 minutes] |
|---|---|---|---|---|---|
| Content spout A | Novatec UF370 | Japan Polyethylene Corporation | LLDPE | 0.921 | 16 |
| Content spout B | Novatec UF580 | Japan Polyethylene Corporation | LLDPE | 0.925 | 20 |
| Content spout C | Novatec LJ8041 | Japan Polyethylene Corporation | LDPE | 0.918 | 23 |
| Content spout D | Novatec LJ902 | Japan Polyethylene Corporation | LDPE | 0.915 | 45 |
| Content spout E | Novatec HJ362N | Japan Polyethylene Corporation | HDPE | 0.953 | 5 |

[Odor Adsorbent Material]

(Chemical Adsorbent-Supported Inorganic Porous Material)

KESMON NS-241: manufactured by Toagosei Co., Ltd., an amino group-containing compound-supported inorganic porous material, average particle size: 3.5 μm.

(Hydrophobic Zeolite)

MIZUKASIEVES EX-122: manufactured by Mizusawa Industrial Chemicals, Ltd., $SiO_2/Al_2O_3$ molar ratio=32/1, average particle size: 2.5 to 5.5 μm.

SILTON MT400: manufactured by Mizusawa Industrial Chemicals, Ltd., $SiO_2/Al_2O_3$ molar ratio=400/1, average particle size: 5 to 7 μm.

SILTON MT2000: manufactured by Mizusawa Industrial Chemicals, Ltd., $SiO_2/Al_2O_3$ molar ratio=2000/1, average particle size: 2 to 4 μm.

SILTON MT-8000: manufactured by Mizusawa Industrial Chemicals, Ltd., $SiO_2/Al_2O_3$ molar ratio=8000/1, average particle size: 0.8 μm.

(Hydrophilic Zeolite)

MIZUKASIEVES Y-420: manufactured by Mizusawa Industrial Chemicals, Ltd., $SiO_2/Al_2O_3$ molar ratio=5/1, average particle size: 5 μm.

[Base Material Film]

BONYL RX: manufactured by KOHJIN Film & Chemicals Co., Ltd., a biaxially drawn nylon film, 15 μm thick.

IB-ONY: manufactured by Dai Nippon Printing Co., Ltd., a gas-barrier biaxially drawn nylon film, 15 μm thick.

[Others]

EMB-21: manufactured by Sumitomo Chemical Co., Ltd., an antiblocking agent.

PEX ABT-16: Japan Polyethylene Corp., an antiblocking agent.

EMB-10: Sumitomo Chemical Co., Ltd., a slipping agent.

[Preparation of Master Batch]

Each MB (master batch) of the outer layer film or the inner layer film was prepared as described below.

(Preparation of MB1)

LLDPE ULT-ZEX 1520L as the low elutable polyethylene and hydrophobic zeolite MIZUKASIEVES EX-122 were melt-blended at the following proportions to obtain master batch 1 (MB1).

| | |
|---|---|
| ULT-ZEX 1520L | 90 parts by mass |
| MIZUKASIEVES EX-122 | 10 parts by mass |

(Preparation of MB2 to MB13)

The raw materials were melt-blended in the same way as in MB1 according to the formulation of Table 3 or 4 to obtain master batches 2 to 13 (MB2 to MB13).

[Preparation of Outer Layer Film]

The outer layer films A to I described in Table 4 were prepared.

(Preparation of Outer Layer Film A)

ULT-ZEX 1520L was used in film formation by inflation at 160° C. to prepare an 80 μm sealant film, which was used as outer layer film A. Its layer configuration and evaluation results are shown in Table 4.

(Preparation of Outer Layer Film B)

First, ULT-ZEX 1520L was used in film formation and lamination by inflation at 160° C. to prepare a 40 μm sealant film.

Next, biaxially drawn nylon film BONYL RX and the sealant film obtained as described above were laminated via Novatec LC520 used as an adhesion layer by the extrusion coating method at 320° C. to obtain outer layer film B. Its layer configuration and evaluation results are shown in Table 4.

(Preparation of Outer Layer Film C)

First, ULT-ZEX 1520L, a mixture of UMERIT 0520F/MB2=mass ratio 50/50, and a mixture of ULT-ZEX 1520L/EMB-21=mass ratio 97/3 were used in film formation and lamination by inflation at 160° C. to prepare a sealant film.

Next, biaxially drawn nylon film BONYL RX was laminated to the ULT-ZEX 1520L side of the sealant film obtained as described above via Novatec LC520 used as an adhesion layer by the extrusion coating method at 320° C. to obtain outer layer film C.

Its layer configuration and evaluation results are shown in Table 4.

(Preparation of Outer Layer Films D, F, and H)

Outer layer films D, F, and H were obtained by the same operation as in the outer layer film C according to the configuration described in Table 4. Their layer configurations and evaluation results are shown in Table 4.

TABLE 3

| | | | MB for outer layer film and inner layer film | | | | | | | | | |
|---|---|---|---|---|---|---|---|---|---|---|---|---|
| | | Unit | MB1 | MB2 | MB3 | MB4 | MB5 | MB6 | MB7 | MB8 | MB9 |
| Thermoplastic resin | Ultzex1520L | Parts by mass | 90 | 90 | 90 | 90 | 90 | 80 | 90 | 80 | |
| | Novatec LC600A | Parts by mass | | | | | | | | | 90 |
| Hydrophobic zeolite | Mizukasieves EX-122 | Parts by mass | 10 | | | | | | | | |
| | Silton MT400 | Parts by mass | | 10 | | | | 10 | 20 | 10 | |
| | Silton MT2000 | Parts by mass | | | 10 | | | | | | |
| | Silton MT8000 | Parts by mass | | | | 10 | | | | | |
| Hydrophilic zeolite | Mizukasieves Y-420 | Parts by mass | | | | | 10 | | | | |
| Chemical adsorbent-supported inorganic porous material | Kesmon NS-241 | Parts by mass | | | | | | 20 | | | |

(Preparation of Outer Layer Films E, G, and I)

Outer layer films E, G, and I were obtained by the same operation as in the outer layer film A according to the configuration described in Table 4. Their layer configurations and evaluation results are shown in Table 4.

to prepare inner layer film A having a 3-layer configuration. The details are shown in Table 5.

[Preparation and Evaluation of Package]

The outer layer film A, the inner layer film A, and the content spout A obtained as described above were used to

TABLE 4

|  |  |  |  |  | Outer layer film |  |  |  |  |  |  |  |  |
|---|---|---|---|---|---|---|---|---|---|---|---|---|---|
|  |  |  |  | Unit | A | B | C | D | E | F | G | H | I |
| Layer thickness | Base material layer | Biaxially drawn nylon film | BonilRX | μm |  | 15 | 15 |  |  | 15 |  | 15 |  |
|  |  |  | IB-ONY (gas-barrier) | μm |  |  |  | 15 |  |  |  |  |  |
|  | Adhesion layer | LDPE | NovatecLC520 | μm |  | 15 | 15 | 15 |  | 15 |  | 15 |  |
|  | Sealant Layer |  | Non-odor-adsorbing layer 1 | μm | 80 | 40 | 10 | 10 |  |  |  |  |  |
|  |  |  | Odor-adsorbing layer | μm |  |  | 20 | 20 | 80 | 40 | 80 | 40 | 80 |
|  |  |  | Non-odor-adsorbing layer | μm |  |  | 10 | 10 |  |  |  |  |  |
| Composition | Sealant Layer | Non-odor-adsorbing layer 1 | Low-elution Polyethylene | Ultzex1520L | Parts by mass | 100 | 100 | 100 | 100 |  |  |  |  |  |
|  |  | Odor-adsorbing layer | Low-elution Polyethylene | UMERIT0520F | Parts by mass |  |  | 50 | 50 |  |  |  |  |  |
|  |  |  |  | Ultzex1520L | Parts by mass |  |  |  |  | 81.5 | 50 | 50 | 16.7 | 16.7 |
|  |  |  | Masterbatch | MB2 | Parts by mass |  |  | 50 | 50 | 16.7 |  |  |  |  |
|  |  |  |  | MBB | Parts by mass |  |  |  |  |  | 50 | 50 | 83.3 | 83.3 |
|  |  |  | OTHER | EMB-10 | Parts by mass |  |  |  |  | 1.0 |  |  |  |  |
|  |  |  |  | PEX ABT-16 | Parts by mass |  |  |  |  | 0.8 |  |  |  |  |
|  |  | Non-odor-adsorbing layer 2 | Low-elution Polyethylene | Ultzex1520L | Parts by mass |  |  | 97 | 97 |  |  |  |  |  |
|  |  |  | OTHER | EMB-21 | Parts by mass |  |  | 3 | 3 |  |  |  |  |  |
| Characteristics | Polyethylene single film | Increment of TOC concentration of filling water | Article unirradiated with UV |  | ppm | 0.74 | 0.74 | 0.74 | 0.74 | 0.74 | 0.74 | 0.74 | 0.74 | 0.74 |
|  |  |  | Article irradiated with UV |  | ppm | 0.88 | 0.88 | 0.88 | 0.88 | 0.88 | 0.88 | 0.88 | 0.88 | 0.88 |
|  |  |  | Pinhole resistance |  | Holes | 2 | 2 | 2 | 2 | 2 | 2 | 2 | 2 | 2 |
|  | Content in the whole sealant film |  | Hydrophobic Zeolite |  | % by mass | 0 | 0 | 1.7 | 1.7 | 1.7 | 10 | 10 | 16.7 | 16.7 |
|  |  |  | Chemical adsorbent-supported inorganic porous material |  | % by mass | 0 | 0 | 1.7 | 1.7 | 1.7 | 0 | 0 | 0 | 0 |
|  |  |  | Hydrophilic Zeolite |  | % by mass | 0 | 0 | 0 | 0 | 0 | 0 | 0 | 0 | 0 |
| Evaluation results |  |  | Film-forming properties |  | — | ○ | ○ | ○ | ○ | ○ | ○ | ○ | ○ | ○ |

Example 1

[Preparation of Inner Layer Film]

The following mixture 1 and mixture 2 were prepared for an odor-adsorbing layer and a non-odor-adsorbing layer, respectively.

Mixture 1:

| UMERIT 0520F | 50 parts by mass |
|---|---|
| MB2 | 50 parts by mass |

Mixture 2:

| ULT-ZEX 1520L | 97 parts by mass |
|---|---|
| EMB-21 | 3 parts by mass |

ULT-ZEX 1520L, the mixture 1, and the mixture 2 were used in film formation and lamination by inflation at 160° C.

prepare the package shown in FIG. 4 (size of double-bag portion: 450 mm×450 mm, diameter of content spout A: 31 mm), which was then evaluated for heat sealing properties, bag rupture resistance characteristics, pinhole resistance (inner layer film), and increased TOC concentration in filling water.

The detailed configuration and evaluation results of the package are shown in Table 5.

Examples 2 to 19 and Comparative Examples 1 to 5

Each mixture for the odor-adsorbing layer and/or the non-odor-adsorbing layer was obtained in the same way as in Example 1 according to the formulation described in Tables 5 to 8, and each inner layer film was prepared.

Then, each package was prepared by combining the inner layer film with the outer layer film and the content spout according to the description of Tables 5 to 8, and evaluated in the same way as above. The detailed configuration and evaluation results of the package are shown in Tables 5 to 8.

<Evaluation>
[Film Formability]
The appearance was observed and sensorily evaluated. The evaluation criteria are as described below.
Good (indicated by circle): The film was formable without causing wrinkles or grains on the film.
Poor (indicated by x-mark): The film was difficult to form due to many wrinkles or grains on the film.
[Bag Rupture Resistance Characteristics]
The inside of the package prepared in each Example or Comparative Example was packed with 10 L of water. The operation of dropping the package thus packed with water from a height of 1 m was repeated a total of three times to evaluate the presence or absence of bag rupture.
Acceptation and Rejection Criteria
Excellent (indicated by double circle): Bag rupture was absent in the evaluation by three drops. Accepted.
Good (indicated by circle): One bag was ruptured in the evaluation by three drops. Accepted.
Poor (indicated by x-mark): All bags were ruptured in the evaluation by three drops. Rejected.
[Pinhole Resistance of Single Inner Layer Film]
The prepared inner layer film was cut into A4 size (30 cm×21 cm) and flexed using Gelbo Flex Tester (manufactured by Tester Sangyo Co., Ltd., BE-1005). Then, the number of pinholes formed within the 30 cm×21 cm plane of each sample was counted. 160 or less pinholes were accepted.
Temperature: 23° C.
The number of Gelbo flexes: 5000

[Pinhole Resistance of Package]
The prepared package was delivered in a packed state for transport as a liquid content package for BIB through an actual transport pathway. The number of pinholes formed in the inner layer film of the bag portion was counted. 160 or less pinholes were accepted.
[Increased TOC Concentration in Filling Water]
Before preparation of the package in each Example or Comparative Example, the inner film side of the packaging material constituting the package was subjected to disinfection treatment by UV irradiation in advance.
The package obtained in each Example or Comparative Example was hot-packed with 1000 g of water (distilled water for high-performance liquid chromatography, Junsei Chemical Co., Ltd.) of 65° C. to prepare a liquid-packed package, which was then stored at 35° C. for 2 weeks. Then, the TOC concentration of the filling water was measured using TOC-L total organic carbon meter manufactured by Shimadzu Corp.
Subsequently, the TOC concentration of the water before packing was also measured in the same way as above.
The increased TOC concentration in each package was measured according to the following expression.

Increased TOC concentration=TOC concentration of the filling water after storage−TOC concentration of the water before packing TOC concentration of the water before packing: 0.02 ppm
Conditions of Disinfection Treatment by UV Irradiation
UV wavelength: 253.7 nm
Irradiation time: 10 sec
Temperature: 25° C.

TABLE 5

| | | | | | Example | | | | | |
|---|---|---|---|---|---|---|---|---|---|---|
| Material Name | | | | Unit | 1 | 2 | 3 | 4 | 5 | 6 |
| Content spout | Content spout A | | | — | ○ | ○ | ○ | ○ | ○ | ○ |
| | Content spout B | | | — | | | | | | |
| | Content spout C | | | — | | | | | | |
| | Content spout D | | | — | | | | | | |
| | Content spout E | | | — | | | | | | |
| Outer layer film | Outer layer film A | | | — | ○ | | | | | |
| | Outer layer film B | | | — | | ○ | | | | |
| | Outer layer film C | | | — | | | ○ | ○ | ○ | ○ |
| | Outer layer film D | | | — | | | | | | |
| | Outer layer film E | | | — | | | | | | |
| | Outer layer film F | | | — | | | | | | |
| | Outer layer film G | | | — | | | | | | |
| | Outer layer film H | | | — | | | | | | |
| | Outer layer film I | | | — | | | | | | |
| Inner layer film | Formulation | Odor-adsorbing layer | Masterbatch | MB1 | Parts by mass | | | 16.7 | | | |
| | | | | MB2 | Parts by mass | 16.7 | 16.7 | | 16.7 | | |
| | | | | MB3 | Parts by mass | | | | | 16.7 | |
| | | | | MB4 | Parts by mass | | | | | | 16.7 |
| | | | | MB5 | Parts by mass | | | | | | |
| | | | | MB6 | Parts by mass | | | | | | |
| | | | | MB7 | Parts by mass | | | | | | |
| | | | | MB8 | Parts by mass | | | | | | |
| | | | | MB9 | Parts by mass | | | | | | |

TABLE 5-continued

| | Material Name | | | Unit | Example 1 | 2 | 3 | 4 | 5 | 6 |
|---|---|---|---|---|---|---|---|---|---|---|
| | | Resin | Low-elution polyethylene | Ultzex1520L | Parts by mass | 83.3 | 83.3 | 83.3 | 83.3 | 83.3 | 83.3 |
| | | | | Ultzex2021L | Parts by mass | | | | | | |
| | | | | Ultzex3520L | Parts by mass | | | | | | |
| | | | | Neozex3510F | mass | | | | | | |
| | | | General-purpose polyethylene | EvolueSP2020 | Parts by mass | | | | | | |
| | Non-Odor-adsorbing layer | Resin | Low-elution polyethylene | Ultzex1520L | Parts by mass | 100 | 100 | 100 | 100 | 100 | 100 |
| | | | | Ultzex2021L | Parts by mass | | | | | | |
| | | | | Ultzex3520L | Parts by mass | | | | | | |
| | | | | Neozex3510F | Parts by mass | | | | | | |
| | | | General-purpose polyethylene | EvolueSP2020 | Parts by mass | | | | | | |
| | Layer thickness | Sealant layer | | Non-odor adsorbing layer | μm | 16 | 16 | 16 | 16 | 16 | 16 |
| | | | | Odor adsorbing layer | μm | 48 | 48 | 48 | 48 | 48 | 48 |
| | | | | Non-odor adsorbing layer | μm | 16 | 16 | 16 | 16 | 16 | 16 |
| Characteristics | Polyethylene single film (Inner layer film) | Increment of TOC concentration of filling water | | Article unirradiated with UV | ppm | 0.74 | 0.74 | 0.74 | 0.74 | 0.74 | 0.74 |
| | | | | Article irradiated with UV | ppm | 0.88 | 0.88 | 0.88 | 0.88 | 0.88 | 0.88 |
| | | Pinhole resistance | | | Holes | 2 | 2 | 2 | 2 | 2 | 2 |
| | Content of the whole sealant layer of outer layer film | Hydrophobic Zeolite | | | % by mass | 0 | 0 | 1.7 | 1.7 | 1.7 | 1.7 |
| | | Chemical adsorbent-supported inorganic porous material | | | % by mass | 0 | 0 | 1.7 | 1.7 | 1.7 | 1.7 |
| | | Hydrophilic Zeolite | | | % by mass | 0 | 0 | 0 | 0 | 0 | 0 |
| | Content of the whole sealant layer of Inner layer film | Hydrophobic Zeolite | | | % by mass | 1 | 1 | 1 | 1 | 1 | 1 |
| | | Chemical adsorbent-supported inorganic porous material | | | % by mass | 0 | 0 | 0 | 0 | 0 | 0 |
| | | Hydrophilic Zeolite | | | % by mass | 0 | 0 | 0 | 0 | 0 | 0 |
| Evaluation results | Film-forming properties (Inner layer & Outer layer film) | | | | — | ◯ | ◯ | ◯ | ◯ | ◯ | ◯ |
| | Bag rupture resistance characteristics | | | | — | ◯ | ◯ | ◯ | ◯ | ◯ | ◯ |
| | Pinhole resistance (Inner layer film) | | | | Holes | 4 | 4 | 4 | 4 | 3 | 5 |
| | Increment of TOC concentration of filling water | | | | ppm | 0.60 | 0.60 | 0.58 | 0.47 | 0.37 | 0.36 |

TABLE 6

| | Material Name | Unit | Example 7 | 8 | 9 | 10 | 11 | 12 |
|---|---|---|---|---|---|---|---|---|
| Content spout | Content spout A | — | ◯ | ◯ | ◯ | ◯ | ◯ | ◯ |
| | Content spout B | — | | | | | | |
| | Content spout C | — | | | | | | |
| | Content spout D | — | | | | | | |
| | Content spout E | — | | | | | | |
| Outer layer film | Outer layer film A | — | | | | | | |
| | Outer layer film B | — | | | | | | |
| | Outer layer film C | — | ◯ | ◯ | ◯ | ◯ | ◯ | ◯ |
| | Outer layer film D | — | | | | | | |
| | Outer layer film E | — | | | | | | |
| | Outer layer film F | — | | | | | | |
| | Outer layer film G | — | | | | | | |
| | Outer layer film H | — | | | | | | |
| | Outer layer film I | — | | | | | | |

TABLE 6-continued

| | | | | | | Example | | | | | |
|---|---|---|---|---|---|---|---|---|---|---|---|
| | | Material Name | | | Unit | 7 | 8 | 9 | 10 | 11 | 12 |
| Inner layer film | Formulation | Odor-adsorbing layer | Masterbatch | MB1 | Parts by mass | | | | | | |
| | | | | MB2 | Parts by mass | 12.52 | 4.14 | | 16.7 | 16.7 | 16.7 |
| | | | | MB3 | Parts by mass | | | | | | |
| | | | | MB4 | Parts by mass | | | | | | |
| | | | | MB5 | Parts by mass | | | | | | |
| | | | | MB6 | Parts by mass | 2.09 | 6.27 | | | | |
| | | | | MB7 | Parts by mass | | | 16.7 | | | |
| | | | | MB8 | Parts by mass | | | | | | |
| | | | | MB9 | Parts by mass | | | | | | |
| | | | Resin Low-elution polyethylene | Ultzex1520L | Parts by mass | 85.39 | 89.59 | 83.3 | | | |
| | | | | Ultzex2021L | Parts by mass | | | | 83.3 | | |
| | | | | Ultzex3520L | Parts by mass | | | | | 83.3 | |
| | | | | Neozex3510F | Parts by mass | | | | | | 83.3 |
| | | | General-purpose polyethylene | EvolueSP2020 | Parts by mass | | | | | | |
| | Non-odor adsorbing | Resin Low-elution polyethylene | Ultzex1520L | | Parts by mass | 100 | 100 | 100 | | | |
| | | | | Ultzex2021L | Parts by mass | | | | 100 | | |
| | | | | Ultzex3520L | Parts by mass | | | | | 100 | |
| | | | | Neozex3510F | Parts by mass | | | | | | 100 |
| | | | General-purpose polyethylene | EvolueSP2020 | Parts by mass | | | | | | |
| | Layer thickness | Sealant layer | | Non-odor adsorbing layer | μm | 16 | 16 | 16 | 16 | 16 | 16 |
| | | | | Odor adsorbing layer | μm | 48 | 48 | 48 | 48 | 48 | 48 |
| | | | | Non-odor adsorbing | μm | 16 | 16 | 16 | 16 | 16 | 16 |
| Characteristics | Polyethylene single film (Inner layer film) | Increment of TOC concentration of filling water | | Article unirradiated with UV | ppm | 0.74 | 0.74 | 0.74 | 0.51 | 0.34 | 0.41 |
| | | | | Article irradiated with UV | ppm | 0.88 | 0.88 | 0.88 | 0.61 | 0.4 | 0.49 |
| | | | | Pinhole resistance | Holes | 2 | 2 | 2 | 15 | 95 | 120 |
| | Content of the whole sealant layer of outer layer film | | | Hydrophobic Zeolite | % by mass | 1.7 | 1.7 | 1.7 | 1.7 | 1.7 | 1.7 |
| | | | | Chemical adsorbent-supported inorganic porous material | % by mass | 1.7 | 1.7 | 1.7 | 1.7 | 1.7 | 1.7 |
| | | | | Hydrophilic Zeolite | % by mass | 0 | 0 | 0 | 0 | 0 | 0 |
| | Content of the whole sealant layer of inner layer film | | | Hydrophobic Zeolite | % by mass | 0.75 | 0.25 | 1 | 1 | 1 | 1 |
| | | | | Chemical adsorbent-supported inorganic porous material | % by mass | 0.25 | 0.75 | 0 | 0 | 0 | 0 |
| | | | | Hydrophilic Zeolite | % by mass | 0 | 0 | 0 | 0 | 0 | 0 |
| Evaluation results | | | | Film-forming properties (Inner layer & Outer layer film) | — | ○ | ○ | ○ | ○ | ○ | ○ |
| | | | | Bag rapture resistance characteristics | — | ○ | ○ | ○ | ○ | ○ | ○ |
| | | | | Pinhole resistance (Inner layer film) | Holes | 4 | 4 | 5 | 20 | 106 | 135 |
| | | | | Increment of TOC concentration of filling water | ppm | 0.50 | 0.57 | 0.48 | 031 | 0.20 | 0.25 |

TABLE 7

|  |  |  |  |  | Example | | | | | |
|---|---|---|---|---|---|---|---|---|---|---|
|  | Material Name | | | Unit | 13 | 14 | 15 | 16 | 17 | 18 |
| Content spout | Content spout A | | | — | ○ | ○ | | | | |
|  | Content spout B | | | — | | | ○ | | | |
|  | Content spout C | | | — | | | | ○ | | |
|  | Content spout D | | | — | | | | | ○ | |
|  | Content spout E | | | — | | | | | | ○ |
| Outer layer film | Outer layer film A | | | — | | | | | | |
|  | Outer layer film B | | | — | | | | | | |
|  | Outer layer film C | | | — | ○ | ○ | | | | |
|  | Outer layer film D | | | — | | | ○ | | | |
|  | Outer layer film E | | | — | | | | ○ | | |
|  | Outer layer film F | | | — | | | | | ○ | |
|  | Outer layer film G | | | — | | | | | | ○ |
|  | Outer layer film H | | | — | | | | | | |
|  | Outer layer film I | | | — | | | | | | |
| Inner layer film | Formulation | Odor-adsorbing layer | Masterbatch | MB1 | Parts by mass | | | | | | |
|  |  |  |  | MB2 | Parts by mass | 8.33 | | 16.7 | 16.7 | 16.7 | 16.7 |
|  |  |  |  | MB3 | Parts by mass | | | | | | |
|  |  |  |  | MB4 | Parts by mass | | | | | | |
|  |  |  |  | MB5 | Parts by mass | | | | | | |
|  |  |  |  | MB6 | Parts by mass | 80 | | | | | |
|  |  |  |  | MB7 | Parts by mass | | | | | | |
|  |  |  |  | MB8 | Parts by mass | | 83.3 | | | | |
|  |  |  |  | MB9 | Parts by mass | | | | | | |
|  |  |  | Resin Low-elution polyethylene | Ultzex1520L | Parts by mass | 11.67 | 16.7 | 83.3 | 83.3 | 83.3 | 83.3 |
|  |  |  |  | Ultzex2021L | Parts by mass | | | | | | |
|  |  |  |  | Ultzex3520L | Parts by mass | | | | | | |
|  |  |  |  | Neozex3510F | Parts by mass | | | | | | |
|  |  |  | General-purpose polyethylene | EvolueSP2020 | Parts by mass | | | | | | |
|  |  | Non-odor adsorbing | Resin Low-elution polyethylene | Ultzex1520L | Parts by mass | 100 | 100 | 100 | 100 | 100 | 100 |
|  |  |  |  | Ultzex2021L | Parts by mass | | | | | | |
|  |  |  |  | Ultzex3520L | Parts by mass | | | | | | |
|  |  |  |  | Neozex3510F | Parts by mass | | | | | | |
|  |  |  | General-purpose polyethylene | EvolueSP2020 | Parts by mass | | | | | | |
|  | Layer thickness | Sealant layer | Non-odor adsorbing layer | | μm | 16 | 16 | 16 | 16 | 16 | 16 |
|  |  |  | Odor adsorbing layer | | μm | 48 | 48 | 48 | 48 | 48 | 48 |
|  |  |  | Non-odor adsorbing | | μm | 16 | 16 | 16 | 16 | 16 | 16 |
| Characteristics | Polyethylene single film (Inner layer film) | Increment of TOC concentration of filling water | Article unirradiated with UV | | ppm | 0.74 | 0.74 | 0.74 | 0.74 | 0.74 | 0.74 |
|  |  |  | Article irradiated with UV | | ppm | 0.88 | 0.88 | 0.88 | 0.88 | 0.88 | 0.88 |
|  |  | Pinhole resistance | | | Holes | 2 | 2 | 2 | 2 | 2 | 2 |
|  | Content of the whole sealant layer of outer layer film | Hydrophobic Zeolite | | | % by mass | 1.7 | 1.7 | 1.7 | 1.7 | 10 | 10 |
|  |  | Chemical adsorbent-supported inorganic porous material | | | % by mass | 1.7 | 1.7 | 1.7 | 1.7 | 0 | 0 |
|  |  | Hydrophilic Zeolite | | | % by mass | 0 | 0 | 0 | 0 | 0 | 0 |

TABLE 7-continued

|  | Material Name |  | Unit | Example 13 | Example 14 | Example 15 | Example 16 | Example 17 | Example 18 |
|---|---|---|---|---|---|---|---|---|---|
|  | Content of the whole sealant layer of inner layer film | Hydrophobic Zeolite | % by mass | 0.5 | 10 | 1 | 1 | 1 | 1 |
|  |  | Chemical adsorbent-supported inorganic porous material | % by mass | 10 | 0 | 0 | 0 | 0 | 0 |
|  |  | Hydrophilic Zeolite | % by | 0 | 0 | 0 | 0 | 0 | 0 |
| Evaluation results | Film-forming properties (Inner layer & Outer layer film) |  | — | ○ | ○ | ○ | ○ | ○ | ○ |
|  | Bag rapture resistance characteristics |  | — | ○ | Δ | ○ | ○ | Δ | Δ |
|  | Pinhole resistance (Inner layer film) |  | Holes | 3 | 8 | 4 | 5 | 5 | 4 |
|  | Increment of TOC concentration of filling water |  | ppm | 0.60 | 0.07 | 0.48 | 0.48 | 0.48 | 0.48 |

TABLE 8

|  |  |  | Material Name |  | Unit | Example 19 | Comparative Example 1 | Comparative Example 2 | Comparative Example 3 | Comparative Example 4 | Comparative Example 5 |
|---|---|---|---|---|---|---|---|---|---|---|---|
| Content spout |  |  | Content spout A |  | — | ○ | ○ | ○ | ○ | ○ | ○ |
|  |  |  | Content spout B |  | — |  |  |  |  |  |  |
|  |  |  | Content spout C |  | — |  |  |  |  |  |  |
|  |  |  | Content spout D |  | — |  |  |  |  |  |  |
|  |  |  | Content spout E |  | — |  |  |  |  |  |  |
| Outer layer film |  |  | Outer layer film A |  | — |  | ○ |  |  |  |  |
|  |  |  | Outer layer film B |  | — |  |  |  |  |  |  |
|  |  |  | Outer layer film C |  | — | ○ |  | ○ | ○ |  |  |
|  |  |  | Outer layer film D |  | — |  |  |  |  |  |  |
|  |  |  | Outer layer film E |  | — |  |  |  |  |  |  |
|  |  |  | Outer layer film F |  | — |  |  |  |  |  |  |
|  |  |  | Outer layer film G |  | — |  |  |  |  |  |  |
|  |  |  | Outer layer film H |  | — |  |  |  |  | ○ |  |
|  |  |  | Outer layer film I |  | — |  |  |  |  |  | ○ |
| Inner layer film | Formulation | Odor-adsorbing layer | Masterbatch | MB1 | Parts by mass |  |  |  |  |  |  |
|  |  |  |  | MB2 | Parts by mass |  |  |  |  |  |  |
|  |  |  |  | MB3 | Parts by mass |  |  |  |  |  |  |
|  |  |  |  | MB4 | Parts by mass |  |  |  |  |  |  |
|  |  |  |  | MB5 | Parts by mass |  |  | 16.7 |  |  |  |
|  |  |  |  | MB6 | Parts by mass |  |  |  |  |  |  |
|  |  |  |  | MB7 | Parts by mass |  |  |  |  |  |  |
|  |  |  |  | MB8 | Parts by mass |  |  |  | 75 | 75 | 75 |
|  |  |  |  | MB9 | Parts by mass | 16.7 |  |  |  |  |  |
|  |  | Resin | Low-elution polyethylene | Ultzex1520L | Parts by mass | 83.3 |  |  | 25 | 25 | 25 |
|  |  |  |  | Ultzex2021L | Parts by mass |  |  |  |  |  |  |
|  |  |  |  | Ultzex3520L | Parts by mass |  |  |  |  |  |  |
|  |  |  |  | Neozex3510F | Parts by mass |  |  |  |  |  |  |
|  |  |  | General-purpose polyethylene | EvolueSP2020 | Parts by mass |  | 100 | 83.3 |  |  |  |
|  |  | Non-odor adsorbing | Resin Low-elution polyethylene | Ultzex1520L | Parts by mass | 100 |  |  |  |  |  |
|  |  |  |  | Ultzex2021L | Parts by mass |  |  |  |  |  |  |
|  |  |  |  | Ultzex3520L | Parts by mass |  |  |  |  |  |  |
|  |  |  |  | Neozex3510F | Parts by mass |  |  |  |  |  |  |

TABLE 8-continued

|  |  |  |  | Example | Comparative Example | | | | |
|---|---|---|---|---|---|---|---|---|---|
| | Material Name | | Unit | 19 | 1 | 2 | 3 | 4 | 5 |
| Layer thickness | Sealant layer | General-purpose polyethylene EvolueSP2020 | Parts by mass | | 100 | 100 | | | |
| | | Non-odor adsorbing layer | μm | 16 | 80 | 16 | | | |
| | | Odor adsorbing layer | μm | 48 | | 48 | 80 | 80 | 80 |
| | | Non-odor adsorbing | μm | 16 | | 16 | | | |
| Characteristics | Polyethylene single film (Inner layer film) | Increment of TOC concentration of filling water | Article unirradiated with UV ppm | 0.74 | 2.56 | 2.56 | 0.74 | 0.74 | 0.74 |
| | | | Article irradiated with UV ppm | 0.88 | 3.07 | 3.07 | 0.88 | 0.88 | 0.88 |
| | | Pinhole resistance | Holes | 2 | 12 | 12 | 2 | 2 | 2 |
| | Content of the whole sealant layer of outer layer film | Hydrophobic Zeolite | % by mass | 1.7 | 0 | 1.7 | 1.7 | 16.7 | 16.7 |
| | | Chemical adsorbent-supported inorganic porous material | % by mass | 1.7 | 0 | 1.7 | 1.7 | 0 | 0 |
| | | Hydrophilic Zeolite | % by mass | 0 | 0 | 0 | 0 | 0 | 0 |
| | Content of the whole sealant layer of inner layer film | Hydrophobic Zeolite | % by mass | 1 | 0 | 0 | 15 | 15 | 15 |
| | | Chemical adsorbent-supported inorganic porous material | % by mass | 0 | 0 | 0 | 0 | 0 | 0 |
| | | Hydrophilic Zeolite | % by | 0 | 0 | 2.0 | 0 | 0 | 0 |
| Evaluation results | Film-forming properties (Inner layer & Outer layer film) | | — | ○ | ○ | ○ | ○ | × | × |
| | Bag rapture resistance characteristics | | — | ○ | ○ | ○ | × | × | × |
| | Pinhole resistance (Inner layer film) | | Holes | 4 | 12 | 21 | 20 | 20 | 20 |
| | Increment of TOC concentration of filling water | | ppm | 0.47 | 2.61 | 2.50 | 0.04 | 0.03 | 0.02 |

<Summary of Results>

The packages of all Examples exhibited favorable film formability, bag rupture resistance characteristics, heat sealing properties, and pinhole resistance and also had a small increased TOC concentration.

Comparative Example 1 using the outer layer film containing no odor adsorbent and the inner layer film containing neither the low elutable polyethylene nor the odor adsorbent, and Comparative Example 2 using the inner layer film containing no low elutable polyethylene and containing hydrophilic zeolite instead of hydrophobic zeolite exhibited a tendency of a high increased TOC concentration. Comparative Examples 3, 4, and 5 using the outer layer film or the inner layer film containing too large an amount of hydrophobic zeolite resulted in poor film formability of the outer layer film or the inner layer film and poor heat sealing properties and bag rupture resistance characteristics, though decrease in TOC concentration was large.

Object 3

EXAMPLES

The detailed raw materials used in Examples are as described below.

PET film 1: manufactured by Toyobo Co., Ltd., T4102, corona-treated on one side, thickness: 12 μm.

Aluminum foil 1: manufactured by Toyo Aluminium K.K., thickness: 7 μm.

[Resin Component of Sealant Film]

TABLE 1

| Resin No. | Supplier | Type of resin | Density [g/cm$^3$] | MFR [g/10 minutes] |
|---|---|---|---|---|
| Ultzex1520L | Prime Polymer Co., Ltd. | C6-LLDPE | 0.916 | 2.3 |
| Ultzex2021L | Prime Polymer Co., Ltd. | C6-LLDPE | 0.920 | 2.0 |
| Ultzex3520L | Prime Polymer Co., Ltd. | C6-LLDPE | 0.931 | 2.1 |

[Resin Component of Adhesion Layer (Extrusion Coating)]

LC600A: manufactured by Japan Polyethylene Corp., LDPE, MFR: 7.0 g/10 min, density: 0.918 g/cm$^3$

[Resin Component of Adhesion Layer (Dry Lamination)]

Dry lamination adhesive 1: manufactured by Rock Paint Co., Ltd., RU004/H-1, a polyester adhesive, amount of coating: 3.5 g/m$^2$ per adhesion layer, drying temperature: 70° C.

[Odor Adsorbent Material]

KESMON NS-241: manufactured by Toagosei Co., Ltd., an amino group-containing compound-supported inorganic porous material, average particle size: 3.5 μm.

[Hydrophobic Zeolite]

MIZUKASIEVES EX-122: manufactured by Mizusawa Industrial Chemicals, Ltd., SiO$_2$/Al$_2$O$_3$ molar ratio=32/1, average particle size=2.5 to 5.5μm.

SILTON MT400: manufactured by Mizusawa Industrial Chemicals, Ltd., SiO$_2$/Al$_2$O$_3$ molar ratio=400/1, average particle size=5 to 7μm.

SILTON MT2000: manufactured by Mizusawa Industrial Chemicals, Ltd., SiO$_2$/Al$_2$O$_3$ molar ratio=2000/1, average particle size=2 to 4 μm.

SILTON MT-8000: manufactured by Mizusawa Industrial Chemicals, Ltd., SiO$_2$/Al$_2$O$_3$ molar ratio=8000/1, average particle size=0.8μm.

Hydrophilic zeolite: MIZUKASIEVES Y-420 manufactured by Mizusawa Industrial Chemicals, Ltd., SiO$_2$/Al$_2$O$_3$ molar ratio=5/1, average particle size=5μm.

[Preparation of Master Batch]

Each master batch was prepared as described below.

(Preparation of Master Batch 1)

LLDPE Novatec LC600A as the thermoplastic resin A and hydrophobic zeolite MIZUKASIEVES EX-122 as the odor adsorbent material were melt-blended at the following proportions to obtain master batch 1 (MB1).

| Novatec LC600A | 90 parts by mass |
|---|---|
| MIZUKASIEVES EX-122 | 10 parts by mass |

(Preparation of Master Batches 2 to 7)

The thermoplastic resin A and the odor adsorbent material were melt-blended in the same way as in the master batch 1 according to the formulation of Table 2 to obtain master batches 2 to 7 (MB2 to MB7).

TABLE 2

| | | | | | Masterbatch | | | | | | |
|---|---|---|---|---|---|---|---|---|---|---|---|
| | | | | Unit | MB1 | MB2 | MB3 | MB4 | MB5 | MB6 | MB7 |
| Formulation ratio | odor adsorbent material | Hydrophobic zeolite | Mizukasieves EX-122 | Parts by mass | 10 | | | | | | |
| | | | Silton MT400 | Parts by mass | | 10 | | | 10 | 20 | |
| | | | Silton MT8000 | Parts by mass | | | 10 | | | | |
| | | Chemical adsorbent-supported inorganic porous material | Kesmon NS-241 | Parts by mass | | | | 10 | | | 20 |
| | Thermoplastic resin A | | Ultzex1520L | Parts by mass | | | | | 90 | | |
| | | | Novatec LC600A | Parts by mass | 90 | 90 | 90 | 90 | | 80 | 80 |

[Preparation of Odor-Adsorbing Sealant Layer Resin Composition]

(Preparation of Resin Composition 1 for Odor-Adsorbing Sealant Layer)

The master batch 1 (MB1) and LLDPE ULT-ZEX 1520L as the thermoplastic resin C were melt-blended at the following proportions to obtain odor-adsorbing sealant layer resin composition 1.

| Master batch 1 | 16.7 parts by mass |
|---|---|
| ULT-ZEX 1520L | 83.3 parts by mass |

(Preparation of Resin Compositions 2 to 12 for Odor-Adsorbing Sealant Layer)

The master batch and the thermoplastic resin C were melt-blended in the same way as in the resin composition 1 for the odor-adsorbing sealant layer according to the formulation of Table 3 to obtain odor-adsorbing sealant layer resin compositions 2 to 12.

TABLE 3

| | | | | Odor-adsorbing sealant layer resin composition | | | | | | | | | | | | |
|---|---|---|---|---|---|---|---|---|---|---|---|---|---|---|---|---|
| | | | Unit | 1 | 2 | 3 | 4 | 5 | 6 | 7 | 8 | 9 | 10 | 11 | 12 | 13 |
| Formulation | Master Batch | MB1 | Parts by mass | 16.7 | | | | | | | | | | | | |
| | | MB2 | Parts by mass | | 16.7 | | | 12 | 5 | 16.7 | 16.7 | 8.33 | | | | 33 |
| | | MB3 | Parts by mass | | | 16.7 | | | | | | | | | | |
| | | MB4 | Parts by mass | | | | | 5 | 12 | | | | | | | |
| | | MB5 | Parts by mass | | | | 16.7 | | | | | | | | | |
| | | MB6 | Parts by mass | | | | | | | | | | 83.3 | 20 | 85 | |
| | | MB7 | Parts by mass | | | | | | | | | | | 28.3 | | 67 |
| | Thermoplastic Resin C | Ultzex 1520L | Parts by mass | 83.3 | 83.3 | 83.3 | 83.3 | 83 | 83 | | | 91.67 | 16.7 | 51.7 | 15 | |
| | | Ultzex 2021L | Parts by mass | | | | | | | 83.3 | | | | | | |
| | | Ultzex 3520L | Parts by mass | | | | | | | | 83.3 | | | | | |
| Composition | Odor adsorbent material | Hydrophobic zeolite | Mizukasieves EX-122 | % by mass | 1.7 | | | | | | | | | | | | |
| | | | Silton MT400 | % by mass | | 1.7 | | 1.7 | 1.2 | 0.5 | 1.7 | 1.7 | 0.8 | 16.7 | 4.0 | 17.0 | 3.3 |
| | | | Silton MT8000 | % by mass | | | 1.7 | | | | | | | | | | |
| | | Chemical adsorbent-supported inorganic porous material | Kesmon NS-241 | % by mass | | | | | 0.5 | 1.2 | | | | | 5.7 | | 13.4 |
| | Thermoplastic Resin A, C | Ultzex 1520L | % by mass | 83.3 | 83.3 | 83.3 | 98.3 | 83.0 | 83.0 | | | 91.7 | 16.7 | 51.7 | 15.0 | |
| | | Ultzex 2021L | % by mass | | | | | | | 83.3 | | | | | | |
| | | Ultzex 3520L | % by mass | | | | | | | | 83.3 | | | | | |
| | | Novatec LC600A | % by mass | 15.0 | 15.0 | 15.0 | | 15.3 | 15.3 | 15.0 | 15.0 | 7.5 | 66.6 | 38.6 | 68.0 | 83.3 |
| | Total | | % by mass | 100.0 | 100.0 | 100.0 | 100.0 | 100.0 | 100.0 | 100.0 | 100.0 | 100.0 | 100.0 | 100.0 | 100.0 | 100.0 |

[Preparation of Adhesion Layer Resin Composition]

(Preparation of Adhesion Layer Resin Composition 1)

Hydrophobic zeolite MIZUKASIEVES EX-122 as the odor adsorbent material and dry lamination adhesive 1 as the adhesive were mixed at the following proportions to obtain adhesion layer resin composition 1.

| MIZUKASIEVES EX-122 | 10 parts by mass |
|---|---|
| Dry lamination adhesive 1 | 90 parts by mass |

(Preparation of Adhesion Layer Resin Compositions 2 to 12)

The odor adsorbent material or the master batch and the adhesive were melt-blended in the same way as in the adhesion layer resin composition 1 according to the formulation of Table 4 to obtain adhesion layer resin compositions 2 to 12.

TABLE 4

| | | | | Unit | For dry lamination | | | | | | For extrusion coating | | | | | |
|---|---|---|---|---|---|---|---|---|---|---|---|---|---|---|---|---|
| | | | | | 1 | 2 | 3 | 4 | 5 | 6 | 7 | 8 | 9 | 10 | 11 | 12 |
| Formulation | Odor adsorbent material | Hydrophobic zeolite | Mizukasieves EX-122 | Parts by mass | 10 | | | | | | | | | | | |
| | | | Silton MT400 | Parts by mass | | 10 | | 7.5 | 47 | 53 | | | | | | |
| | | | Silton MT8000 | Parts by mass | | | 10 | | | | | | | | | |
| | | Chemical adsorbent-supported inorganic porous material | Kesmon NS-241 | Parts by mass | | | | 2.5 | | | | | | | | |
| | | Master Batch | MB1 | Parts by mass | | | | | | | 16.7 | | | | | |
| | | | MB2 | Parts by mass | | | | | | | | 16.7 | | | 16.7 | |
| | | | MB3 | Parts by mass | | | | | | | | | 16.7 | | | |
| | | | MB4 | Parts by mass | | | | | | | | | | 16.7 | | |
| | | | MB5 | Parts by mass | | | | | | | | | | | 75 | |
| | | | MB6 | Parts by mass | | | | | | | | | | | | 26.4 |
| | | | MB7 | Parts by mass | | | | | | | | | | | | 26.4 |
| | Adhesive B | | Dry laminate adhesive 1 | Parts by mass | 90 | 90 | 90 | 90 | 53 | 47 | | | | | | |
| | | | LC600A | Parts by mass | | | | | | | 83.3 | 83.3 | 83.3 | 66.6 | 25.0 | 47.2 |
| Composition | Odor adsorbent material | Hydrophobic zeolite | Mikukasieves EX-122 | % by mass | 10 | | | | | | 1.7 | | | | | |
| | | | Silton MT400 | % by mass | | 10 | | 7.5 | 47 | 53 | | 1.7 | | 1.7 | 15 | 5.3 |
| | | | Silton MT8000 | % by mass | | | 10 | | | | | | 1.7 | | | |
| | | Chemical adsorbent-supported inorganic porous material | Kesmon NS-241 | % by mass | | | | 2.5 | | | | | | 1.7 | | 5.3 |
| | Thermoplastic Resin B | | Ultzex1520L | % by mass | | | | | | | | | | | | |
| | | | Novatec LC600A | % by mass | | | | | | | | | | | | |
| | | | RU004/H1 | % by mass | 90 | 90 | 90 | 90 | 53 | 47 | | | | | | |
| | | | LC600A | % by mass | | | | | | | 98.3 | 98.3 | 98.3 | 96.7 | 85 | 89.4 |
| | Total | | | % by mass | 100 | 100 | 100 | 100 | 100 | 100 | 100 | 100 | 100 | 100 | 100 | 100 |

Example 1

Odor-adsorbing sealant layer resin composition 1 for the odor-adsorbing sealant layer and ULT-ZEX 1520L for the non-odor-adsorbing sealant layer were used in film formation and lamination by inflation at 160° C. to prepare a sealant film having a non-odor-adsorbing layer (10 μm)/odor-adsorbing layer (30 μm)/non-odor-adsorbing layer (10 μm) 3-layer configuration.

Subsequently, dry lamination adhesive 1 was applied to the corona-treated side of PET film 1 such that the amount of coating after drying was 3.5 g/m². After drying at 70° C., aluminum foil 1 was laminated thereto by the dry lamination method to obtain a laminate precursor.

Then, adhesive 1 for the non-odor-adsorbing adhesion layer was applied onto the aluminum foil 1 side of the laminate precursor such that the amount of coating after drying was 3.5 g/m². The adhesive was dried at 70° C.

Subsequently, the sealant film having a 3-layer configuration obtained as described above was laminated onto the dry lamination adhesive 1 side to obtain an odor-adsorbing laminate.

The layer configuration of the obtained odor-adsorbing laminate is as described below. The detailed layer configuration and evaluation results are shown in Table 5. PET film 1 (12 μm)/adhesion layer (3.5 g/m²)/aluminum foil 1 (7 μm)/non-odor-adsorbing adhesion layer (3.5 g/m²)/non-odor-adsorbing layer (10 μm)/odor-adsorbing layer (30 μm)/non-odor-adsorbing layer (10 μm)

Examples 2 to 8 and 10 to 12

Each sealant film was obtained by the same operation as in Example 1 except that the resin for the non-odor-adsorbing sealant layer and the odor-adsorbing sealant layer resin composition were changed as described in Table 5.

Subsequently, each laminate precursor was obtained by the same operation as in Example 1.

Then, the non-odor-adsorbing adhesion layer was formed on the laminate precursor by the same operation as in Example 1, and the sealant film obtained as described above was laminated thereto to obtain an odor-adsorbing laminate. The detailed layer configuration and evaluation results are shown in Tables 5 and 6.

Example 9

A sealant film was obtained by the same operation as in Example 1 except that the sealant film had a single-layered configuration consisting of only the odor-adsorbing sealant layer (50 μm) using only odor-adsorbing sealant layer resin composition 9.

Subsequently, a laminate precursor was prepared by the same operation as in Example 1. The non-odor-adsorbing adhesion layer was formed thereon, and the sealant film obtained as described above was laminated thereto to obtain an odor-adsorbing laminate. The detailed layer configuration and evaluation results are shown in Table 6.

Example 13

First, a sealant film was obtained by the same operation as in Example 1 except that the odor-adsorbing sealant layer resin composition 1 was changed to odor-adsorbing sealant layer resin composition 2.

Subsequently, a laminate precursor was prepared by the same operation as in Example 1.

Then, adhesion layer resin composition 1 for dry lamination for the odor-adsorbing adhesion layer was applied onto the aluminum foil 1 side of the obtained laminate precursor such that the amount of coating after drying was 3.5 g/m$^2$. The resin composition was dried at 70° C.

Subsequently, the sealant film obtained as described above was laminated onto the adhesion layer resin composition 1 side to obtain an odor-adsorbing laminate. The detailed layer configuration and evaluation results are shown in Table 5.

Examples 14 to 16 and Comparative Example 3

Each odor-adsorbing laminate was obtained by the same operation as in Example 11 except that the adhesion layer resin composition 1 was changed to adhesion layer resin compositions 2 to 5 according to the combination described in Table 5. The detailed layer configuration and evaluation results are shown in Table 6.

Examples 17 to 23

Each odor-adsorbing laminate was obtained by the same operation as in Example 11 except that the odor-adsorbing adhesion layer was laminated using adhesion layer resin compositions 6 to 11 for extrusion instead such that the layer thickness was 15 μm. The detailed layer configuration and evaluation results are shown in Tables 7 and 8.

Example 24

An odor-adsorbing laminate was obtained by the same operation as in Example 23 except that the sealant layer was only a 50 μm thick non-odor-adsorbing sealant layer consisting of ULT-ZEX 1520L. The detailed layer configuration and evaluation results are shown in Table 8.

Comparative Example 1

A sealant film consisting of a single layer of only a non-odor-adsorbing sealant layer consisting of ULT-ZEX 1520L was prepared.

Subsequently, a laminate precursor was obtained by the same operation as in Example 1.

Then, an odor-adsorbing laminate was obtained by the same operation as in Example 1. The detailed layer configuration and evaluation results are shown in Table 8.

Comparative Example 2

A sealant film consisting of a single layer of only an odor-adsorbing sealant layer consisting of odor-adsorbing sealant layer resin composition 12 was prepared.

Subsequently, a laminate precursor was obtained by the same operation as in Example 1.

Then, an odor-adsorbing laminate was obtained by the same operation as in Example 1. The detailed layer configuration and evaluation results are shown in Table 8.

<Evaluation Method>

[Heat Sealing Properties]

The odor-adsorbing laminate prepared in each Example or Comparative Example was cut into a size of 10 cm×10 cm, which was then folded and overlaid in half. A 1 cm×10 cm region was heat-sealed using a heat seal tester (manufactured by Tester Sangyo Co., Ltd.; TP-701-A) without heat-sealing and adhesively bonding an end part to prepare a sample in a biforked state.

This sample was cut into 15 mm wide strips. The biforked end part of each strip was attached to a tensile tester, and the tensile strength (N/15 mm) was measured and accepted or rejected.

(Heat Sealing Conditions)
Temperature: 160° C.
Pressure: 1 kgf/cm$^2$
Time: 1 sec
(Tensile Strength Test Conditions)
Testing rate: 300 mm/min
Load range: 50 N
(Acceptation and Rejection Criteria)
Good (indicated by circle): 30 N/15 mm or more, accepted.
Poor (indicated by x-mark): Less than 30 N/15 mm, rejected.

[Change in Taste and Odor]

The odor-adsorbing laminate obtained in each Example or Comparative Example was used to prepare a pouch bag (13 cm×17 cm). The inner face of each laminate was subjected to disinfection treatment by UV irradiation in advance.

Each package thus obtained was hot-packed with 100 g of water (manufactured by Suntory Holdings Ltd., Minami Alps no Tennensui) of 65° C. to prepare a liquid-packed package, which was then stored at 10° C. for 1 week. Then, sensory evaluation was conducted as to change in taste and odor.

The evaluation index is as described below. The number of participants in the sensory evaluation experiment was 5, and an average value was calculated and used as evaluation results.

1: Taste and odor were heavy.
2: Taste and odor were slightly lessened.
3: Taste and odor were drastically lessened.
4: Taste and odor were equivalent to those of water before packing.

TABLE 5

| | Material Name | | | Unit | Example 1 | 2 | 3 | 4 | 5 | 6 | 7 |
|---|---|---|---|---|---|---|---|---|---|---|---|
| Base material layer | PET Film 1 | | | μm | 12 | 12 | 12 | 12 | 12 | 12 | 12 |
| Adhesive Layer | Non-odor-adsorbing adhesion layer | Dry lamination adhesive 1 | | g/m² | 3.5 | 3.5 | 3.5 | 3.5 | 3.5 | 3.5 | 3.5 |
| Functional layer | Al foil | | | μm | 7 | 7 | 7 | 7 | 7 | 7 | 7 |
| Adhesive Layer | Non-odor-adsorbing adhesion layer | Dry lamination adhesive 1 | | g/m² | 3.5 | 3.5 | 3.5 | 3.5 | 3.5 | 3.5 | 3.5 |
| | Odor-adsorbing adhesion layer | Dry laminate Adhesion layer resin composition | 1 | g/m² | | | | | | | |
| | | | 2 | g/m² | | | | | | | |
| | | | 3 | g/m² | | | | | | | |
| | | | 4 | g/m² | | | | | | | |
| | | | 5 | g/m² | | | | | | | |
| | | | 6 | g/m² | | | | | | | |
| | | Extrusion coat Adhesion layer resin composition | 7 | μm | | | | | | | |
| | | | 8 | μm | | | | | | | |
| | | | 9 | μm | | | | | | | |
| | | | 10 | μm | | | | | | | |
| | | | 11 | μm | | | | | | | |
| | | | 12 | μm | | | | | | | |
| Sealant layer | Non-odor-adsorbing sealant layer | Ultzex1520L | | μm | 10 | 10 | 10 | 10 | 10 | 10 | |
| | | Ultzex2021L | | μm | | | | | | | 10 |
| | | Ultzex3520L | | μm | | | | | | | |
| | Odor-adsorbing sealant layer | Odor-adsorbing sealant layer resin composition | 1 | μm | 30 | | | | | | |
| | | | 2 | μm | | 30 | | | | | |
| | | | 3 | μm | | | 30 | | | | |
| | | | 4 | μm | | | | 30 | | | |
| | | | 5 | μm | | | | | 30 | | |
| | | | 6 | μm | | | | | | 30 | |
| | | | 7 | μm | | | | | | | 30 |
| | | | 8 | μm | | | | | | | |
| | | | 9 | μm | | | | | | | |
| | | | 10 | μm | | | | | | | |
| | | | 11 | μm | | | | | | | |
| | | | 12 | μm | | | | | | | |
| | Non-odor-adsorbing sealant layer | Ultzex1520L | | μm | 10 | 10 | 10 | 10 | 10 | 10 | |
| | | Ultzex2021L | | μm | | | | | | | 10 |
| | | Ultzex3520L | | μm | | | | | | | |
| Characteristics | Content of the odor adsorbent material in the adhesion layer | Hydrophobic zeolite | | % by mass | 0 | 0 | 0 | 0 | 0 | 0 | 0 |
| | | Chemical adsorbent-supported inorganic porous material | | % by mass | 0 | 0 | 0 | 0 | 0 | 0 | 0 |
| | | Total | | % by mass | 0 | 0 | 0 | 0 | 0 | 0 | 0 |
| | Content of the odor adsorbent material in the sealant layer | Hydrophobic zeolite | | % by mass | 0.3 | 0.3 | 0.3 | 0.3 | 0.22 | 0.09 | 0.3 |
| | | Chemical adsorbent-supported inorganic porous material | | % by mass | 0 | 0 | 0 | 0 | 0.09 | 0.22 | 0 |
| | | Total | | % by mass | 0.3 | 0.3 | 0.3 | 0.3 | 0.31 | 0.31 | 0.3 |
| Evaluation Result | Sealing strength | | | — | ○ | ○ | ○ | ○ | ○ | ○ | ○ |
| | Change in odor and taste | | | — | 3 | 3.5 | 3.5 | 3.5 | 3.5 | 3 | 3.5 |

TABLE 6

| | Material Name | | | Unit | Example 8 | 9 | 10 | 11 | 12 | 13 | 14 | 15 |
|---|---|---|---|---|---|---|---|---|---|---|---|---|
| Base material layer | PET Film 1 | | | μm | 12 | 12 | 12 | 12 | 12 | 12 | 12 | 12 |
| Adhesive Layer | Non-odor-adsorbing adhesion layer | Dry lamination adhesive 1 | | g/m² | 3.5 | 3.5 | 3.5 | 3.5 | 35 | 3.5 | 3.5 | 3.5 |
| Functional layer | Al foil | | | μm | 7 | 7 | 7 | 7 | 7 | 7 | 7 | 7 |
| | Non-odor-adsorbing adhesion layer | Dry lamination adhesive 1 | | g/m² | 3.5 | 3.5 | 3.5 | 3.5 | 3.5 | | | |
| | Odor-adsorbing adhesion layer | Dry laminate Adhesion layer | 1 | g/m² | | | | | | 3.5 | | |
| | | | 2 | g/m² | | | | | | | 3.5 | |

TABLE 6-continued

|  | Material Name |  |  | Unit | Example 8 | 9 | 10 | 11 | 12 | 13 | 14 | 15 |
|---|---|---|---|---|---|---|---|---|---|---|---|---|
|  |  | resin | 3 | g/m² |  |  |  |  |  |  |  | 3.5 |
|  |  | composition | 4 | g/m² |  |  |  |  |  |  |  |  |
|  |  |  | 5 | g/m² |  |  |  |  |  |  |  |  |
|  |  |  | 6 | g/m² |  |  |  |  |  |  |  |  |
|  | Extrusion | Adhesion | 7 | μm |  |  |  |  |  |  |  |  |
|  | coat | layer | 8 | μm |  |  |  |  |  |  |  |  |
|  |  | resin | 9 | μm |  |  |  |  |  |  |  |  |
|  |  | composition | 10 | μm |  |  |  |  |  |  |  |  |
|  |  |  | 11 | μm |  |  |  |  |  |  |  |  |
|  |  |  | 12 | μm |  |  |  |  |  |  |  |  |
| Sealant layer | Non-odor-adsorbing sealant layer | Ultzex1520L |  | μm |  |  | 2.5 | 10 | 10 | 10 | 10 | 10 |
|  |  | Ultzex2021L |  | μm |  |  |  |  |  |  |  |  |
|  |  | Ultzex3520L |  | μm | 10 |  |  |  |  |  |  |  |
| Odor-adsorbing sealant layer | Odor-adsorbing sealant layer resin composition | 1 | μm |  |  |  |  |  |  |  |  |  |
|  |  | 2 | μm |  |  |  |  |  | 30 | 30 | 30 |  |
|  |  | 3 | μm |  |  |  |  |  |  |  |  |  |
|  |  | 4 | μm |  |  |  |  |  |  |  |  |  |
|  |  | 5 | μm |  |  |  |  |  |  |  |  |  |
|  |  | 6 | μm |  |  |  |  |  |  |  |  |  |
|  |  | 7 | μm | 30 |  |  |  |  |  |  |  |  |
|  |  | 8 | μm |  | 50 |  |  |  |  |  |  |  |
|  |  | 9 | μm |  |  | 45 |  |  |  |  |  |  |
|  |  | 10 | μm |  |  |  | 30 |  |  |  |  |  |
|  |  | 11 | μm |  |  |  |  |  |  |  |  |  |
|  |  | 12 | μm |  |  |  |  | 30 |  |  |  |  |
|  | Non-odor-adsorbing sealant layer | Ultzex1520L |  | μm |  |  | 2.5 | 10 | 10 | 10 | 10 | 10 |
|  |  | Ultzex2021L |  | μm |  |  |  |  |  |  |  |  |
|  |  | Ultzex3520L |  | μm | 10 |  |  |  |  |  |  |  |
| Characteristics | Content of the odor adsorbent material in the adhesion layer | Hydrophobic zeolite | | % by mass | 0 | 0 | 0 | 0 | 0 | 10.0 | 10.0 | 10.0 |
|  |  | Chemical adsorbent-supported inorganic porous material |  | % by mass | 0 | 0 | 0 | 0 | 0 | 0 | 0 | 0 |
|  |  | Total |  | % by mass | 0 | 0 | 0 | 0 | 0 | 10.0 | 10.0 | 10.0 |
|  | Content of the odor adsorbent material in the sealant layer | Hydrophobic zeolite |  | % by mass | 1.0 | 0.83 | 15 | 2.4 | 2.0 | 1.0 | 1.0 | 1.0 |
|  |  | Chemical adsorbent-supported inorganic porous material |  | % by mass | 0 | 0 | 0 | 3.4 | 8.0 | 0 | 0 | 0 |
|  |  | Total |  | % by mass | 1.0 | 0.83 | 15 | 5.8 | 10.0 | 1.0 | 1.0 | 1.0 |
| Evaluation Result | Sealing strength |  |  | — | ○ | ○ | ○ | ○ | ○ | ○ | ○ | ○ |
|  | Change in odor and taste |  |  | — | 3.5 | 3 | 4 | 4 | 4 | 3.5 | 4 | 4 |

TABLE 7

|  | Material Name |  |  | Unit | Example 16 | 17 | 18 | 19 | 20 | 21 | 22 |
|---|---|---|---|---|---|---|---|---|---|---|---|
| Base material layer |  | PET Film 1 |  | μm | 12 | 12 | 12 | 12 | 12 | 12 | 12 |
| Adhesive Layer | Non-odor-adsorbing adhesion layer | Dry lamination adhesive 1 |  | g/m² | 3.5 | 3.5 | 3.5 | 3.5 | 3.5 | 3.5 | 3.5 |
| Functional layer |  | Al foil |  | μm | 7 | 7 | 7 | 7 | 7 | 7 | 7 |
| Adhesive Layer | Non-odor-adsorbing adhesion layer | Dry lamination adhesive 1 |  | g/m² |  |  |  |  |  |  |  |
|  | Odor-adsorbing adhesion layer | Dry laminate Adhesion layer resin composition | 1 | g/m² |  |  |  |  |  |  |  |
|  |  |  | 2 | g/m² |  |  |  |  |  |  |  |
|  |  |  | 3 | g/m² |  |  |  |  |  |  |  |
|  |  |  | 4 | g/m² | 3.5 |  |  |  |  |  |  |
|  |  |  | 5 | g/m² |  | 3.5 |  |  |  |  |  |
|  |  |  | 6 | g/m² |  |  |  |  |  |  |  |
|  |  | Extrusion coat Adhesion layer resin composition | 7 | μm |  |  | 15 |  |  |  |  |
|  |  |  | 8 | μm |  |  |  | 15 |  |  |  |
|  |  |  | 9 | μm |  |  |  |  | 15 |  |  |
|  |  |  | 10 | μm |  |  |  |  |  | 15 |  |
|  |  |  | 11 | μm |  |  |  |  |  |  | 15 |
|  |  |  | 12 | μm |  |  |  |  |  |  |  |

TABLE 7-continued

|  | Material Name |  |  | Unit | Example 16 | 17 | 18 | 19 | 20 | 21 | 22 |
|---|---|---|---|---|---|---|---|---|---|---|---|
| Sealant layer | Non-odor-adsorbing sealant layer | Ultzex1520L |  | μm | 10 | 10 | 10 | 10 | 10 | 10 |  |
|  |  | Ultzer2021L |  | μm |  |  |  |  |  |  |  |
|  |  | Ultzex3520L |  | μm |  |  |  |  |  |  |  |
|  | Odor-adsorbing sealant layer | Odor-adsorbing sealant layer resin composition | 1 | μm |  |  |  |  |  |  |  |
|  |  |  | 2 | μm | 30 | 30 | 30 | 30 | 30 | 30 | 30 |
|  |  |  | 3 | μm |  |  |  |  |  |  |  |
|  |  |  | 4 | μm |  |  |  |  |  |  |  |
|  |  |  | 5 | μm |  |  |  |  |  |  |  |
|  |  |  | 6 | μm |  |  |  |  |  |  |  |
|  |  |  | 7 | μm |  |  |  |  |  |  |  |
|  |  |  | 8 | μm |  |  |  |  |  |  |  |
|  |  |  | 9 | μm |  |  |  |  |  |  |  |
|  |  |  | 10 | μm |  |  |  |  |  |  |  |
|  |  |  | 11 | μm |  |  |  |  |  |  |  |
|  |  |  | 12 | μm |  |  |  |  |  |  |  |
|  | Non-odor-adsorbing sealant layer | Ultzex1520L |  | μm | 10 | 10 | 10 | 10 | 10 | 10 | 10 |
|  |  | Ultzex2021L |  | μm |  |  |  |  |  |  |  |
|  |  | Ultzex3520L |  | μm |  |  |  |  |  |  |  |
| Characteristics | Content of the odor adsorbent material in the adhesion layer | Hydrophobic zeolite | | % by mass | 7.5 | 47 | 1.67 | 1.67 | 1.67 | 1.67 | 15 |
|  |  | Chemical adsorbent-supported inorganic porous material | | % by mass | 2.5 | 0 | 0 | 0 | 0 | 1.67 | 0 |
|  |  | Total | | % by mass | 10.0 | 47 | 1.67 | 1.67 | 1.67 | 3.34 | 15 |
|  | Content of the odor adsorbent material in the sealant layer | Hydrophobic zeolite | | % by mass | 1.0 | 1.0 | 1.0 | 1.0 | 1.0 | 1.0 | 1.25 |
|  |  | Chemical adsorbent-supported inorganic porous material | | % by mass | 0 | 0 | 0 | 0 | 0 | 0 | 0 |
|  |  | Total | | % by mass | 1.0 | 1.0 | 1.0 | 1.0 | 1.0 | 1.0 | 1.25 |
| Evaluation Result | Sealing strength | | | — | ○ | ○ | ○ | ○ | ○ | ○ | ○ |
|  | Change in odor and taste | | | — | 4 | 4 | 4 | 4 | 4 | 4 | 4 |

TABLE 8

|  | Material Name |  |  | Unit | Example 23 | 24 | Comparative example 1 | 2 | 3 |
|---|---|---|---|---|---|---|---|---|---|
| Base material layer |  | PET Film 1 |  | μm | 12 | 12 | 12 | 12 | 12 |
| Adhesive Layer | Non-odor-adsorbing adhesion layer | Dry lamination adhesive 1 |  | g/m² | 3.5 | 3.5 | 3.5 | 3.5 | 3.5 |
| Functional layer |  | Al foil |  | μm | 7 | 7 | 7 | 7 | 7 |
| Adhesive Layer | Non-odor-adsorbing adhesion layer | Dry lamination adhesive 1 |  | g/m² |  |  |  | 3.5 | 3.5 |
|  | Odor-adsorbing adhesion layer | Dry laminate | Adhesion layer resin composition | 1 | g/m² |  |  |  |  |  |
|  |  |  |  | 2 | g/m² |  |  |  |  |  |
|  |  |  |  | 3 | g/m² |  |  |  |  |  |
|  |  |  |  | 4 | g/m² |  |  |  |  |  |
|  |  |  |  | 5 | g/m² |  |  |  |  |  |
|  |  |  |  | 6 | g/m² |  |  |  |  | 3.5 |
|  |  | Extrusion coat | Adhesion layer resin composition | 7 | μm |  |  |  |  |  |
|  |  |  |  | 8 | μm |  |  |  |  |  |
|  |  |  |  | 9 | μm |  |  |  |  |  |
|  |  |  |  | 10 | μm |  |  |  |  |  |
|  |  |  |  | 11 | μm |  |  |  |  |  |
|  |  |  |  | 12 | μm | 15 | 15 |  |  |  |
| Sealant layer | Non-odor-adsorbing sealant layer | Ultzex1520L |  | μm | 10 | 50 | 50 |  | 10 |
|  |  | Ultzex2021L |  | μm |  |  |  |  |  |
|  |  | Ultzex3520L |  | μm |  |  |  |  |  |
|  | Odor-adsorbing sealant layer | Odor-adsorbing sealant layer resin composition | 1 | μm |  |  |  |  |  |
|  |  |  | 2 | μm | 30 |  |  |  | 30 |
|  |  |  | 3 | μm |  |  |  |  |  |
|  |  |  | 4 | μm |  |  |  |  |  |
|  |  |  | 5 | μm |  |  |  |  |  |
|  |  |  | 6 | μm |  |  |  |  |  |
|  |  |  | 7 | μm |  |  |  |  |  |
|  |  |  | 8 | μm |  |  |  |  |  |

TABLE 8-continued

| | Material Name | | Unit | Example 23 | Example 24 | Comp. 1 | Comp. 2 | Comp. 3 |
|---|---|---|---|---|---|---|---|---|
| | | | 9 μm | | | | | |
| | | | 10 μm | | | | | |
| | | | 11 μm | | | | | |
| | | | 12 μm | | | | 50 | |
| | Non-odor-adsorbing sealant layer | Ultzex1520L | μm | 10 | | | | 10 |
| | | Ultzex2021L | μm | | | | | |
| | | Ultzex3520L | μm | | | | | |
| Characteristics | Content of the odor adsorbent material in the adhesion layer | Hydrophobic zeolite | % by mass | 5.3 | 5.3 | 0 | 0 | 53 |
| | | Chemical adsorbent-supported inorganic porous material | % by mass | 5.3 | 5.3 | 0 | 0 | 0 |
| | | Total | % by mass | 10.6 | 10.6 | 0 | 0 | 53 |
| | Content of the odor adsorbent material in the sealant layer | Hydrophobic zeolite | % by mass | 1.0 | 0 | 0 | 17 | 1.0 |
| | | Chemical adsorbent-supported inorganic porous material | % by mass | 0 | 0 | 0 | 0 | 0 |
| | | Total | % by mass | 1.0 | 0 | 0 | 17 | 1.0 |
| Evaluation Result | Sealing strength | | — | ○ | ○ | ○ | X | X |
| | Change in odor and taste | | — | 4 | 4 | 1 | 4 | 4 |

<Summary of Results>

The packages of all Examples to which the sealant film and the adhesion layer (extrusion coating layer and dry lamination layer) supplemented with the odor adsorbent were applied produced favorable heat sealing properties and sensory evaluation results.

Comparative Example 1 involving no odor adsorbent material was not improved in sensory evaluation results, though heat sealing properties were favorable. Comparative Examples 2 and 3 using the sealant film and the adhesion layer (extrusion coating layer and dry lamination layer) containing an excess of the odor adsorbent material tended to worsen heat sealing properties, though sensory evaluation results were favorable.

Object 4

EXAMPLES

The detailed raw materials used in Examples are as described below.

[Low Elutable Polyethylene for Inner Layer Film and Outer Layer Film and General-Purpose Polyethylene]

TABLE 1

| Elution property | Polyethylene No | Supplier | Type of Polyethylene | Density [g/cm$^3$] | MFR [g/10 minutes] |
|---|---|---|---|---|---|
| Low elution property | Ultzex1520L | Prime Polymer Co., Ltd. | C6-LLDPE | 0.916 | 2.3 |
| | Ultzex2021L | Prime Polymer Co., Ltd. | C6-LLDPE | 0.920 | 2.0 |
| | Ultzex3520L | Prime Polymer Co., Ltd. | C6-LLDPE | 0.931 | 2.1 |
| | Neo-Zex3510F | Prime Polymer Co., Ltd. | C4-LLDPE | 0.933 | 1.6 |
| General purpose | EvolueSP2020 | Prime Polymer Co., Ltd. | C6-LLDPE | 0.916 | 2.1 |

[Resin for Content Spout Resin Composition]

TABLE 2

| Content spout | Polyethylene No. | Supplier | Type of Polyethylene | Density [g/cm$^3$] | MFR [g/10 minutes] |
|---|---|---|---|---|---|
| Content spout A | Novatec UF370 | Japan Polyethylene Corporation | LLDPE | 0.921 | 16 |
| Content spout B | Novatec UF580 | Japan Polyethylene Corporation | LLDPE | 0.925 | 20 |
| Content spout C | Novatec LJ8041 | Japan Polyethylene Corporation | LDPE | 0.918 | 23 |
| Content spout D | Novatec LJ902 | Japan Polyethylene Corporation | LDPE | 0.915 | 45 |
| Content spout E | Novatec HJ362N | Japan Polyethylene Corporation | HDPE | 0.953 | 5 |

[Odor Adsorbent Material]
(Chemical Adsorbent-Supported Inorganic Porous Material)
KESMON NS-241: manufactured by Toagosei Co., Ltd., an amino group-containing compound-supported inorganic porous material, average particle size: 3.5 μm.
(Hydrophobic Zeolite)
MIZUKASIEVES EX-122: manufactured by Mizusawa Industrial Chemicals, Ltd., $SiO_2/Al_2O_3$ molar ratio=32/1, average particle size: 2.5 to 5.5 μm.
SILTON MT400: manufactured by Mizusawa Industrial Chemicals, Ltd., $SiO_2/Al_2O_3$ molar ratio=400/1, average particle size: 5 to 7μm.
SILTON MT2000: manufactured by Mizusawa Industrial Chemicals, Ltd., $SiO_2/Al_2O_3$ molar ratio=2000/1, average particle size: 2 to 4 μm.
SILTON MT-8000: manufactured by Mizusawa Industrial Chemicals, Ltd., $SiO_2/Al_2O_3$ molar ratio=8000/1, average particle size: 0.8μm.
(Hydrophilic Zeolite)
MIZUKASIEVES Y-420: manufactured by Mizusawa Industrial Chemicals, Ltd., $SiO_2/Al_2O_3$ molar ratio=5/1, average particle size: 5μm.
[Others]
EMB-21: manufactured by Sumitomo Chemical Co., Ltd., an antiblocking agent.

PEX ABT-16: Japan Polyethylene Corp., an antiblocking agent.
EMB-10: Sumitomo Chemical Co., Ltd., a slipping agent.

[Preparation of Master Batch]

Each MB (master batch) was prepared as described below.

(Preparation of MB1)

LLDPE ULT-ZEX 1520L as the low elutable polyethylene and hydrophobic zeolite MIZUKASIEVES EX-122 were melt-blended at the following proportions to obtain master batch 1 (MB1).

| | |
|---|---|
| ULT-ZEX 1520L | 90 parts by mass |
| MIZUKASIEVES EX-122 | 10 parts by mass |

(Preparation of MB2 to MB9)

The raw materials were melt-blended in the same way as in MB1 according to the formulation of Table 3 to obtain master batches 2 to 9 (MB2 to MB9).

TABLE 3

| | | | | MB for inner layer film | | | | | | | | |
|---|---|---|---|---|---|---|---|---|---|---|---|---|
| | | Unit | 1 | 2 | 3 | 4 | 5 | 6 | 7 | 8 | 9 |
| Thermoplastic resin | Ultzex1520L | Parts by mass | 90 | 90 | 90 | 90 | 90 | 80 | 90 | 80 | |
| | Novatec LC600A | Parts by mass | | | | | | | | | 90 |
| Hydrophobic zeolite | Mizukasieves EX-122 | Parts by mass | 10 | | | | | | | | |
| | Silton MT400 | Parts by mass | | 10 | | | | | 10 | 20 | 10 |
| | Silton MT2000 | Parts by mass | | | 10 | | | | | | |
| | Silton MT8000 | Parts by mass | | | | 10 | | | | | |
| Hydrophilic zeolite | Mizukasieves Y-420 | Parts by mass | | | | | 10 | | | | |
| Chemical adsorbent-supported inorganic porous material | Kesmon NS-241 | Parts by mass | | | | | | 20 | | | |

[Preparation of Outer Layer Film]

The outer layer films A, B, and C described in Table 4 were prepared.

(Preparation of Outer Layer Film A)

ULT-ZEX 1520L was used in film formation by inflation at 160° C. to prepare 80 μm thick outer layer sealant film A.

(Preparation of Outer Layer Film B)

ULT-ZEX 1520L was used in film formation by inflation at 160° C. to prepare a 40 μm thick sealant film. Next, biaxially drawn nylon film BONYL RX (15 μm thick, KOHJIN Film & Chemicals Co., Ltd.) as the base material layer and the sealant film obtained as described above were laminated via LDPE resin (Novatec LC520, Japan Polyethylene Corp.) as an adhesion layer by the extrusion coating method at 320° C. to obtain outer layer film B having a biaxially drawn nylon film (15 μm)/LDPE (15 μm)/sealant film (40 μm) 3-layer configuration.

(Preparation of Outer Layer Film C)

Outer layer film C was obtained by the same operation as in the outer layer film B except that the base material layer was changed to biaxially drawn nylon film IB-ONY (15 μm thick, Dai Nippon Printing Co., Ltd., a gas-barrier drawn nylon film).

TABLE 4

| | | | | | Outer layer film | | |
|---|---|---|---|---|---|---|---|
| | | | | Unit | A | B | C |
| Layer thickness | Base material layer | Biaxially drawn nylon film | BonilRX | μm | | 15 | |
| | | | IB-ONY (gas-barrier) | μm | | | 15 |

TABLE 4-continued

| | | | | Unit | Outer layer film A | B | C |
|---|---|---|---|---|---|---|---|
| | Adhesion layer | LDPE | NovatecL C520 | μm | | 15 | 15 |
| Sealant Layer | Non-odor-adsorbing layer | Low elution polyethylene | Ultzex1520L | μm | 80 | 40 | 40 |
| Evaluation result | | Film-forming property | | — | ○ | ○ | ○ |

[Preparation of Content Spout]

Content spout A was prepared by injection molding at 200° C. using Novatec UF370. Likewise, content spouts B to E were prepared according to the description of Table 2.

Example 1

[Preparation of Inner Layer Film]

The following raw materials were melt-kneaded at the following proportions to prepare a resin composition for the odor-adsorbing layer.

| MB1 | 16.7 parts by mass |
|---|---|
| ULT-ZEX 1520L | 83.3 parts by mass |

ULT-ZEX 1520L for non-odor-adsorbing layers 1 and 2 and the resin composition for the odor-adsorbing layer obtained as described above were used in film formation and lamination by inflation at 160° C. to obtain a film for the sealant layer having a non-odor-adsorbing layer 1 (16 μm)/odor-adsorbing layer (48 μm)/non-odor-adsorbing layer 2 (16 μm) 3-layer configuration.

[Preparation and Evaluation of Package]

The inner layer film, the outer layer film A, and the content spout obtained as described above were used to prepare the package shown in FIG. 16 (size of double-bag portion: 450 mm×450 mm, diameter of content spout: 31 mm), which was then evaluated for heat sealing properties, bag rupture resistance characteristics, pinhole resistance (inner layer film), and increased TOC concentration in filling water. The detailed configuration and evaluation results of the package are shown in Table 5.

Examples 2 to 14 and Comparative Example 2

Each resin composition for the odor-adsorbing layer was prepared in the same way as in Example 1 according to the description of Table 5 to obtain a film for the sealant layer. Each package was prepared and evaluated. The detailed configuration and evaluation results of the package are shown in Table 5.

Comparative Example 1

LLDPE EVOLUE SP2020 as the general-purpose polyethylene was used instead of the low elutable polyethylene in film formation by inflation at 160° C. to obtain a sealant film (80 μm) for the inner layer consisting of only the non-odor-adsorbing layer. A package was prepared in the same way as in Example 1 and evaluated. The detailed configuration and evaluation results of the package are shown in Table 5.

Comparative Example 3

A resin composition for the odor-adsorbing layer was prepared in the same way as in Example 1 according to the description of Table 5 to obtain a film for the sealant layer consisting of only the odor-adsorbing layer. A package was prepared and evaluated. The detailed configuration and evaluation results of the package are shown in Table 5.

<Evaluation>

[Film Formability]

The appearance of the film was observed and sensorily evaluated. The evaluation criteria are as described below.

Good (indicated by circle): The film was formable without causing wrinkles or grains on the film.

Poor (indicated by x-mark): The film was difficult to form due to many wrinkles or grains on the film.

[Bag Rupture Resistance Characteristics]

The inside of the package prepared in each Example or Comparative Example was packed with 10 L of water. The operation of dropping the package thus packed with water from a height of 1 m was repeated a total of three times to evaluate the presence or absence of bag rupture.

Acceptation and Rejection Criteria

Excellent (indicated by double circle): Bag rupture was absent in the evaluation by three drops. Accepted.

Good (indicated by circle): One bag was ruptured in the evaluation by three drops. Accepted.

Poor (indicated by x-mark): All bags were ruptured in the evaluation by three drops. Rejected.

[Pinhole Resistance of Single Inner Layer Film]

The prepared inner layer film was cut into A4 size (30 cm×21 cm) and flexed using Gelbo Flex Tester (manufactured by Tester Sangyo Co., Ltd., BE-1005). Then, the number of pinholes formed within the 30 cm×21 cm plane of each sample was counted. 160 or less pinholes were accepted.

Temperature: 23° C.

The number of Gelbo flexes: 5000

[Pinhole Resistance of Package]

The prepared package was delivered in a packed state for transport as a liquid content package for BIB through an actual transport pathway. The number of pinholes formed in the inner layer film of the bag portion was counted. 160 or less pinholes were accepted.

[Increased TOC Concentration in Filling Water]

Before preparation of the package in each Example or Comparative Example, the inner film side of the packaging material constituting the package was subjected to disinfection treatment by UV irradiation in advance.

The package obtained in each Example or Comparative Example was hot-packed with 1000 g of water (distilled water for high-performance liquid chromatography, Junsei Chemical Co., Ltd.) of 65° C. to prepare a liquid-packed package, which was then stored at 35° C. for 2 weeks. Then, the TOC concentration of the filling water was measured using TOC-L total organic carbon meter manufactured by Shimadzu Corp.

Subsequently, the TOC concentration of the water before packing was also measured in the same way as above.

The increased TOC concentration in each package was measured according to the following expression.

Increased TOC concentration=TOC concentration of the filling water after storage−TOC concentration of the water before packing TOC concentration of the water before packing: 0.02 ppm
Conditions of Disinfection Treatment by UV Irradiation
UV wavelength: 253.7 nm
Irradiation time: 10 sec
Temperature: 25° C.

TABLE 5

| | | | Material Name | | Unit | Example 1 | 2 | 3 | 4 | 5 | 6 | 7 | 8 |
|---|---|---|---|---|---|---|---|---|---|---|---|---|---|
| Content spout | | | Content spout A | | — | ○ | ○ | ○ | ○ | ○ | ○ | ○ | ○ |
| | | | Content spout B | | — | | | | | | | | |
| | | | Content spout C | | — | | | | | | | | |
| | | | Content spout D | | — | | | | | | | | |
| | | | Content spout E | | — | | | | | | | | |
| Outer layer film | | | Outer layer film A | | — | ○ | ○ | ○ | ○ | ○ | ○ | ○ | ○ |
| | | | Outer layer film B | | — | | | | | | | | |
| | | | Outer layer film C | | — | | | | | | | | |
| Inner layer film | Composition | Odor-adsorbing layer | MB | MB1 | Parts by mass | 16.7 | | | | | | | |
| | | | | MB2 | Parts by mass | | 16.7 | | | 12.52 | 4.18 | | 16.7 |
| | | | | MB3 | Parts by mass | | | 16.7 | | | | | |
| | | | | MB4 | Parts by mass | | | | 16.7 | | | | |
| | | | | MB5 | Parts by mass | | | | | | | | |
| | | | | MB6 | Parts by mass | | | | | 4.18 | 12.52 | | |
| | | | | MB7 | Parts by mass | | | | | | | 16.7 | |
| | | | | MB8 | Parts by mass | | | | | | | | |
| | | | | MB9 | Parts by mass | | | | | | | | |
| | | | Resin Low-elution polyethylene | Ultrex1520L | Parts by mass | 83.3 | 83.3 | 83.3 | 83.3 | 83.3 | 83.3 | 83.3 | |
| | | | | Ultrex2021L | Parts by mass | | | | | | | | 83.3 |
| | | | | Ultrex3520L | Parts by mass | | | | | | | | |
| | | | | Neozex3510F | Parts by mass | | | | | | | | |
| | | | General-purpose polyethylene | EvalueSP2020 | Parts by mass | | | | | | | | |
| | | Non-Odor-adsorbing layer | Resin Low-elution polyethylene | Ultrex1520L | Parts by mass | 100 | 100 | 100 | 100 | 100 | 100 | 100 | |
| | | | | Ultrex2021L | Parts by mass | | | | | | | | 100 |
| | | | | Ultrex3520L | Parts by mass | | | | | | | | |
| | | | | Neozex3510F | Parts by mass | | | | | | | | |
| | | | General-purpose polyethylene | EvalueSP2020 | Parts by mass | | | | | | | | |
| | Layer thickness | Sealant layer | | Non-odor adsorbing layer | μm | 16 | 16 | 16 | 16 | 16 | 16 | 16 | 16 |
| | | | | Odor adsorbing layer | μm | 48 | 48 | 48 | 48 | 48 | 48 | 48 | 48 |
| | | | | Non-odor adsorbing layer | μm | 16 | 16 | 16 | 16 | 16 | 16 | 16 | 16 |

TABLE 5-continued

| Characteristics | Polyethylene single film (Inner layer film) | Increased TOC concentration in filling water | Article unirradiated with UV | ppm | 0.74 | 0.74 | 0.74 | 0.74 | 0.74 | 0.74 | 0.74 | 0.51 |
|---|---|---|---|---|---|---|---|---|---|---|---|---|
| | | | Article irradiated with UV | ppm | 0.80 | 0.80 | 0.08 | 0.08 | 0.08 | 0.08 | 0.08 | 0.61 |
| | | Pinhole resistance | | Holes | 2 | 2 | 2 | 2 | 2 | 2 | 2 | 15 |
| | Content of the whole sealant layer of inner layer film | Hydrophobic Zeolite | | % by mass | 1 | 1 | 1 | 1 | 0.75 | 0.25 | 1 | 1 |
| | | Chemical adsorbant-supported inorganic porous material | | % by mass | — | — | — | — | 0.25 | 0.75 | — | — |
| | | Hydrophobic Zeolite | | % by mass | | | | | | | | |
| Evaluation results | Film-forming properties | | | — | ◯ | ◯ | ◯ | ◯ | ◯ | ◯ | ◯ | ◯ |
| | Bag rupture resistance characteristics | | | — | ◯ | ◯ | ◯ | ◯ | ◯ | ◯ | ◯ | ◯ |
| | Pinhole resistance | | | Holes | 4 | 4 | 3 | 5 | 4 | 4 | 5 | 20 |
| | Increased TOC concentration to water | | | ppm | 0.68 | 0.55 | 0.44 | 0.42 | 0.59 | 0.67 | 0.57 | 0.37 |

| | | | | | Example | | | | | | Comparative Example | | |
|---|---|---|---|---|---|---|---|---|---|---|---|---|---|
| | Material Name | | | | 9 | 10 | 11 | 12 | 13 | 14 | 1 | 2 | 3 |
| Content spout | Content spout A | | | | ◯ | ◯ | | | | | ◯ | ◯ | ◯ |
| | Content spout B | | | | | | ◯ | | | | | | |
| | Content spout C | | | | | | | ◯ | | | | | |
| | Content spout D | | | | | | | | ◯ | | | | |
| | Content spout E | | | | | | | | | ◯ | | | |
| Outer layer film | Outer layer film A | | | | ◯ | ◯ | ◯ | ◯ | | | | | |
| | Outer layer film B | | | | | | | | ◯ | | | | |
| | Outer layer film C | | | | | | | | | ◯ | | | |
| Inner layer film | Composition | Odor-adsorbing layer | MB | MB1 | | | | | | | | | |
| | | | | MB2 | 16.7 | 16.7 | 8.33 | | 16.7 | 16.7 | | | |
| | | | | MB3 | | | | | | | | | |
| | | | | MB4 | | | | | | | | | |
| | | | | MB5 | | | | | | | | 16.7 | |
| | | | | MB6 | | | | 75 | | | | | |
| | | | | MB7 | | | | | | | | | |
| | | | | MB8 | | | | 83.3 | | | | | 75 |
| | | | | MB9 | | | | | | | | | |
| | | | Resin Low-elution polyethylene | Ultrex1520L | | | 16.67 | 16.7 | 83.3 | 83.3 | | | 35 |
| | | | | Ultrex2021L | | | | | | | | | |
| | | | | Ultrex3520L | 83.3 | | | | | | | | |
| | | | | Neozex3510F | | 83.3 | | | | | | | |
| | | | General-purpose polyethylene | EvalueSP2020 | | | | | | | | 83.3 | |
| | | Non-Odor-adsorbing layer | Resin Low-elution polyethylene | Ultrex1520L | | | 100 | 100 | 100 | | | | |
| | | | | Ultrex2021L | | | | | | | | | |
| | | | | Ultrex3520L | 100 | | | | | | | | |
| | | | | Neozex3510F | | 100 | | | | | | | |
| | | | General-purpose polyethylene | EvalueSP2020 | | | | | | | 100 | 100 | |
| | Layer thickness | Sealant layer | Non-odor adsorbing layer | | 16 | 16 | 16 | 16 | 16 | 16 | 80 | 16 | |
| | | | Odor adsorbing layer | | 48 | 48 | 48 | 48 | 48 | 48 | | 48 | 80 |
| | | | Non-odor adsorbing layer | | 16 | 16 | 16 | 16 | 16 | 16 | | 16 | |
| Characteristics | Polyethylene single film (Inner layer film) | Increased TOC concentration in filling water | Article unirradiated with UV | | 0.34 | 0.41 | 0.74 | 0.74 | 0.74 | 0.74 | 2.56 | 2.56 | 0.74 |
| | | | Article irradiated with UV | | 0.4 | 0.49 | 0.80 | 0.80 | 0.80 | 0.80 | 3.07 | 3.07 | 0.08 |
| | | Pinhole resistance | | | 95 | 120 | 2 | 2 | 2 | 2 | 12 | 12 | 2 |
| | Content of the whole sealant layer of inner layer film | Hydrophobic Zeolite | | | 1 | 1 | 0.5 | 10 | 1 | 1 | 0 | — | 15 |
| | | Chemical adsorbant-supported inorganic porous material | | | — | — | 9 | — | — | — | — | — | — |
| | | Hydrophobic Zeolite | | | — | — | — | — | — | — | 1 | — | |
| Evaluation results | Film-forming properties | | | | ◯ | ◯ | ◯ | ◯ | ◯ | ◯ | ◯ | ◯ | X |
| | Bag rupture resistance characteristics | | | | ◯ | ◯ | ◯ | ◯ | △ | ◯ | ◯ | ◯ | X |
| | Pinhole resistance | | | | 106 | 135 | 7 | 8 | 4 | 5 | 12 | 21 | 20 |
| | Increased TOC concentration to water | | | | 0.24 | 0.29 | 0.4 | 0.08 | 0.56 | 0.54 | 3.07 | 2.94 | 0.05 |

<Summary of Results>

The packages of all Examples exhibited favorable film formability, bag rupture resistance characteristics, heat sealing properties, and pinhole resistance and also had a small increased TOC concentration.

Comparative Example 1 involving none of the low elutable polyethylene, the hydrophobic zeolite, and the chemical adsorbent-supported inorganic porous material, and Comparative Example 2 involving no low elutable polyethylene and involving hydrophilic zeolite instead of hydrophobic zeolite exhibited a tendency of a high increased TOC concentration. Comparative Example 3 involving too large an amount of hydrophobic zeolite resulted in poor film formability of the inner layer film and poor heat sealing properties and bag rupture resistance characteristics, though decrease in TOC concentration was large.

Object 5

EXAMPLES

The detailed raw materials used in Examples are as described below.

[Low Elutable Polyethylene for Inner Layer Film and Outer Layer Film and General-Purpose Polyethylene]

TABLE 1

| Elution property | Polyethylene No | Supplier | Type of Polyethylene | Density [g/cm$^3$] | MFR [g/10 minutes] |
|---|---|---|---|---|---|
| Low elution property | Ultzex1520L | Prime Polymer Co., Ltd. | C6-LLDPE | 0.916 | 2.3 |
| | Ultzex2021L | Prime Polymer Co., Ltd. | C6-LLDPE | 0.920 | 2.0 |
| | Ultzex3520L | Prime Polymer Co., Ltd. | C6-LLDPE | 0.931 | 2.1 |
| | Neo-Zex3510F | Prime Polymer Co., Ltd. | C4-LLDPE | 0.933 | 1.6 |
| General purpose | EvolueSP2020 | Prime Polymer Co., Ltd. | C6-LLDPE | 0.916 | 2.1 |

[Resin for Content Spout Resin Composition]

TABLE 2

| Polyethylene No. | Supplier | Type of Polyethylene | Density [g/cm$^3$] | MFR [g/10 minutes] |
|---|---|---|---|---|
| Novatec UF370 | Japan Polyethylene Corporation | LLDPE | 0.921 | 16 |
| Novatec UF580 | Japan Polyethylene Corporation | LLDPE | 0.925 | 20 |
| Novatec LJ8041 | Japan Polyethylene Corporation | LDPE | 0.918 | 23 |
| Novatec LJ902 | Japan Polyethylene Corporation | LDPE | 0.915 | 45 |
| Novatec HJ362N | Japan Polyethylene Corporation | HDPE | 0.953 | 5 |

[Odor Adsorbent Material]

(Chemical Adsorbent-Supported Inorganic Porous Material)

KESMON NS-241: manufactured by Toagosei Co., Ltd., an amino group-containing compound-supported inorganic porous material, average particle size: 3.5 µm.

(Hydrophobic Zeolite)

MIZUKASIEVES EX-122: manufactured by Mizusawa Industrial Chemicals, Ltd., $SiO_2/Al_2O_3$ molar ratio=32/1, average particle size: 2.5 to 5.5 µm.

SILTON MT400: manufactured by Mizusawa Industrial Chemicals, Ltd., $SiO_2/Al_2O_3$ molar ratio=400/1, average particle size: 5 to 7 µm.

SILTON MT2000: manufactured by Mizusawa Industrial Chemicals, Ltd., $SiO_2/Al_2O_3$ molar ratio=2000/1, average particle size: 2 to 4 µm.

SILTON MT-8000: manufactured by Mizusawa Industrial Chemicals, Ltd., $SiO_2/Al_2O_3$ molar ratio=8000/1, average particle size: 0.8 µm.

(Hydrophilic Zeolite)

MIZUKASIEVES Y-420: manufactured by Mizusawa Industrial Chemicals, Ltd., $SiO_2/Al_2O_3$ molar ratio=5/1, average particle size: 5 µm.

[Others]

EMB-21: manufactured by Sumitomo Chemical Co., Ltd., an antiblocking agent.

PEX ABT-16: Japan Polyethylene Corp., an antiblocking agent.

EMB-10: Sumitomo Chemical Co., Ltd., a slipping agent.

[Preparation of Master Batch]

Each MB (master batch) for the outer layer film, the inner layer film, and the content spout resin composition was prepared as described below.

(Preparation of MB1)

Novatec LC600A and hydrophobic zeolite MIZUKASIEVES EX-122 were melt-blended at the following proportions to obtain master batch 1 (MB1).

Novatec LC600A 90 parts by mass

MIZUKASIEVES EX-122 10 parts by mass (Preparation of MB2 to MB13)

The raw materials were melt-blended in the same way as in MB1 according to the formulation of Table 3 or 4 to obtain master batches 2 to 13 (MB2 to MB13).

TABLE 3

| | | | | | MB for outer layer film and inner layer film | | | | | | | |
|---|---|---|---|---|---|---|---|---|---|---|---|---|
| | | | | Unit | 1 | 2 | 3 | 4 | 5 | 6 | 7 | 8 |
| Composition | Thermoplastic resin | Novatec LC600A | Parts by mass | | 90 | 90 | 90 | 90 | 90 | 90 | | 80 |
| | | Ultzex15201 | Parts by mass | | | | | | | | 90 | |
| | Hydrophobic zeolite | Mizukasieves EX-122 | Parts by mass | | 10 | | | | | | | |
| | | Silton MT400 | Parts by mass | | | 10 | | | | | 10 | 20 |
| | | Silton MT2000 | Parts by mass | | | | 10 | | | | | |

TABLE 3-continued

|  |  |  | Unit | \multicolumn{8}{c}{MB for outer layer film and inner layer film} |
|---|---|---|---|---|---|---|---|---|---|---|---|
|  |  |  |  | 1 | 2 | 3 | 4 | 5 | 6 | 7 | 8 |
|  |  | Silton MT8000 | Parts by mass |  |  |  | 10 |  |  |  |  |
|  | Hydrophilic zeolite | Mizukasieves Y-420 | Parts by mass |  |  |  |  | 10 |  |  |  |
|  | Chemical adsorbent-supported inorganic porous material | Kesmon NS-241 | Parts by mass |  |  |  |  |  | 10 |  |  |

TABLE 4

|  |  |  | Unit | \multicolumn{5}{c}{MB for content spout resin composition} |
|---|---|---|---|---|---|---|---|---|
|  |  |  |  | MB9 | MB10 | MB11 | MB12 | MB13 |
| Composition | Low elution polyethylene (LLDPE) | Novatec UF370 | Parts by mass | 90 | 90 | 90 | 90 | 90 |
|  | Hydrophobic zeolite | Mizukasieves EX-122 | Parts by mass | 10 |  |  |  |  |
|  |  | Silton MT400 | Parts by mass |  | 10 |  |  |  |
|  |  | Silton MT2000 | Parts by mass |  |  | 10 |  |  |
|  |  | Silton MT8000 | Parts by mass |  |  |  | 10 |  |
|  | Chemical adsorbent-supported inorganic porous material | Kesmon NS-241 | Parts by mass |  |  |  |  | 10 |

[Preparation of Outer Layer Film]
(Preparation of Outer Layer Film A)
The following raw materials were melt-kneaded at the following proportions to prepare a resin composition for the odor-adsorbing layer.

| ULT-ZEX 1520L | 80 parts by mass |
| MB2 | 20 parts by mass |

ULT-ZEX 1520L for non-odor-adsorbing layers 1 and 2 and the resin composition for the odor-adsorbing layer obtained as described above were used in film formation and lamination by inflation at 160° C. to obtain a film for the sealant layer having a non-odor-adsorbing layer 1 (10 μm)/odor-adsorbing layer (20 μm)/non-odor-adsorbing layer 2 (10 μm) 3-layer configuration.

The film for the sealant layer obtained as described above and biaxially drawn nylon film 1 (KOHJIN Film & Chemicals Co., Ltd., BONYL RX, 15 μm thick) as the base material layer were adhesively bonded via LDPE resin 1 (Japan Polyethylene Corp., Novatec LC520) as an adhesion layer by the extrusion coating method at 320° C. to obtain outer layer film A having a base material layer (15 μm)/adhesion layer (15 μm)/non-odor-adsorbing layer 1 (10 μm)/odor-adsorbing layer (20 μm)/odor-adsorbing layer 2 (10 μm) configuration. The detailed layer configuration is shown in Table 5.

(Preparation of Outer Layer Films B to I)

Each of the base material layer film, the adhesion layer, and the non-odor-adsorbing layer was provided on the basis of their presence or absence according to the configuration of each outer layer film shown in Table 5 to prepare a resin composition for the odor-adsorbing layer. A film for the sealant layer was prepared by the same operation as in the outer layer film A to prepare outer layer films B to I.

For the outer layer films C, E, and F, the film for the sealant layer consisting of only the odor-adsorbing layer was used as outer layer film C, E, F. For the outer layer film I, the film for the sealant layer consisting of only the non-odor-adsorbing layer was used as the sealant layer.

TABLE 5

| | | | | Unit | Outer layer Film | | | | | | | | |
|---|---|---|---|---|---|---|---|---|---|---|---|---|---|
| | | | | | A | B | C | D | E | F | G | H | I |
| Layer thickness | | Base material layer | | μm | 15 | 15 | | 15 | | | 15 | | |
| | | Adhesion layer | | μm | 15 | 15 | | 15 | | | 15 | | |
| | Sealant Layer | Non-odor-adsorbing layer 1 | | μm | 10 | 10 | | | | | | | 80 |
| | | Odor-adsorbing layer | | μm | 20 | 20 | 80 | 40 | 80 | 80 | 40 | 80 | |
| | | Non-odor-adsorbing layer 2 | | μm | 10 | 10 | | | | | | | |
| Composition | Base Material layer | Biaxially drawn nylon film | BonilRX | — | ○ | | | ○ | | | ○ | | |
| | | | IB-ONY (gas-barrier) | — | | ○ | | | | | | | |
| | Adhesion layer | LDPE | NovatecLC520 | Parts by mass | 100 | 100 | | 100 | | | 100 | | |
| | Sealant Layer | Non-odor-adsorbing layer 1 | Low-elution Polyethylene | Ultzex1520L | Parts by mass | 100 | 100 | | | | | | | 100 |
| | | Odor-adsorbing layer | Low-elution Polyethylene | Ultzex1520L | Parts by mass | 80 | 80 | 81.5 | 50 | 50 | 50 | 16.7 | 16.7 | |
| | | | Masterbatch | MB2 | Parts by mass | 20 | 20 | 16.7 | | | | | | |
| | | | | MB6 | Parts by mass | | | | | | 40 | | | |
| | | | | MB8 | Parts by mass | | | | 50 | 50 | 10 | 83.3 | 83.3 | |
| | | | Slipping agent added MB | EMB-10 | Parts by mass | | | | 1 | | | | | |
| | | | Antiblocking agent added MB | PEX ABT-16 | Parts by mass | | | | 0.8 | | | | | |
| | | Non-odor-adsorbing layer 2 | Low-elution Polyethylene | Ultzex1520L | Parts by mass | 100 | 100 | | | | | | | |
| Characteristics | Polyethylene single film | Increased TOC concentration in filling water | Article unirradiated with UV | ppm | 0.74 | 0.74 | 0.74 | 0.74 | 0.74 | 0.74 | 0.74 | 0.74 | 0.74 |
| | | | Article irradiated with UV | ppm | 0.88 | 0.88 | 0.88 | 0.88 | 0.88 | 0.88 | 0.88 | 0.88 | 0.88 |
| | Content in the whole sealant film | Hydrophobic Zeolite | | % by mass | 1 | 1 | 1.7 | 10 | 10 | 2 | 16.7 | 16.7 | 0 |
| | | Chemical adsorbent-supported inorganic porous material | | % by mass | 0 | 0 | 0 | 0 | 0 | 8 | 0 | 0 | 0 |
| Evaluation result | Film-forming properties | | | — | ○ | ○ | ○ | ○ | ○ | ○ | X | X | ○ |

[Preparation of Inner Layer Film]
(Preparation of Inner Layer Film A)
The following raw materials were melt-kneaded at the following proportions to prepare a resin composition for the odor-adsorbing layer.

| ULT-ZEX 1520L | 83.3 parts by mass |
|---|---|
| MB1 | 16.7 parts by mass |

ULT-ZEX 1520L for non-odor-adsorbing layers c and d and the resin composition for the odor-adsorbing layer obtained as described above were used in film formation and lamination by inflation at 160° C. to obtain inner layer film A consisting of only a sealant layer having a non-odor-adsorbing layer c (16 μm)/odor-adsorbing layer (48 μm)/non-odor-adsorbing layer d (16 μm) 3-layer configuration. The details are shown in Table 6.

(Preparation of Inner Layer Films B to P)

Each resin composition for the odor-adsorbing layer was prepared according to the configuration of each inner layer film shown in Table 6, and a resin for the non-odor-adsorbing layer was selected. Inner layer films B to O were prepared by the same operation as in the inner layer film A.

The inner layer film M was prepared using only the non-odor-adsorbing layer, and the inner layer film O was prepared using only the odor-adsorbing layer.

TABLE 6

| | | | Unit | A | B | C | D | E | F | G | H | I | J | K | L | M | N | O | P |
|---|---|---|---|---|---|---|---|---|---|---|---|---|---|---|---|---|---|---|---|
| Layer thickness | Sealant Layer | Non-odor-adsorbing layer c | μm | 16 | 16 | 16 | 16 | 16 | 16 | 16 | 16 | 16 | 16 | 16 | 16 | 16 | 80 | 16 | 80 |
| | | Odor-adsorbing layer | μm | 48 | 48 | 48 | 48 | 48 | 48 | 48 | 48 | 48 | 48 | 48 | 48 | 48 | | 48 | |
| | | Non-odor-adsorbing layer d | μm | 16 | 16 | 16 | 16 | 16 | 16 | 16 | 16 | 16 | 16 | 16 | 16 | 16 | | 16 | |
| Composition | Sealant Layer | Non-odor-adsorbing layer c, d | | | | | | | | | | | | | | | | | |
| | | Low-elution polyethylene Ultzex1520L | Parts by mass | 100 | 100 | 100 | 100 | 100 | 100 | 100 | | | | | | | | | |
| | | Ultzex2021L | Parts by mass | | | | | | | | 100 | | | | | | | | |
| | | Ultzex3520L | Parts by mass | | | | | | | | | 100 | | | | | | | |
| | | Neozex3510F | Parts by mass | | | | | | | | | | 100 | | | | | | |
| | | General-purpose polyethylene EvalueSP2020 | Parts by mass | | | | | | | | | | | | 100 | 100 | | | |
| | Odor-adsorbing layer | Low-elution polyethylene Ultzex1520L | Parts by mass | 83.3 | 83.3 | 83.3 | 83.3 | 83.3 | 83.3 | 83.3 | | | | 91.67 | 16.7 | 16.7 | | | 25 |
| | | Ultzex2021L | Parts by mass | | | | | | | | 83.3 | | | | | | | | |
| | | Ultzex3520L | Parts by mass | | | | | | | | | 83.3 | | | | | | | |
| | | Neozex3510F | Parts by mass | | | | | | | | | | 83.3 | | | | | | |
| | | General-purpose polyethylene EvalueSP2020 | Parts by mass | | | | | | | | | | | | | | 100 | 83.3 | |
| | | MB | MB1 | Parts by mass | 16.7 | | | | | | | | | | | | | 100 | | |
| | | | MB2 | Parts by mass | | 16.7 | | | | | | 16.7 | 16.7 | 16.7 | 8.33 | | | | | |
| | | | MB3 | Parts by mass | | | 16.7 | | | | | | | | | | | | | |
| | | | MB4 | Parts by mass | | | | 16.7 | | | | | | | | | | | | |
| | | | MB5 | Parts by mass | | | | | | | | | | | | | | | | |
| | | | MB6 | Parts by mass | | | | | 4.18 | 12.52 | | | | | | | 67 | | | |
| | | | MB7 | Parts by mass | | | | | | | 16.7 | | | | | | | | | |
| | | | MB8 | Parts by mass | | | | | | | | | | | | 83.3 | 16.3 | | 16.7 | 75 |

TABLE 6-continued

| | | Unit | A | B | C | D | E | F | G | H | I | J | K | L | M | N | O | P |
|---|---|---|---|---|---|---|---|---|---|---|---|---|---|---|---|---|---|---|
| Characteristics | Polyethylene single film Increased TOC concentration in filling water | Article unirradiated with UV | ppm | 0.74 | 0.74 | 0.74 | 0.74 | 0.74 | 0.74 | 0.74 | 0.51 | 0.34 | 0.41 | 0.74 | 0.74 | 0.74 | 2.56 | 2.56 | 0.74 |
| | | Article irradiated with UV | ppm | 0.88 | 0.88 | 0.88 | 0.88 | 0.88 | 0.88 | 0.88 | 0.61 | 0.4 | 0.49 | 0.88 | 0.88 | 0.88 | 3.07 | 3.07 | 0.88 |
| | | Pinhole resistance | Holes | 2 | 2 | 2 | 2 | 2 | 2 | 2 | 15 | 95 | 120 | 2 | 20 | 22 | 12 | 14 | 35 |
| | Content of the whole sealant film | Chemical adsorbant-supported inorganic porous material | % by mass | 0 | 0 | 0 | 0 | 0.25 | 0.75 | 0 | 0 | 0 | 0 | 0 | 0 | 8 | 0 | 0 | 0 |
| | | Hydrophobic Zeolite | % by mass | 1 | 1 | 1 | 1 | 0.75 | 0.25 | 1 | 1 | 1 | 1 | 0.5 | 10 | 2 | 0 | 0 | 15 |
| Evaluation results | Film-forming properties | | — | ○ | ○ | ○ | ○ | ○ | ○ | ○ | ○ | ○ | ○ | ○ | ○ | ○ | ○ | ○ | X |

[Preparation of Content Spout]

The raw materials were dry-blended at the proportions shown in Table 7 to prepare resin compositions A to J for the content spout.

Then, each resin composition obtained as described above was injection-molded at 200° C. to prepare content spouts A to J.

TABLE 7

|  |  |  |  | Content spout | | | | | | | | | |
|---|---|---|---|---|---|---|---|---|---|---|---|---|---|
|  |  |  | Unit | A | B | C | D | E | F | G | H | I | J |
| Composition of resin composition | MB | MB9 | Parts by mass | 10 |  |  |  |  |  |  |  |  |  |
|  |  | MB10 | Parts by mass |  | 10 |  |  | 7.5 | 10 | 10 | 10 | 10 |  |
|  |  | MB11 | Parts by mass |  |  | 10 |  |  |  |  |  |  |  |
|  |  | MB12 | Parts by mass |  |  |  | 10 |  |  |  |  |  |  |
|  |  | MB13 | Parts by mass |  |  |  |  | 2.5 |  |  |  |  |  |
|  | Resin component | NovatecUF370 | Parts by mass | 90 | 90 | 90 | 90 | 90 |  |  |  |  | 100 |
|  |  | NovatecUFS80 | Parts by mass |  |  |  |  |  | 90 |  |  |  |  |
|  |  | NovatecLJ8041 | Parts by mass |  |  |  |  |  |  | 90 |  |  |  |
|  |  | NovatecLJ902 | Parts by mass |  |  |  |  |  |  |  | 90 |  |  |
|  |  | NovatecHJ362N | Parts by mass |  |  |  |  |  |  |  |  | 90 |  |
| Characteristics | Content of chemical adsorbent-supported inorganic porous material |  | % by mass | 0 | 0 | 0 | 0 | 0.25 | 0 | 0 | 0 | 0 | 0 |
|  | Content of hydrophobic zeolite |  | % by mass | 1 | 1 | 1 | 1 | 0.75 | 1 | 1 | 1 | 1 | 0 |
| Evaluation results | Moldability |  | — | ○ | ○ | ○ | ○ | ○ | ○ | ○ | ○ | ○ | ○ |

Example 1

The outer layer film A, the inner layer film A, and the content spout A obtained as described above were used to prepare the package shown in FIG. 16 (size of double-bag portion: 450 mm×450 mm, diameter of content spout A: 31 mm), which was then evaluated for heat sealing properties, bag rupture resistance characteristics, pinhole resistance (inner layer film), and increased TOC concentration in filling water.

The detailed configuration and evaluation results of the package are shown in Table 8.

Examples 2 to 25 and Comparative Examples 2 to 5

Each mixture for the odor-adsorbing layer was obtained in the same way as in Example 1 according to the formulation described in Table 3, and each sealant film was prepared and evaluated.

The detailed configurations and evaluation results of the package are shown in Tables 8 to 10.

Comparative Example 1

LLDPE EVOLUE SP2020 as the high elutable polyethylene was used in film formation by inflation at 160° C. to obtain a sealant film (80 μm) for the inner layer.

A molded article was prepared by injection molding at 200° C. using Novatec UF370.

Subsequently, evaluation was conducted in the same way as in Example 1. The detailed configuration and evaluation results of the laminate are shown in Table 5.

<Evaluation>

[Film Formability]

The appearance was observed and sensorily evaluated. The evaluation criteria are as described below.

Good (indicated by circle): The film was formable without causing wrinkles or grains on the film.

Poor (indicated by x-mark): The film was difficult to form due to many wrinkles or grains on the film.

[Bag Rupture Resistance Characteristics]

The inside of the package prepared in each Example or Comparative Example was packed with 10 L of water. The operation of dropping the package thus packed with water from a height of 1 m was repeated a total of three times to evaluate the presence or absence of bag rupture.

Acceptation and Rejection Criteria

Excellent (indicated by double circle): Bag rupture was absent in the evaluation by three drops. Accepted.

Good (indicated by circle): One bag was ruptured in the evaluation by three drops. Accepted.

Poor (indicated by x-mark): All bags were ruptured in the evaluation by three drops. Rejected.

[Pinhole Resistance of Single Inner Layer Film]

The prepared inner layer film was cut into A4 size (30 cm×21 cm) and flexed using Gelbo Flex Tester (manufactured by Tester Sangyo Co., Ltd., BE-1005). Then, the number of pinholes formed within the 30 cm×21 cm plane of each sample was counted. 160 or less pinholes were accepted.

Temperature: 23° C.

The number of Gelbo flexes: 5000

[Pinhole Resistance of Package]

The prepared package was delivered in a packed state for transport as a liquid content package for BIB through an actual transport pathway. The number of pinholes formed in the inner layer film of the bag portion was counted. 160 or less pinholes were accepted.

[Increased TOC Concentration in Filling Water]

Before preparation of the package in each Example or Comparative Example, the inner film side of the packaging material constituting the package was subjected to disinfection treatment by UV irradiation in advance.

The package obtained in each Example or Comparative Example was hot-packed with 1000 g of water (distilled water for high-performance liquid chromatography, Junsei Chemical Co., Ltd.) of 65° C. to prepare a liquid-packed package, which was then stored at 35° C. for 2 weeks. Then, the TOC concentration of the filling water was measured using TOC-L total organic carbon meter manufactured by Shimadzu Corp.

Subsequently, the TOC concentration of the water before packing was also measured in the same way as above.

The increased TOC concentration in each package was measured according to the following expression.

Increased TOC concentration=TOC concentration of the filling water after storage−TOC concentration of the water before packing TOC concentration of the water before packing: 0.02 ppm
Conditions of Disinfection Treatment by UV Irradiation
UV wavelength: 253.7 nm
Irradiation time: 10 sec
Temperature: 25° C.

TABLE 8

|  |  |  |  |  | Unit | Example 1 | Example 2 | Example 3 | Example 4 | Example 5 |
|---|---|---|---|---|---|---|---|---|---|---|
| Packaging material constitution | | Outer layer film | | | — | A | A | A | A | A |
| | | Inner layer film | | | — | A | B | C | D | E |
| | | Content spout | | | — | A | A | A | A | A |
| Characteristics | Outer layer film | Polyethylene single film | Increased TOC concentration in filling water | Article un-irradiated with UV | ppm | 0.74 | 0.74 | 0.74 | 0.74 | 0.74 |
| | | | | Article irradiated with UV | ppm | 0.88 | 0.88 | 0.88 | 0.88 | 0.88 |
| | | Content in the whole sealant film | Chemical adsorbent-supported inorganic porous material | | % by mass | 0 | 0 | 0 | 0 | 0 |
| | | | Hydrophobic Zeolite | | % by mass | 1 | 1 | 1 | 1 | 1 |
| | Inner layer film | Polyethylene single film | Increased TOC concentration in filling water | Article un-irradiated with UV | ppm | 0.74 | 0.74 | 0.74 | 0.74 | 0.74 |
| | | | | Article irradiated with UV | ppm | 0.88 | 0.88 | 0.88 | 0.88 | 0.88 |
| | | | Pinhole resistance | | Holes | 2 | 2 | 2 | 2 | 2 |
| | | Content in the whole sealant film | Chemical adsorbent-supported inorganic porous material | | % by mass | 0 | 0 | 0 | 0 | 0.25 |
| | | | Hydrophobic Zeolite | | % by mass | 1 | 1 | 1 | 1 | 0.75 |
| | Content spout | Content in the whole molded article | Chemical adsorbent-supported inorganic porous material | | % by mass | 0 | 0 | 0 | 0 | 0 |
| | | | Hydrophobic Zeolite | | % by mass | 1 | 1 | 1 | 1 | 1 |
| Evaluation result | Package (Outer layer film + Inner layer film + Content spout) | Film-forming properties | Outer layer film | | — | ○ | ○ | ○ | ○ | ○ |
| | | | Inner layer film | | — | ○ | ○ | ○ | ○ | ○ |
| | | Moldability properties | Content spout | | — | ○ | ○ | ○ | ○ | ○ |
| | | Heat sealing strength | | | — | ○ | ○ | ○ | ○ | ○ |
| | | Bag rupture resistance characteristics | | | — | ◎ | ◎ | ◎ | ◎ | ◎ |
| | | Pinhole resistance (Inner layer film) | | | Holes | 4 | 4 | 3 | 5 | 4 |
| | | Increased TOC concentration in filling water | | | ppm | 0.55 | 0.44 | 0.36 | 0.34 | 0.48 |

TABLE 8-continued

| | | | | Example | | | | |
|---|---|---|---|---|---|---|---|---|
| | | | | 6 | 7 | 8 | 9 | 10 |
| Packaging material constitution | | Outer layer film | | A | A | A | A | A |
| | | Inner layer film | | F | G | H | I | J |
| | | Content spout | | A | A | A | A | A |
| Characteristics | Outer layer film | Polyethylene single film | Increased TOC concentration in filling water | Article un-irradiated with UV | 0.74 | 0.74 | 0.74 | 0.74 | 0.74 |
| | | | | Article irradiated with UV | 0.88 | 0.88 | 0.88 | 0.88 | 0.88 |
| | | Content in the whole sealant film | Chemical adsorbent-supported inorganic porous material | 0 | 0 | 0 | 0 | 0 |
| | | | Hydrophobic Zeolite | 1 | 1 | 1 | 1 | 1 |
| | Inner layer film | Polyethylene single film | Increased TOC concentration in filling water | Article un-irradiated with UV | 0.74 | 0.74 | 0.51 | 0.34 | 0.41 |
| | | | | Article irradiated with UV | 0.88 | 0.88 | 0.61 | 0.4 | 0.49 |
| | | | Pinhole resistance | 2 | 2 | 15 | 95 | 120 |
| | | Content in the whole sealant film | Chemical adsorbent-supported inorganic porous material | 0.75 | 0 | 0 | 0 | 0 |
| | | | Hydrophobic Zeolite | 0.25 | 1 | 1 | 1 | 1 |
| | Content spout | Content in the whole molded article | Chemical adsorbent-supported inorganic porous material | 0 | 0 | 0 | 0 | 0 |
| | | | Hydrophobic Zeolite | 1 | 1 | 1 | 1 | 1 |
| Evaluation result | Package (Outer layer film + Inner layer film + Content spout) | Film-forming properties | Outer layer film | ○ | ○ | ○ | ○ | ○ |
| | | | Inner layer film | ○ | ○ | ○ | ○ | ○ |
| | | Moldability properties | Content spout | ○ | ○ | ○ | ○ | ○ |
| | | Heat sealing strength | | ○ | ○ | ○ | ○ | ○ |
| | | Bag rupture resistance characteristics | | ◎ | ◎ | ◎ | ◎ | ◎ |
| | | Pinhole resistance (Inner layer film) | | 4 | 5 | 20 | 106 | 135 |
| | | Increased TOC concentration in filling water | | 0.54 | 0.46 | 0.30 | 0.19 | 0.23 |

TABLE 9

| | | | | | Example | | | | |
|---|---|---|---|---|---|---|---|---|---|
| | | | | Unit | 11 | 12 | 13 | 14 | 15 |
| Packaging material constitution | | Outer layer film | | — | A | A | A | A | A |
| | | Inner layer film | | — | K | L | B | B | B |
| | | Content spout | | — | A | A | B | C | D |
| Characteristics | Outer layer film | Polyethylene single film | Increased TOC concentration in filling water | Article un-irradiated with UV | ppm | 0.74 | 0.74 | 0.74 | 0.74 | 0.74 |
| | | | | Article irradiated with UV | ppm | 0.88 | 0.88 | 0.88 | 0.88 | 0.88 |
| | | Content in the whole sealant film | Chemical adsorbent-supported inorganic porous material | % by mass | 0 | 0 | 0 | 0 | 0 |
| | | | Hydrophobic Zeolite | % by mass | 1 | 1 | 1 | 1 | 1 |

TABLE 9-continued

|  |  |  |  |  |  |  |  |  |  |
|---|---|---|---|---|---|---|---|---|---|---|
|  | Inner layer film | Poly-ethylene single film | Increased TOC concentration in filling water | Article un-irradiated with UV | ppm | 0.74 | 0.74 | 0.74 | 0.74 | 0.74 |
|  |  |  |  | Article irradiated with UV | ppm | 0.88 | 0.88 | 0.88 | 0.88 | 0.88 |
|  |  |  | Pinhole resistance |  | Holes | 2 | 20 | 2 | 2 | 2 |
|  |  | Content in the whole sealant film | Chemical adsorbent-supported inorganic porous material |  | % by mass | 0 | 0 | 0 | 0 | 0 |
|  |  |  | Hydrophobic Zeolite |  | % by mass | 0.5 | 10 | 1 | 1 | 1 |
|  | Content spout | Content in the whole molded article | Chemical adsorbent-supported inorganic porous material |  | % by mass | 0 | 0 | 0 | 0 | 0 |
|  |  |  | Hydrophobic Zeolite |  | % by mass | 1 | 1 | 1 | 1 | 1 |
| Evaluation result | Package (Outer layer film + Inner layer film + Content spout) | Film-forming properties | Outer layer film |  | — | ○ | ○ | ○ | ○ | ○ |
|  |  |  | Inner layer film |  | — | ○ | ○ | ○ | ○ | ○ |
|  |  | Moldability properties | Content spout |  | — | ○ | ○ | ○ | ○ | ○ |
|  |  | Heat sealing strength |  |  | — | ○ | ○ | ○ | ○ | ○ |
|  |  | Bag rupture resistance characteristics |  |  | — | ◎ | ○ | ◎ | ◎ | ◎ |
|  |  | Pinhole resistance (Inner layer film) |  |  | Holes | 3 | 25 | 5 | 4 | 5 |
|  |  | Increased TOC concentration in filling water |  |  | ppm | 0.57 | 0.06 | 0.55 | 0.52 | 0.51 |

|  |  |  |  |  | Example |  |  |  |  |
|---|---|---|---|---|---|---|---|---|---|
|  |  |  |  |  | 16 | 17 | 18 | 19 | 20 |
| Packaging material constitution |  | Outer layer film |  |  | A | A | A | A | A |
|  |  | Inner layer film |  |  | B | B | B | B | B |
|  |  | Content spout |  |  | E | F | G | H | I |
| Characteristics | Outer layer film | Poly-ethylene single film | Increased TOC concentration in filling water | Article un-irradiated with UV | 0.74 | 0.74 | 0.74 | 0.74 | 0.74 |
|  |  |  |  | Article irradiated with UV | 0.88 | 0.88 | 0.88 | 0.88 | 0.88 |
|  |  | Content in the whole sealant film | Chemical adsorbent-supported inorganic porous material |  | 0 | 0 | 0 | 0 | 0 |
|  |  |  | Hydrophobic Zeolite |  | 1 | 1 | 1 | 1 | 1 |
|  | Inner layer film | Poly-ethylene single film | Increased TOC concentration in filling water | Article un-irradiated with UV | 0.74 | 0.74 | 0.51 | 0.34 | 0.41 |
|  |  |  |  | Article irradiated with UV | 0.88 | 0.88 | 0.88 | 0.88 | 0.88 |
|  |  |  | Pinhole resistance |  | 2 | 2 | 2 | 2 | 2 |
|  |  | Content in the whole sealant film | Chemical adsorbent-supported inorganic porous material |  | 0 | 0 | 0 | 0 | 0 |
|  |  |  | Hydrophobic Zeolite |  |  |  |  |  |  |
|  | Content spout | Content in the whole molded article | Chemical adsorbent-supported inorganic porous material |  | 0.75 | 1 | 1 | 1 | 1 |
|  |  |  | Hydrophobic Zeolite |  |  |  |  |  |  |

TABLE 9-continued

|  |  |  |  |  |  |  |  |  |
|---|---|---|---|---|---|---|---|---|
| Evaluation result | Package (Outer layer film + Inner layer film + Content spout) | Film-forming properties | Outer layer film | ○ | ○ | ○ | ○ | ○ |
|  |  |  | Inner layer film | ○ | ○ | ○ | ○ | ○ |
|  |  | Moldability properties | Content spout | ○ | ○ | ○ | ○ | ○ |
|  |  | Heat sealing strength |  | ○ | ○ | ○ | ○ | ○ |
|  |  | Bag rupture resistance characteristics |  | ◎ | ◎ | ◎ | ◎ | ◎ |
|  |  | Pinhole resistance (Inner layer film) |  | 5 | 4 | 3 | 5 | 4 |
|  |  | Increased TOC concentration in filling water |  | 0.53 | 0.56 | 0.55 | 0.57 | 0.55 |

TABLE 10

|  |  |  |  | Unit | Example 21 | Example 22 | Example 23 | Example 24 | Example 25 |
|---|---|---|---|---|---|---|---|---|---|
| Packaging material constitution |  | Outer layer film |  | — | B | C | D | E | F |
|  |  | Inner layer film |  | — | B | B | B | B | M |
|  |  | Content spout |  | — | B | B | B | B | B |
| Characteristics | Outer layer film | Polyethylene single film | Increased TOC concentration in filling water | Article un-irradiated with UV | ppm | 0.74 | 0.74 | 0.74 | 0.74 | 0.74 |
|  |  |  |  | Article irradiated with UV | ppm | 0.88 | 0.88 | 0.88 | 0.88 | 0.88 |
|  |  | Content in the whole sealant film | Chemical adsorbent-supported inorganic porous material |  | % by mass | 0 | 0 | 0 | 0 | 8 |
|  |  |  | Hydrophobic Zeolite |  | % by mass | 1 | 1.7 | 10 | 10 | 2 |
|  | Inner layer film | Polyethylene single film | Increased TOC concentration in filling water | Article un-irradiated with UV | ppm | 0.74 | 0.74 | 0.74 | 0.74 | 0.74 |
|  |  |  |  | Article irradiated with UV | ppm | 0.88 | 0.88 | 0.88 | 0.88 | 0.88 |
|  |  |  | Pinhole resistance |  | Holes | 2 | 2 | 2 | 2 | 22 |
|  |  | Content in the whole sealant film | Chemical adsorbent-supported inorganic porous material |  | % by mass | 0 | 0 | 0 | 0 | 8 |
|  |  |  | Hydrophobic Zeolite |  | % by mass | 1 | 1 | 1 | 1 | 2 |
|  | Content spout | Content in the whole molded article | Chemical adsorbent-supported inorganic porous material |  | % by mass | 0 | 0 | 0 | 0 | 0 |
|  |  |  | Hydrophobic Zeolite |  | % by mass | 1 | 1 | 1 | 1 | 1 |
| Evaluation result | Package (Outer layer film + Inner layer film + Content spout) | Film-forming properties | Outer layer film | — | ○ | ○ | ○ | ○ | ○ |
|  |  |  | Inner layer film | — | ○ | ○ | ○ | ○ | ○ |
|  |  | Moldability properties | Content spout | — | ○ | ○ | ○ | ○ | ○ |
|  |  | Heat sealing strength |  | — | ○ | ○ | ○ | ○ | ○ |
|  |  | Bag rupture resistance characteristics |  | — | ◎ | ◎ | ○ | ○ | ○ |
|  |  | Pinhole resistance (Inner layer film) |  | Holes | 4 | 5 | 5 | 4 | 26 |
|  |  | Increased TOC concentration in filling water |  | ppm | 0.46 | 0.47 | 0.44 | 0.46 | 0.41 |

TABLE 10-continued

| | | | | Comparative Example | | | | |
|---|---|---|---|---|---|---|---|---|
| | | | | 1 | 2 | 3 | 4 | 5 |
| Packaging material constitution | | Outer layer film | | A | A | A | G | H |
| | | Inner layer film | | N | O | P | P | P |
| | | Content spout | | J | B | B | B | B |
| Characteristics | Outer layer film | Polyethylene single film | Increased TOC concentration in filling water | Article un-irradiated with UV | 0.74 | 0.74 | 0.74 | 0.74 | 0.74 |
| | | | | Article irradiated with UV | 0.88 | 0.88 | 0.88 | 0.88 | 0.88 |
| | | Content in the whole sealant film | Chemical adsorbent-supported inorganic porous material | 0 | 0 | 0 | 0 | 0 |
| | | | Hydrophobic Zeolite | 1 | 1 | 1 | 16.7 | 16.7 |
| | Inner layer film | Polyethylene single film | Increased TOC concentration in filling water | Article un-irradiated with UV | 2.56 | 2.56 | 0.74 | 0.74 | 0.74 |
| | | | | Article irradiated with UV | 3.07 | 3.07 | 0.88 | 0.88 | 0.88 |
| | | | Pinhole resistance | 12 | 14 | 35 | 35 | 35 |
| | | Content in the whole sealant film | Chemical adsorbent-supported inorganic porous material | 0 | 0 | 0 | 0 | 0 |
| | | | Hydrophobic Zeolite | 0 | 0 | 15 | 16 | 17 |
| | Content spout | Content in the whole molded article | Chemical adsorbent-supported inorganic porous material | 0 | 0 | 0 | 0 | 0 |
| | | | Hydrophobic Zeolite | 0 | 1 | 1 | 1 | 1 |
| Evaluation result | Package (Outer layer film + Inner layer film + Content spout) | Film-forming properties | Outer layer film | ○ | ○ | ○ | X | X |
| | | | Inner layer film | ○ | ○ | X | X | X |
| | | Moldability properties | Content spout | ○ | ○ | ○ | ○ | ○ |
| | | Heat sealing strength | | ○ | ○ | X | X | X |
| | | Bag rupture resistance characteristics | | ◎ | ◎ | X | X | X |
| | | Pinhole resistance (Inner layer film) | | 12 | 24 | 340 | 340 | 340 |
| | | Increased TOC concentration in filling water | | 2.61 | 2.37 | 0.04 | 0.02 | 0.02 |

<Summary of Results>

The packages of all Examples exhibited favorable film formability, bag rupture resistance characteristics, heat sealing properties, and pinhole resistance and also had a small increased TOC concentration.

Comparative Example 1 involving none of the low elutable polyethylene, the hydrophobic zeolite, and the chemical adsorbent-supported inorganic porous material, and Comparative Example 2 involving no low elutable polyethylene and involving hydrophilic zeolite instead of hydrophobic zeolite exhibited a tendency of a high increased TOC concentration. Comparative Examples 3, 4, and 5 involving too large an amount of hydrophobic zeolite resulted in poor film formability of the outer layer film and the inner layer film and poor heat sealing properties and bag rupture resistance characteristics, though decrease in TOC concentration was large.

REFERENCE SIGNS LIST

Object 1
1 Content packaging bag
2 Bag portion
3 Content spout
3a Cap
3b Cylindrical parts
3c Flange
4 Heat-sealed portion of bag portion
A, B Cross-sectional line
5 Upper film
6 Lower film
Object 2
1 Odor-adsorbing sealant film
2 Adhesively bonded portion between outer layer film and inner layer film 3 Outer layer film
4 Inner layer film
5 Sealant layer
6 Odor-adsorbing layer
6a Odor-adsorbing layer
6b Odor-adsorbing layer
7 Non-odor-adsorbing layer
8 Base material layer
9 Adhesion layer
11 Package or liquid content package for BIB
12 Double-bag portion
13 Content spout
14 Heat-sealed portion of double-bag portion
15 Upper film
16 Lower film
A, B Cross-sectional line
  Object 3
1 Odor-adsorbing laminate
2 Base material layer
3 Adhesion layer
3a Odor-adsorbing adhesion layer
3b Non-odor-adsorbing adhesion layer
4 Sealant layer
4a Odor-adsorbing sealant layer
4b Non-odor-adsorbing sealant layer
  Objects 4 and 5
1 Package or liquid content package for BIB
2 Double-bag portion
3 Content spout
4 Heat-sealed portion of double-bag portion A, B Cross-sectional line
5 Upper film
6 Lower film
7 Adhesively bonded portion between outer layer film and inner layer film
8 Outer layer film
9 Inner layer film
10 Sealant layer
11 Odor-adsorbing layer
11a Odor-adsorbing layer (concentration a)
11b Odor-adsorbing layer (concentration b)
12 Non-odor-adsorbing layer
13 Base material layer
14 Adhesion layer

The invention claimed is:

1. An odor-adsorbing laminate for a bag-in-box, comprising at least a base material layer, an adhesion layer, and a sealant layer, in this order, wherein:
  the sealant layer comprises an odor-absorbing sealant layer and a non-odor-absorbing sealant layer, the non-odor-absorbing sealant layer is in contact with both sides of the odor-absorbing sealant layer,
  the adhesion layer and the non-odor-absorbing sealant layer are in contact,
  the adhesion layer and the odor-absorbing sealant layer each contain an odor adsorbent material,
  a content of the odor adsorbent material in the adhesion layer is 0.3% by mass or more and 50% by mass or less,
  a content of the odor adsorbent material in the sealant layer is 0.3% by mass or more and 15% by mass or less, and
  the odor adsorbent material comprises hydrophobic zeolite having a $SiO_2/Al_2O_3$ molar ratio of 30/1 or more and 8000/1 or less.

2. The odor-adsorbing laminate according to claim 1, wherein the adhesion layer is a dry lamination adhesion layer or a non-solvent lamination adhesion layer.

3. The odor-adsorbing laminate according to claim 1, wherein
  the adhesion layer is an extrusion coating adhesion layer or a sand lamination adhesion layer, and
  a content of the odor adsorbent material in the adhesion layer is 0.3% by mass or more and 15% by mass or less.

4. The odor-adsorbing laminate according to claim 1, wherein the odor adsorbent material is melt-kneaded with a thermoplastic resin in advance at an odor adsorbent material/thermoplastic resin mass ratio of 0.5/99.5 or more and 40/60 or less.

5. The odor-adsorbing laminate according to claim 1, wherein the adhesion layer further contains one or two or more members selected from the group consisting of a polyurethane resin, a polyester resin, a polyamide resin, and a polyolefin resin.

6. The odor-adsorbing laminate according to claim 1, wherein the sealant layer further contains a thermoplastic resin having a melt flow rate of 0.2 g/10 min or more and 10.0 g/10 min or less.

7. The odor-adsorbing laminate according to claim 1, wherein
  the adhesion layer comprises an odor-adsorbing adhesion layer containing the odor adsorbent material, and a non-odor-adsorbing adhesion layer containing no odor adsorbent material, and
  the non-odor-adsorbing adhesion layer is in contact with one side or both sides of the odor-adsorbing adhesion layer.

8. The odor-adsorbing laminate according to claim 1, wherein the odor adsorbent material further comprises a chemical adsorbent-supported inorganic porous material.

9. The odor-adsorbing laminate according to claim 8, wherein
  a content of the hydrophobic zeolite in the adhesion layer is 0.3% by mass or more and 13% by mass or less, and
  a content of the chemical adsorbent-supported inorganic porous material in the adhesion layer is 0.3% by mass or more and 10% by mass or less.

10. The odor-adsorbing laminate according to claim 8, wherein
  a content of the hydrophobic zeolite in the sealant layer is 0.1% by mass or more and 13% by mass or less, and
  a content of the chemical adsorbent-supported inorganic porous material in the sealant layer is 0.1% by mass or more and 10% by mass or less.

11. The odor-adsorbing laminate according to claim 8, wherein the chemical adsorbent of the chemical adsorbent-supported inorganic porous material has a functional group reactive with one or two or more members selected from the group consisting of an aldehyde, a ketone, and a carboxylic acid.

12. The odor-adsorbing laminate according to claim 11, wherein the chemical adsorbent has an amino group.

* * * * *